United States Patent [19]

Tseung

[11] Patent Number: 5,109,384
[45] Date of Patent: Apr. 28, 1992

[54] GUARANTEED RELIABLE BROADCAST NETWORK

[76] Inventor: Lawrence C. N. Tseung, 9 Silver Hill Rd., Acton, Mass. 01720

[21] Appl. No.: 486,082

[22] Filed: Feb. 27, 1990

Related U.S. Application Data

[63] Continuation-in-part of Ser. No. 266,473, Nov. 2, 1988, Pat. No. 5,036,518 which is a continuation-in-part of PCT/US89/04865, Nov. 1, 1989.

[30] Foreign Application Priority Data

Oct. 31, 1989 [CA] Canada .................................. 2001939

[51] Int. Cl.⁵ ...................... H04B 17/00; G08C 25/04
[52] U.S. Cl. .................................. 371/32; 340/825.15; 395/575
[58] Field of Search ................. 371/32, 33, 67.1, 68.1, 371/68.2; 340/825.06, 825.15; 364/222.2, 240.8, 240.9, 242.6, 242.94, 242.5

[56] References Cited

U.S. PATENT DOCUMENTS

| | | | |
|---|---|---|---|
| 3,387,268 | 6/1968 | Epstein . | |
| 3,587,044 | 7/1969 | Jenkins . | |
| 3,704,363 | 11/1972 | Salmassy et al. | 371/29.1 |
| 3,921,151 | 11/1975 | Guanella | 364/200 |
| 3,970,790 | 7/1976 | Guanella | 364/200 |
| 4,276,594 | 6/1981 | Morley | 364/200 |
| 4,317,957 | 3/1982 | Sendrow | 178/22 |
| 4,325,120 | 4/1982 | Colley et al. | 364/200 |
| 4,354,225 | 10/1982 | Frieder et al. | 364/200 |
| 4,418,384 | 11/1983 | Holtey et al. | 364/200 |
| 4,433,207 | 2/1984 | Best | 178/22.09 |
| 4,454,508 | 6/1984 | Grow | 340/825.05 |
| 4,459,588 | 7/1984 | Grow | 340/825.05 |
| 4,538,147 | 8/1985 | Grow | 340/825.05 |
| 4,569,015 | 2/1986 | Dolev et al. | 364/200 |
| 4,569,042 | 2/1986 | Larson | 370/13 |
| 4,587,650 | 5/1986 | Bell | 370/86 |
| 4,617,657 | 10/1986 | Drynan et al. | 370/60 |
| 4,644,542 | 2/1987 | Aghili et al. | 371/22 |
| 4,654,480 | 3/1987 | Weiss | 380/48 |
| 4,654,654 | 3/1987 | Butler et al. | 340/825.5 |
| 4,661,952 | 4/1987 | von Sichart et al. | 370/94 |
| 4,663,748 | 5/1987 | Karbowiak et al. | 370/89 |
| 4,706,081 | 11/1987 | Hart et al. | 340/825.03 |
| 4,725,834 | 2/1988 | Chang et al. | 340/825.5 |
| 4,807,224 | 2/1989 | Naron et al. | 370/94 |
| 4,845,658 | 7/1989 | Gifford | 364/900 |
| 4,864,494 | 9/1989 | Kobus, Jr. | 364/200 |
| 4,882,752 | 11/1989 | Lindman et al. | 380/25 |
| 4,965,827 | 10/1990 | McDonald | 380/25 |
| 4,975,950 | 12/1990 | Lentz | 380/4 |

OTHER PUBLICATIONS

Metcalfe et al, "Ethernet: Distributed Packet Switching for Local Computer Networks," *Communications of the ACM*, vol. 19, No. 7, p. 395, Jul. 1976.

Mai et al, "Performance Evaluation of an Ethernet LAN with Broadcast and Point-to-Point Data Traffic," *Computer Communication*, vol. 10, No. 6, p. 283, Dec. 1987.

Waters, "The Use of Broadcast and Multicast Techniques on Computer Networks," *Conference on Electronic Delivery of Data and Software*, IEEE Publication No. 69, p. 45, Sep. 1986, and references cited therein.

Hughes, "Chat: An N-Party Talk Facility for the Unix 4.2 Operating System," *Computer Communications*, 1988.

Chang and Mexamchuk, "Reliable Broadcast Protocols," *ACM Transactions on Computer Systems*, vol. 2, No. 3, p. 251, Aug. 1984.

Chang, "Simplifying Distributed Database Sysems Design by Using a Broadcast Network," *ACM*, 0-897-91-128-8/84/006/0223, p. 223, 1984.

*Primary Examiner*—Charles E. Atkinson
*Attorney, Agent, or Firm*—Nixon & Vanderhye

[57] ABSTRACT

This system guarantees reliable data transmission for one-to-one, one-to-many and/or many-to-many communications among data processing stations over a communications network. A general solution is presented, and a new concept (the arbitrator node) is discussed in detail. Special logical nodes and a new communications protocol are used so that a message is guaranteed to be received if a receiver(s) wants to receive the message even though a receiver(s) may be busy, slow or temporarily powered off. An optional management station controls orderly start and stop of group communications or conferences, and may also handle secure, confidential communications. This guaranteed, reliable, one-to-one, one-to-many or many-to-many system can be applied to overcome previously unsolved problems.

53 Claims, 71 Drawing Sheets

852

| MAXIMUM RETRY LIMIT | 854 |
| --- | --- |
| ACK TIMER LIMIT | 856 |
| MSG RECEIVED ON NETWORK A FLAG | 858 |
| MSG RECEIVED ON NETWORK B FLAG | 860 |
| ACK TIMER EXPIRED ON NETWORK A FLAG 1 | 862 |
| ACK TIMER EXPIRED ON NETWORK A FLAG 2 | 864 |
| ACK TIMER EXPIRED ON NETWORK B FLAG | 866 |
| END SESSION FLAG | 868 |
| KEYBOARD INPUT COMPLETED FLAG | 870 |

| NETWORK NAME | 920 |
| --- | --- |
| NODE ADDRESS OF GPC | 922 |
| CONFERENCE NUMBER | 924 |
| RECEIVE SEQUENCE NUMBER | 926 |
| RECEIVE RETRY COUNT | 928 |
| SEND SEQUENCE NUMBER | 930 |
| SEND RETRY COUNT | 932 |
| UNSEND MESSAGE COUNT | 934 |
| POINTER TO UNSEND MESSAGE LIST | 936 |
| MISSED MESSAGE COUNT | 938 |
| POINTER TO MISSED MESSAGE CONTROL BLOCK LIST | 940 |
| POINTER TO LAST SENT MESSAGE | 942 |
| READY TO SEND FLAG | 944 |
| READY TO REQUEST FLAG | 946 |
| PRC ERROR COUNT | 948 |
| OUT OF SEQ ERROR COUNT | 950 |
| POINTER TO MSG CTRL BLK | 952 |

FIG. 46

| | |
|---|---|
| NETWORK NAME | 1080 |
| NODE ADDRESS OF RTC | 1082 |
| CONFERENCE NUMBER | 1084 |
| RECEIVE SEQUENCE NUMBER | 1086 |
| RECEIVE RETRY COUNT | 1088 |
| SEND SEQUENCE NUMBER | 1090 |
| SEND RETRY COUNT | 1092 |
| UNSENT MESSAGE COUNT | 1094 |
| POINTER TO UNSENT MESSAGE LIST | 1096 |
| MISSED MESSAGE COUNT | 1098 |
| POINTER TO MISSED MESSAGE CONTROL BLOCK LIST | 1100 |
| POINTER TO LAST SENT MESSAGE | 1102 |
| READY TO SEND FLAG | 1104 |
| READY TO REQUEST FLAG | 1106 |
| PRC ERROR COUNT | 1108 |
| OUT OF SEQ ERROR COUNT | 1110 |
| POINTER TO MSG CTRL BLK | 1112 |

| | |
|---|---|
| MAXIMUM RETRY LIMIT | 1054 |
| ACK TIMER LIMIT | 1056 |
| MSG RECEIVED ON NETWORK A FLAG | 1058 |
| MSG RECEIVED ON NETWORK B FLAG | 1060 |
| ACK TIMER EXPIRED ON NETWORK A FLAG # 1 | 1062 |
| ACK TIMER EXPIRED ON NETWORK A FLAG # 2 | 1064 |
| ACK TIMER EXPIRED ON NETWORK B FLAG | 1066 |
| END SESSION FLAG | 1068 |
| KEYBOARD INPUT COMPLETED FLAG | 1070 |

FIG. 49

- 1252
- MAXIMUM RETRY LIMIT — 1254
- ACK TIMER LIMIT — 1256
- MSG RECEIVED ON NETWORK A FLAG — 1258
- MSG RECEIVED ON NETWORK B FLAG — 1260
- ACK TIMER EXPIRED ON NETWORK A FLAG #1 — 1262
- ACK TIMER EXPIRED ON NETWORK A FLAG #2 — 1264
- ACK TIMER EXPIRED ON NETWORK B FLAG — 1266
- END SESSION FLAG — 1268
- KEYBOARD INPUT COMPLETED FLAG — 1270

FIG. 47

- 1036
- NETWORK NAME — 1120
- NODE ADDRESS OF PRC — 1122
- CONFERENCE NUMBER — 1124
- RECEIVE SEQUENCE NUMBER — 1126
- RECEIVE RETRY COUNT — 1128
- SEND SEQUENCE NUMBER — 1130
- SEND RETRY COUNT — 1132
- UNSENT MESSAGE COUNT — 1134
- POINTER TO UNSENT MESSAGE LIST — 1136
- MISSED MESSAGE COUNT — 1138
- POINTER TO MISSED MESSAGE CONTROL BLOCK LIST — 1140
- POINTER TO LAST SENT MESSAGE — 1142
- READY TO SEND FLAG — 1144
- READY TO REQUEST FLAG — 1146
- PRC ERROR COUNT — 1148
- OUT OF SEQ ERROR COUNT — 1150
- POINTER TO MSG CTRL BLK — 1152

CONVENTIONAL BROKERAGE FIRM

PROPOSED BROKERAGE SYSTEM

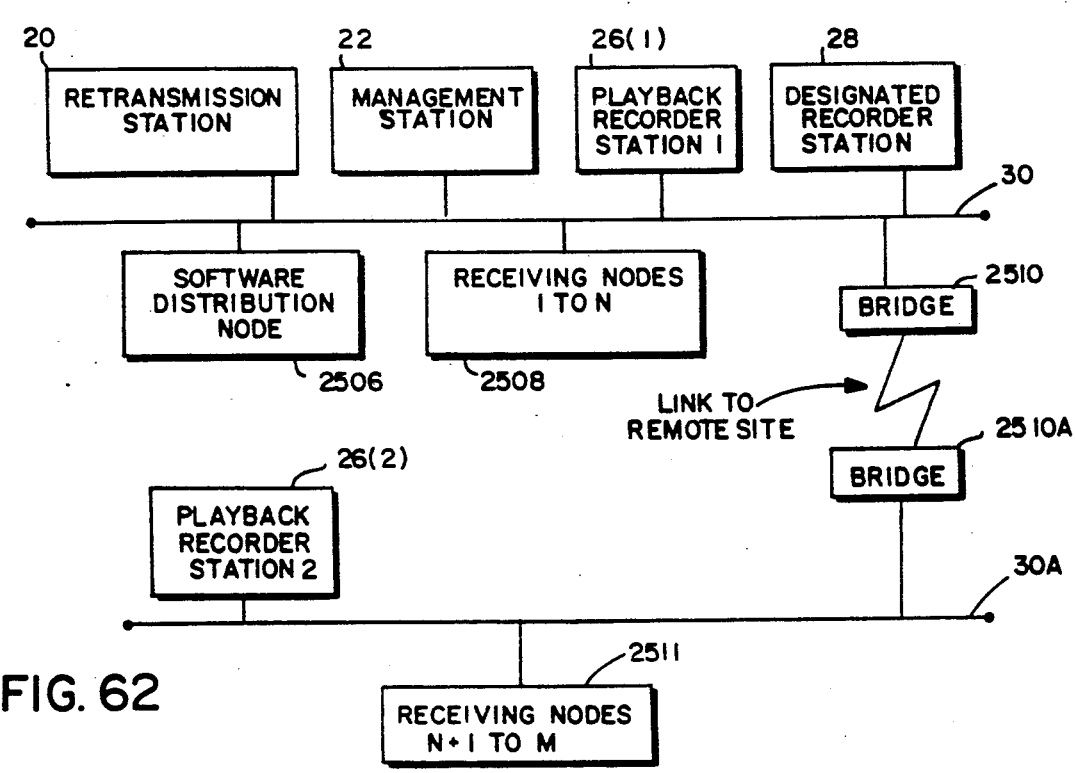
FIG. 62    PROPOSED SOFTWARE DISTRIBUTION SYSTEM
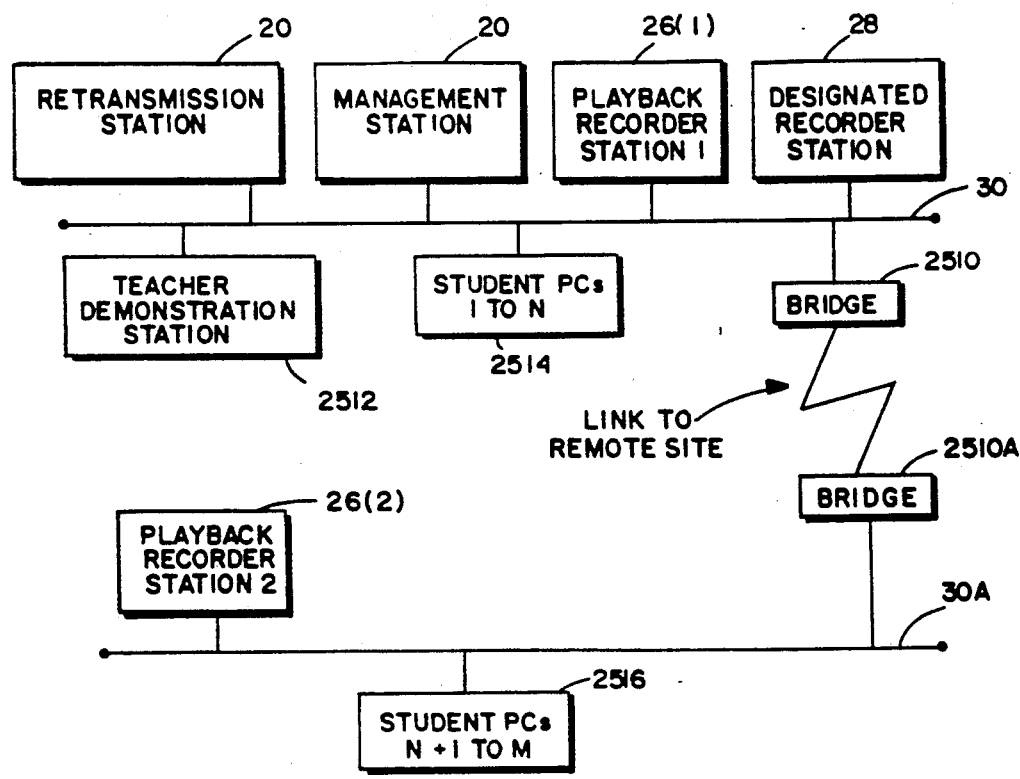
FIG. 63    PROPOSED TEACHING OR DEMONSTRATION SYSTEM

FIG. 64
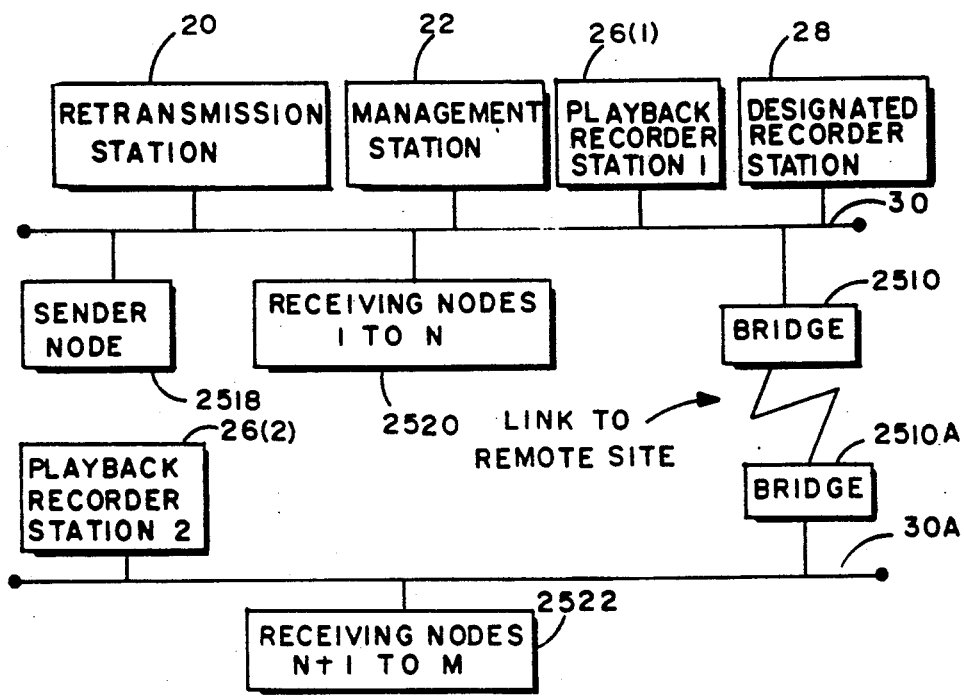
PROPOSED SYSTEM TO COMMUNICATE WITH
UNKNOWN GROUP OF RECEIVERS
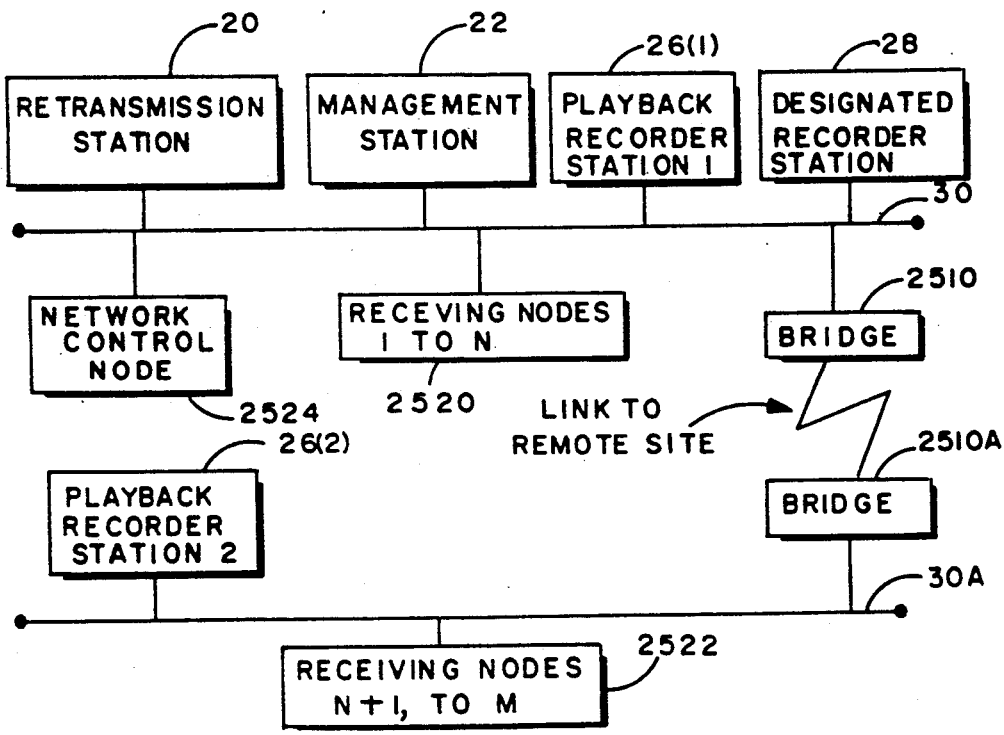
PROPOSED NETWORK MANAGEMENT SYSTEM
FIG. 65

FIG. 66
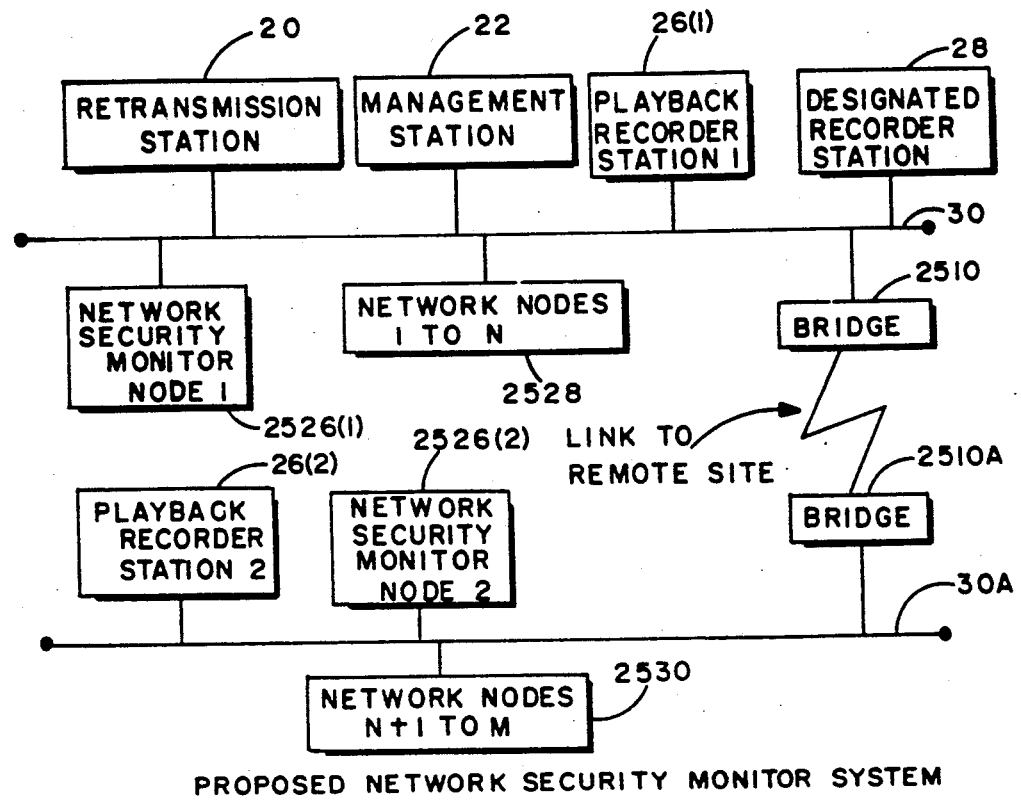
PROPOSED NETWORK SECURITY MONITOR SYSTEM
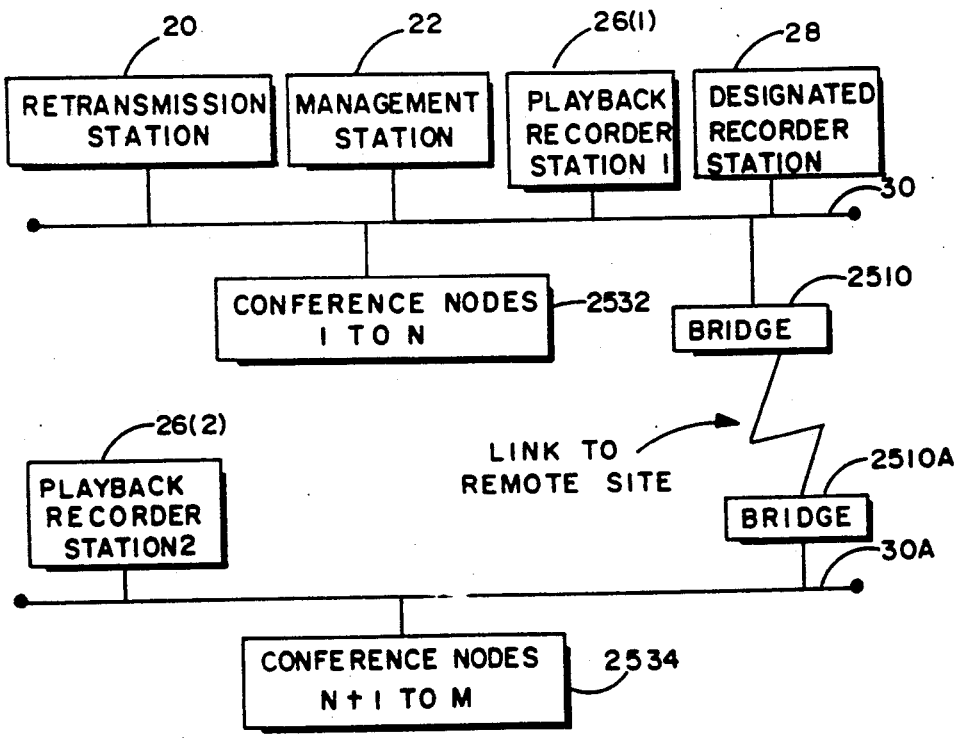
PROPOSED COMPUTER CONFERENCE SYSTEM
FIG. 67

PROPOSED SYSTEM TO SUPPORT DIFFERENT COMPANIES

PROPOSED BACKUP SYSTEM

PROPOSED HOT STANDBY SYSTEM

CONVENTIONAL ON-LINE TRANSACTION PROCESSING SYSTEM

PROPOSED ON-LINE TRANSACTION PROCESSING SYSTEM

PROPOSED DISTRIBUTED DATABASE HANDLING

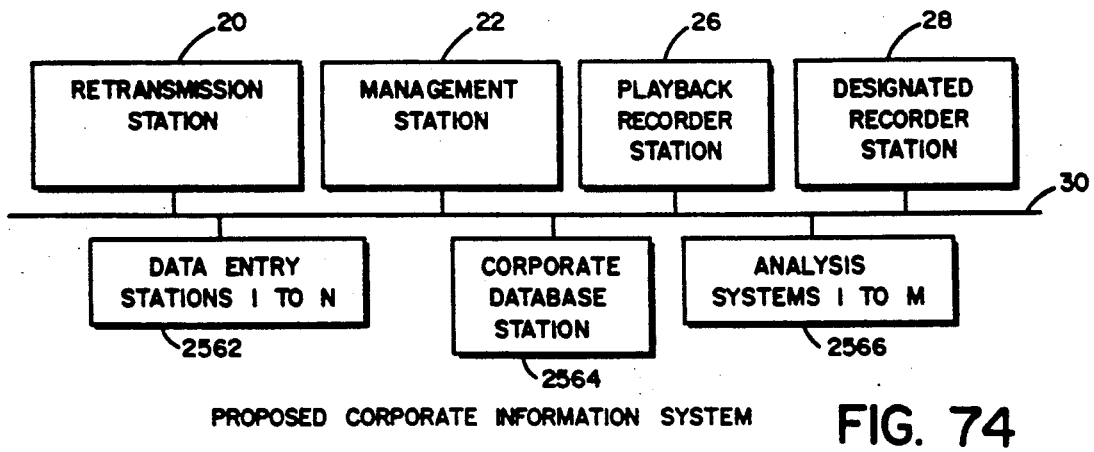
FIG. 74 PROPOSED CORPORATE INFORMATION SYSTEM
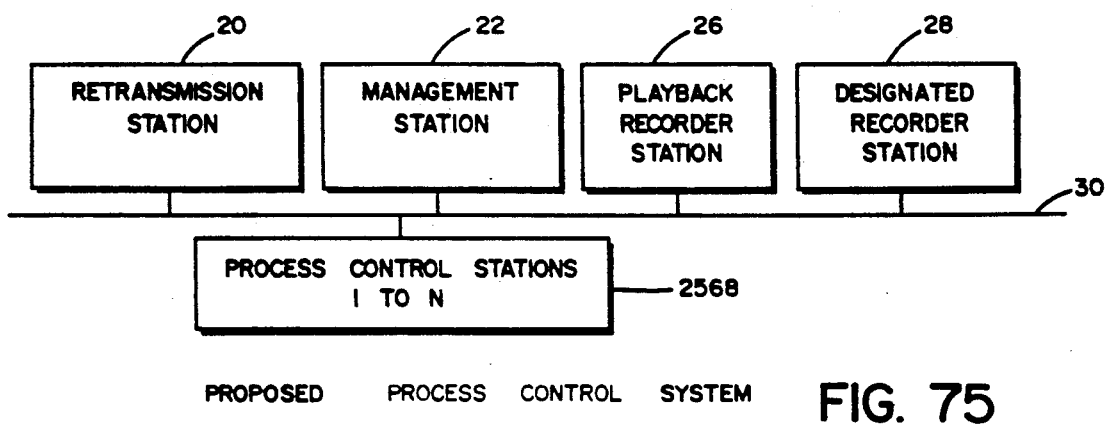
FIG. 75 PROPOSED PROCESS CONTROL SYSTEM
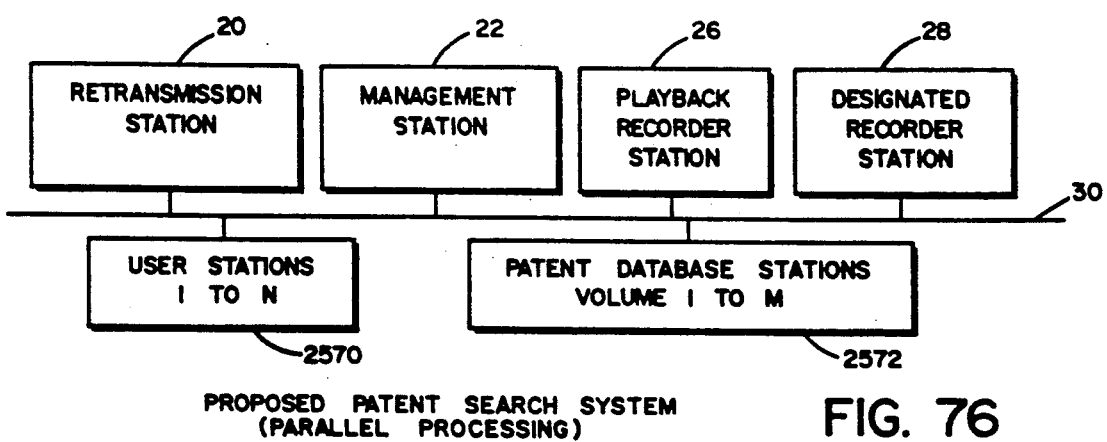
FIG. 76 PROPOSED PATENT SEARCH SYSTEM (PARALLEL PROCESSING)

| DESTINATION ADDRESS |
|---|
| SOURCE ADDRESS |
| CONFERENCE NUMBER |
| LOCAL MESSAGE SEQUENCE NUMBER |
| RETRY COUNT |
| DATE AND TIME INFORMATION |
| MESSAGE TYPE |
| DATA |
| CRC BLOCK CHECK |

FIG. 87(A)

| | |
|---|---|
| DESTINATION ADDRESS | |
| SOURCE (ARBITRATOR) ADDRESS | 4004 |
| DATE AND TIME INFORMATION | 4006 |
| MESSAGE TYPE | 4008 |
| SLOT 1 INFORMATION | 4010(1) |
| SLOT 2 INFORMATION | 4010(2) |
| ⋮ | |
| SLOT m-1 INFORMATION | 4010(m-1) |
| SLOT m (THIS MESSAGE) INFORMATION | 4010(m) |
| RESERVATION SLOT m+1 INFORMATION | 4060(m+1) |
| RESERVATION SLOT m+2 INFORMATION | 4060(m+2) |
| BEGINNING OF FREE SLOTS (m+3) | 4060(m+3) |
| CRC BLOCK CHECK | 4012 |

FIG. 87(B)

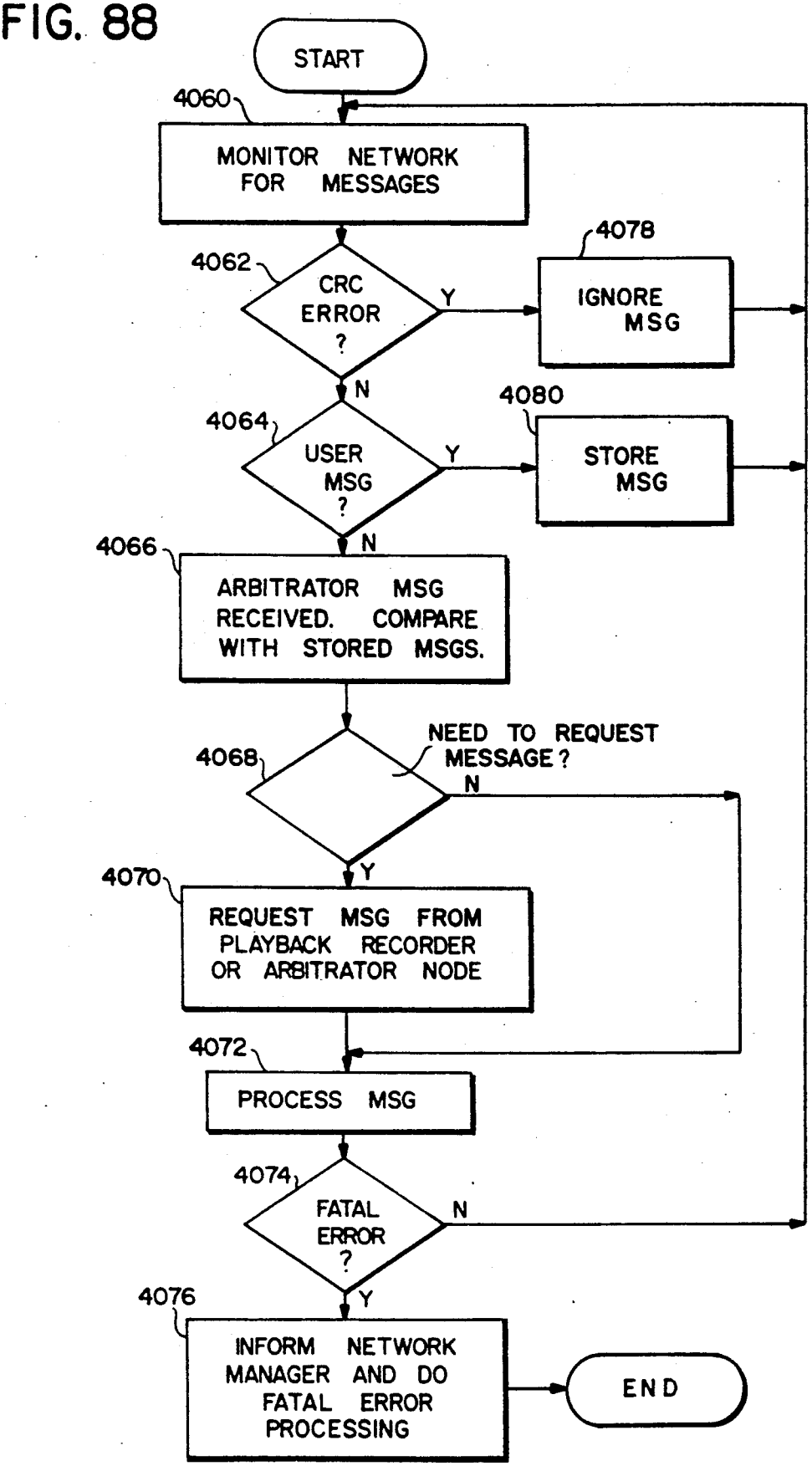

| |
|---|
| DESTINATION ADDRESS |
| SOURCE (ARBITRATOR) ADDRESS |
| DATA AND TIME INFORMATION |
| MESSAGE TYPE |
| GLOBAL MESSAGE SEQUENCE NUMBER |
| LOCAL MESSAGE SEQUENCE NUMBER |
| RESERVED MESSAGE SLOT VALUE M |
| RESERVED TIME VALUE $t$ |
| MESSAGE PRIORITY |

| | |
|---|---|
| SLOT 1 | NODE ADDRESS |
| | MSG. SEQ. NO. |
| SLOT 2 | NODE ADDRESS |
| | MSG. SEQ. NO. |

GUARANTEED RELIABLE BROADCAST NETWORK

CROSS-REFERENCE TO RELATED APPLICATIONS

This application is a continuation-in-part of pending U.S. application Ser. No. 07/266,473 filed on Nov. 2, 1988 which issued on Nov. 30, 1991 as U.S. Pat. No. 5,036,518. This application is also a continuation-in-part of international application No. PCT/US 89/04865 filed on Nov. 1, 1989.

FIELD OF THE INVENTION

The invention relates to communicating digital information over a digital communications network. More particularly, the invention relates to a system and method for guaranteed delivery of digital messages from one or many network nodes to many network nodes over a digital network.

BACKGROUND AND SUMMARY OF THE INVENTION

Data communication amongst data processing stations can be classified into the following four categories:
one-to-one
many-to-one
one-to-many; and
many-to-many.

The following is a brief discussion of known techniques for communicating messages in the various categories.

ONE-TO-ONE DATA COMMUNICATION

Communicating a message from one network node to another network node is perhaps the simplest and most reliable type of message communications. Some examples of one-to-one communications include two personal computers communicating with one another over a telephone line, and two digital data terminals communicating with one another over a satellite link. When a data message is transmitted outwards from a transmitting data processing station, this data message may be lost or distorted (e.g., 1's turned into 0's) because of electrical interference, loose connections, faulty hardware, slow or busy receiving data processing station or other reasons. To guarantee correct data reception, communication protocols are used. These communication protocols commonly incorporate a technique known as message acknowledgement in which a receiving data processing station sends a message back to the transmitting data processing station to indicate that a message or a group of messages has been correctly received. Negative acknowledgement (NAK) or no acknowledgement prompts the transmitting data processing station to retransmit the message or group of messages—giving the receiving data processing station another chance to correctly receive the message.

Furthermore, this message acknowledgement scheme ensures that the transmitting data processing station does not send messages faster than what the receiving data processing station can handle. In part because the transmitting station "knows" which messages have actually been correctly received by the receiving station, this message acknowledgement scheme works very well and provides guaranteed reliable data communications for one-to-one communications.

MANY-TO-ONE DATA COMMUNICATION

It is somewhat more difficult to handle the situation in which many data processing stations are transmitting messages to a common data processing station. A simple example of this many-to-one situation is a "star" type network configuration, in which all network nodes communicate with a central network node. One commonly used technique for many-to-one data communications provides many separate one-to-one data communications pairs, and uses protocols of the type discussed above for one-to-one communications to ensure that each of the many communication pairs are guaranteed to be reliable. This technique assumes that the content of each data communication pair is different, an assumption which holds well in most real life applications (since, for example, the many data processing stations are each typically acting substantially independently of one another).

ONE-TO-MANY DATA COMMUNICATION

In one-to-many data communication, the same information is to be sent to many different data processing stations. This situation is commonly known as "broadcast" or "multicast". Broadcasted messages are typically directed to all network nodes, while multicasted messages are directed to a subset of nodes on the communications network the message is intended for. A number of networks (e.g., token ring, Ethernet, radio, microwave and satellite networks) possess broadcast or multicast capabilities. However, in known systems the multicasted or broadcasted message can still be missed or incorrectly received by one or more network nodes (e.g., the message may be distorted due to electrical interference, loose connections, faulty hardware, slow or busy receiving data processing stations, or other reasons). The network communications hardware setup alone cannot be relied upon to guarantee correct data reception, since even the most carefully designed network will occasionally exhibit errors due to one reason or another. For example, Metcalfe et al of XEROX PARC in one of their important early papers, "Ethernet: Distributed Packet Switching For Local Computer Networks" 19 *Communications of the ACM* No. 7 (July 1976), caution that Ethernet packets may be lost due to interference with other packets, noise, an inactive receiving station, or other effects. The authors state that protocols used to communicate through an Ethernet must assume that packets will be received correctly at intended destinations only with high probability (but not certainty)—and the authors allocate to the source and destination processes the responsibility of taking the necessary steps to assure reliable communications.

Existing one-to-many communications schemes are known as "datagram" service—since they provide no guarantee of data reception and no technique for informing the transmitting node of correct or incorrect reception by individual receiving nodes.

The technique of message acknowledgement so useful for one-to-one communications cannot be used efficiently in one-to-many communications to guarantee proper data reception. For example, if one data processing station sends the same data to 1,000 other data processing stations and then has to wait for 1,000 acknowledgement messages, it may wait for a long time—especially if some of these 1,000 data processing stations were busy temporarily or inoperative at the time the message was sent. Therefore, most of the existing applications requiring guaranteed reliable broadcast/multicast data communications fall back to the one-to-one communication scheme. For example, if the same piece of mail is to be sent to 1,000 other data processing stations, it will be sent separately 1,000 times on a one-to-one basis so that reliable data communication to each station can be guaranteed. While this fall back position substantially reduces efficiency, it does guarantee reliability.

MANY-TO-MANY DATA COMMUNICATION

For many-to-many communications, falling back to one-to-one communication may be impractical—since the number of different one-to-one communications pairs needed to service n network nodes is on the order of $n^2$. For example, if n data processing stations want to exchange data amongst themselves, they would require $$\frac{n \times (n - 1)}{2}$$

one-to-one communication pairs. For a 10 node network, the number turns out to be 45. For a 100 node network, the number turns out to be 4950. Hence, handling many-to-many communications using the proven guaranteed, reliable one-to-one communications techniques is quite impractical and inefficient for even relatively small networks.

Most prior art techniques nevertheless provide guaranteed, reliable one-to-many and many-to-many communications by reducing them to one-to-one communication pairs. Prior art techniques simply cannot provide guaranteed, reliable, efficient many-to-many data communications.

Many have addressed the issue of guaranteed, reliable many-to-many (broadcast or multicast) communications over digital communications networks. The following is a brief, non-exhaustive but somewhat representative listing of articles and patents addressing the problem of reliable many-to-many communications:

Mai et al, "Performance Evaluation of an Ethernet LAN With Broadcast and Point-to-Point Data Traffic", 10 *Computer Communication* No. 6, pp. 283-290 (December 1987);

Waters, A. G., "The Use of Broadcast and Multicast Techniques on Computer Networks", *Conference on Electronic Delivery of Data and Software*. IERE Publication No. 69, pp. 45-50 (September 1986)—and references cited therein; and Hughes, "Chat: an N-party talk facility for the Unix 4.2 Operating System", *Computer Communications* (1988).

U.S. Pat. No. 4,807,224 to Naron (1989).

Mai et al note that Ethernet-type local area networks are inherently capable of broadcasting messages, but also note that the problem of reliable broadcast has not been completely resolved. One solution proposed by Mai et al is to define a hierarchy of receiving stations, with only certain receiving stations actually participating in broadcast/multicast reception. These certain stations (known as "LS" nodes) are then responsible for passing the received message on to other stations. Mai et al model Ethernet performance assuming that only a set of designated nodes are allowed to send broadcast messages and that the transmitting nodes "know" the addresses of designated "LS" nodes in advance (significant limitations in real world applications). The LS nodes receive the broadcast messages and generate acknowledgements. The LS nodes, in turn, store the broadcast message as a mail message for predefined associated groups. Since only the LS nodes need to provide acknowledgements to the broadcasting node, the number of acknowledgements is reduced. However, this method suffers from several drawbacks, including the limitation that only certain nodes can broadcast messages and the further limitation that the broadcasting node must wait for receipt of acknowledgements from all of the "LS" nodes (in effect, a one-to-one communication process with the number of acknowledging nodes limited to what the system designers consider to be an acceptably low number).

The Waters paper reviews and summarizes several prior art many-to-many communications techniques, and notes that the majority of applications which have been implemented over broadcast networks use one-to-one communications protocols to provide guaranteed reliability. Waters concludes that broadcast techniques enable surprisingly simple ways of solving difficult problems for a variety of different purposes. Relevant prior work described by Waters includes the Project Universe Broadcast Facilities, BANET, Group Communication on the V-System, a reliable broadcast protocol developed by Chang et al, and the various file broadcast mechanisms—each of which is described in greater detail in a paper cited in Waters' bibliography.

The Waters paper discussion of the Project Universe Broadcast Facilities (section 4.1) describes a system in which "Cambridge rings" type networks were linked by a broadcast satellite channel. Broadcast channel numbers were allocated to allow many-to-many communications. However, in this arrangement true broadcast ceased at the satellite access station, and the packets were delivered by the access station to all stations on the local ring network that had previously requested reception of broadcast messages on that particular channel. Thus, the satellite access station in this system must be informed beforehand of which specific nodes are to receive broadcast information, and only the satellite access stations actually participate in true broadcast communications.

The BANET arrangement discussed at section 4.2 of the Waters paper provides reliable one-to-many communications by requiring each receiving station to acknowledge every packet—and thus may be impractical or inefficient for use with a large number of receiving stations (especially since it is not clear what happens if one member of a receiving group fails to reply).

The Waters paper also discusses at section 4.3 an arrangement described previously by Cheriton and Zwaenopol for the V-system (an Ethernet-based distributed processing system). This arrangement is based on guaranteed reliable one-to-one communications, but overcomes some of the inefficiency involved with one-to-one communications for broadcast/multicast by permitting the application program to decide when it has received a sufficient number of replies (acknowledgements) before sending another message (some applications may have lesser reliability requirements than others). This arrangement is highly inefficient if 100% reliable broadcast/multicast communications to a large number of nodes is required.

Waters also describes a reliable broadcast protocol developed by Chang and Mexamchuk—and described in their paper entitled "Reliable Broadcast Protocols", Vol 2. *ACM Transactions on Computer Systems*, No. 3, pp. 251-273 (Aug. 1984) (and see also U.S. Pat. No. 4,725,834 to Chang et al)—which uses broadcast techniques for both transmitting the initial message and transmitting acknowledgements to the message. A single site, called the "token site", transmits an acknowledgement to the broadcast message originator(s). Other stations send negative acknowledgements only and listen for messages and acknowledgements by the token site. The token is passed via an acknowledgement message from one station to another, and each station stores incoming packets. Thus, the number of acknowledgements sent for each message is reduced. However, all stations must constantly listen for acknowledgements sent by the token station, in addition to the broadcasted messages.

Finally, the Waters paper describes at Section 5.1.3 a file distribution scheme developed by Sabnani and Schwartz which uses go-back-N and selective repeat techniques; and a negative acknowledgement broadcast distribution technique developed by Calo and Easton.

The Hughes paper describes an actually implemented utility program called "Chat" for the Unix operating system. While purporting to broadcast/multicast messages, this utility program actually is more of a datagram type solution since it makes no attempt to ensure that a message is properly delivered to all members of a multicast set. This solution is simply not reliable enough for most broadcast/multicast applications.

Naron et al U.S. Pat. No. 4,807,224

U.S. Pat. No. 4,807,224 to Naron et al (which is perhaps more relevant to at least some aspects of the subject invention than are the references discussed above) discloses a "multi-cast" technique for providing reliable distribution of data to an unlimited number of remote receivers on a network. Briefly, data is centrally assembled into data packets by a data source. Each data packet contains data corresponding to a data packet sequence number. The assembled packets are transmitted immediately upon becoming full (and are also transmitted periodically even if not full). Each receiver contains a failure detection arrangement which checks for reliable receipt of data by monitoring the data packet sequence numbers (and also for receipt of a data packet periodically at a certain minimum frequency). If a receiver detects a failure to reliably receive a data packet, the receiver issues a request for the packet. This request is responded to by a "recovery means"—which may retrieve the packet from local memory and retransmit it or may if necessary issue a recovery request to the data source.

While Naron et al provide one possible solution to the problem of reliably providing "one-to-many" communications, the Naron et al technique is only an incomplete solution and also has some significant problems of its own.

The Naron et al system provides no acknowledgements whatsoever to messages that are transmitted by the data source. If the data source transmits a corrupted data packet (e.g., due to transmission hardware failure or the like), then every receiving node on the network would report to the recovery means that the packet was incorrectly received. This condition would flood the network with requests to resend (thereby providing a relatively inefficient error recovery in terms of communications overhead). Moreover, Naron et al provides no flow control mechanism. The Naron et al data source must always transmit slowly enough for the slowest receiver to receive—an extremely inefficient arrangement since networks generally include some faster receivers and some slower receivers.

If Naron et al's broadcast system is to be slowed down to cater to the slowest receiving node on the network, the resulting system would be relatively inefficient. Another option is to ignore flow control and send messages at a faster pace without regard to the slow or busy receivers—assuming that these slow or busy receivers will obtain the messages they miss from the recovery means. Unfortunately, this solution may cause a condition known as "catastrophic jamming". During high activity periods (such as at the beginning of the day when the users turn on their PCs and try to "recover" their missed messages), the slow or busy receivers will miss or incorrectly receive messages at an increased rate and will therefore request retransmission of those missed/corrupted messages from the recovery means at an increased rate. The recovery means will increase the rate at which it retransmits previously-sent messages, thereby further increasing the level of activity on the network. As the network activity level increases, there will be an even higher probability of receivers missing messages, causing still more requests for retransmission to be generated and sent to the recovery means (resulting in still more missed messages). Eventually, the entire system may become "catastrophically jammed"—that is, completely unusable. The Naron et al patent discloses no technique for avoiding this "catastrophic jamming" problem, and therefore presumably provide only a very slow sending rate and/or assume the network is only very lightly loaded.

In addition, the Naron et al system requires all transmitted messages to "appear" twice on the network—once from the sender node to the data source and then from the data source (after addition of message sequence numbers) to all other nodes. This means less than 50% of the network bandwidth can be used. While this reduction in efficiency may be tolerated in some applications, in other applications it is of tantamount importance to make message transmission as efficient as possible and to maximize the number of messages that can be transmitted per given time period.

The present invention solves a major problem in data communication—that of providing highly efficient guaranteed data reliability for one-to-many and/or many-to-many data communications.

Several different specialized communications functions are performed in accordance with the present invention in a distributed manner across the communications network, with different network nodes performing different functions. Each specialized function can be implemented by a separate data processing station in one embodiment. Or some of the functions can be implemented by the same network node so that a smaller number of data processing stations are used. Or a specialized function can be divided up and implemented by a number of separate data processing stations. In the preferred embodiment, these specialized functions (hereafter referred to as "specialized stations" since in the preferred embodiment each function is performed by a different network station) provide a means for guaranteeing that all stations on the network correctly receive— with substantially 100% reliability—all broadcasted messages. These specialized stations include:

(1) a general participant station;

(2) a retransmission station;
(3) a designated recorder station;
(4) a recorder playback station; and
(5) a management station (optional).

A physical transmission medium/system (e.g., a shared digital communications network) allows common access by all stations connected to it.

A general participant station (that may comprise of one or more personal computers, workstations, specialized or general purpose data processing stations) serves as a source or a destination of information, and determines which of the many group communications or conferences it participates in based on message protocol content (e.g., a conference number field in a special protocol message header of the preferred embodiment).

A retransmission station receives an input message from a general participant data processing station on a one-to-one basis, applies a special protocol message header to the input message, and retransmits (broadcasts) the message for reception by all the data processing stations. The receiving stations individually determine whether the message is received correctly. If there is no error in the received message, the receiving data processing station determines whether the message should be passed along (e.g., to an application program) based on the message header (e.g., conference number field, the sender identifier field, the message type field) or the actual information contained in the message in the preferred embodiment.

In accordance with a further feature of the present invention, guaranteed data reliability for one-to-many and/or many-to-many data communications is provided by introducing a new communications protocol which enables all data processing stations to independently detect missing or corrupted messages, and to receive or recover messages for any given group of (or from any individual) participating data processing stations. Missing messages are detected by examining a message sequence number field in the header of the special communication protocol in the preferred embodiment. Corrupted messages are detected via the CRC field or other error checking/correcting field in the preferred embodiment. The special protocol in the preferred embodiment also contains a time stamp field, a conference number field, a sender identifier field and some other fields. These fields permit any receiving station to recover, for example, all messages transmitted since a given date/time and/or to select messages based on conference number and/or sender.

A designated recorder station ensures messages sent from the retransmission station are correct. This designated recorder station effectively communicates with the retransmission station on a one-to-one basis across the broadcast network—with the message transmission from the retransmission station to the designated recorder station being listened to by all receiving stations. If the designated recorder station detects missed or corrupted messages, it requests the retransmission station to resend the message. This designated recorder station also acknowledges reception of messages from the retransmission station—and can thus slow down or speed up the retransmission station message rate in the preferred embodiment by varying the time interval it waits before it sends acknowledgement messages. The designated recorder station is guaranteed to receive correctly all messages sent by the retransmission station. These correctly received messages are stored by the designated recorder station in temporary storage.

A playback recorder station listens to and stores the messages from the retransmission station. This station comprises of one or more data processing stations (if more than one data processing station is used, some of the stations can selectively listen to and more or less permanently store messages based on message content and/or intended recipients, e.g., storing all messages with a certain conference number field value). If one of the playback recorder stations detects a missed or corrupted message, it waits to receive at least one more message in the preferred embodiment so that it can determine whether the error was due to the retransmission station or due to the way it received the message. If the error was due to the retransmission station, the designated recorder station should have detected the error and requested the message to be resent. If the error was due to playback station reception, the playback recorder data processing stations may request the correct information from the designated recorder stations using a guaranteed, reliable, one-to-one communication technique.

As mentioned previously, communication between the retransmission station and the designated recorder station also uses a guaranteed reliable one-to-one data communication technique. Thus, all the playback recorder data processing stations (which listen to this one-to-one data exchange) are guaranteed to have correct and complete records of the conferences they record. Because several playback recorder data processing stations may be used in the same network, the same data can be stored in more than one playback recorder data processing station to provide redundant message recording—so that the information can be retrieved from one playback recorder station when another station ceases to operate. If a general participant data processing station detects missing or corrupted messages, it may obtain the correct information directly from a playback recorder station using a guaranteed reliable one-to-one data communication technique. Thus, all general participant data processing stations are guaranteed to correctly receive all messages from the retransmission station even though they do not send acknowledgement messages directly to the retransmission station.

The playback recorder station also serves an archiving function in accordance with another feature of the present invention. A general participant data processing station can request, for example, all specific conference messages issued since a given date and time. If a general participant data processing station were to have been powered off for awhile, it can regain all missed conference messages when it is powered back on from this playback recorder station.

Optionally, there can be a management station that allows orderly start and stop of group communications or conferences. This station may also handle secure, confidential communications and perform user authentication, conference authorization, network error detection, encryption/decryption key distribution and data encryption for confidential conferences.

The specialized stations/functions provided by the present invention are distributed on the communications network to provide very efficient and guaranteed one-to-many communication. For example, a general participant data processing station may want to send the same message to 1,000 other data processing stations. The general participant station first obtains the use of a conference number (e.g., from the management station)

and then sends the message to the retransmission station using a guaranteed, reliable, one-to-one data communication technique. The retransmission station adds a special protocol header to the message and retransmits the message. The 1,000 intended receiving data processing stations listen to the retransmitted message and each selects the message based on the conference number field. Individual receiving stations that do not successfully receive the broadcasted message may request retransmission from the playback recorder station, so that the data is guaranteed to be received even if a particular receiving data processing station was busy or down when the message was initially broadcasted. Thus, in the best case, the data is sent only twice: once from the sending data processing station to the retransmission station; and a second time from the retransmission station to all other stations. (The fact that the data is sent twice is significant. Most prior art dealing with broadcasts try to achieve reliability by sending the data only once).

Guaranteed, reliable, efficient many-to-many data communications can be achieved very easily by a small enhancement to the above described one-to-many technique. The 1,000 data processing stations can all write to the same conference (specified by the same conference number) using the above described one-to-many technique. These 1,000 data processing stations can communicate with one another with guaranteed reliability.

It is also possible to provide additional features to the basic technique, such as to provide security features using the management station. Conferences can be made confidential and the data can be made readable only by a selected group of participant data processing stations through the use of authentication and encryption. There can even be conferences where only certain participant data processing stations can write and many other participant data processing stations are only allowed to read.

Arbitrator Node

In accordance with a further very important feature of the present invention, an arbitrator node is used to provide guaranteed reliable data communications while avoiding the need for explicitly doing message sequencing and message acknowledgements.

As is well known, two possible errors may arise when data is sent from one computer to another: (a) the message or packet may be lost (e.g., never received); or (b) the message or packet may be distorted or corrupted and therefore received only incorrectly. Message sequencing techniques may be used to detect loss of messages, while error checking techniques (e.g., CRC) may be used to detect corruption of messages. As explained above, message acknowledgements may be used to further ensure proper reception of data and to ensure that the sending node does not send messages faster than the receiving node can receive them (i.e., for "flow control"). Generally, it was in the past thought to be essential to provide message sequencing and/or message acknowledgements to achieve reliable data communications.

In accordance with a further very important feature of the present invention, neither message sequencing nor message acknowledgements are explicitly used and guaranteed reliable data communications is nevertheless provided. This concept is radically different from the prior art and provides many advantages including increased efficiency in the use of network bandwidth and in the control of "catastrophic jamming."

In accordance with this feature of the invention, an "arbitrator node" is provided on the network. The functions provided by this arbitrator node may be explained in a simplified manner using the following analogy to a human conference. In a human conference there are many participants talking in turn (or sometimes simultaneously). Different participants may "hear" different things even though all participants are in the same room. A moderator may be appointed to summarize the discussion from time to time and provides an "official version" of the discussion for all to hear. Thus, the moderator may from time to time interrupt the ongoing conversation and says the "official version" for all to hear. All participants adhere to the "official version."

The arbitrator node feature of the present invention uses this general concept to ensure that all other nodes are guaranteed to have received each message transmitted on the network.

In accordance with this feature, each receiving node on the network maintains a "summary" or "history" of messages it receives. A special node (called the "arbitrator node") also continually monitors the message traffic on the network and maintains its own "summary" or "history" of all messages transmitted over the network. From time to time (e.g., periodically), the arbitrator node transmits a message specifying the arbitrator node's summary of messages (i.e., a history of messages received by the arbitrator node since the last time the arbitrator node transmitted a message). Each network node compares the "summary" message it receives from the arbitrator node with its own summary based on the messages the node actually received from the network.

If a node determines there are differences between the messages it actually received and the messages the arbitrator node received, the node assumes the messages it received as being in error, disregards those messages, and requests a message recovery mechanism (e.g., a playback record node or the arbitrator node) to retransmit those messages.

Hence, this aspect of the present invention provides guaranteed reliable data communication without requiring the explicit use of either acknowledgements or message sequencing.

Note that this arbitrator node invention can be applied to one-to-one data communications as well. If node A sends a message to node B, node B does NOT send back an acknowledgement. Instead, both node A and node B wait for the arbitrator message. After examining the arbitrator message, node A is assured that its message is sent. However, node A does not know whether node B has immediately received the message. After examining the arbitrator message, node B can then start to process the message received from node A. This has an advantage that node A never waits for node B which means node B can be slow, busy or even turned off. However, this has the disadvantage that node A does not know when node B has received its message unless an additional confirmation message is sent from node B to node A. This example clearly shows why and how the arbitrator node invention is different from prior art. Many optional, additional features can be added to the arbitrator node invention. Some of these include:

(a) total control of network resources by arbitrator node if $m=1$;

(b) variable value of received message slot number for the arbitrator node (m is variable);

(c) reservation of future message slots via information specified in the arbitrator node message;

(d) accepting multiple messages from one single sender;

(e) adding of message priority schemes;

(f) facilitating recovery of error messages by the use of global message sequence numbers;

(g) detection of node failures via sender node reservation timeouts; and (h) global network flow control to reduce congestion and to improve through put.

These improvements will be discussed in detail after the description of the arbitrator node embodiment.

Guaranteed reliable one-to-many and/or many-to-many data communications will have great impact on how data processing stations should be designed and used. In many existing applications, one-to-many and/or many-to-many data communications is desirable—but much less efficient one-to-one communications techniques were used in the past because of the lack of guaranteed reliability of known broadcast/multicast techniques. Guaranteed reliability must be available first before useful applications can be developed. Why is guaranteed reliability so heavily emphasized? In some applications, the need for absolutely guaranteed reliability is obvious. For example, in the example of software distribution, even if a few bits out of a few million are received in error, the software program received would be totally worthless. Using it may risk corruption of the data processing station or even the entire network.

Some experiments were done by the inventor to illustrate the effect of reliability. An IBM PC/AT computer was used to receive datagram broadcast messages from an IBM PC computer on the Ethernet. That is, messages were broadcasted without error checking nor message acknowledgement. The speed of the IBM PC is much slower than that of the IBM PC/AT. The error rate was about 1 in 100,000 messages transferred. This is very respectable. Then the IBM PC was used to receive datagram broadcast messages from the IBM PC/AT. The IBM PC lost 60% of the messages because it could not keep up with the IBM PC/AT. In other words, if the sender is fast and the receiver is slow, the receiver will lose messages no matter how reliable or error free the hardware may be.

In a typical real life environment, some of the user stations are much less powerful than others and are most likely less powerful than the mainframe or the minicomputers. The situation of the sender broadcasting at a rate faster than a slow receiver can handle could easily arise. There are very few real life situations that can survive a message loss rate of over 60%.

This is one of the key reasons that unless guaranteed, reliable one-to-many or many-to-many data communication technique is available, a lot of the real life applications based on broadcast are not possible.

Guaranteed, reliable, efficient one-to-many or many-to-many communications has remained an unsolved problem until now—but not because there is no need for them. In fact, once reliable one-to-many or many-to-many data communications can be guaranteed, many new and/or improved uses of data processing stations will result. Examples of such new or improved uses include:

(1) Stock Market Trading Systems
(2) Software Distribution
(3) Teaching or Demonstrations
(4) Communication with an Unknown Group of Receivers
(5) Network Management
(6) Network Security Monitoring
(7) Computer Conferencing
(8) Support of Different Companies
(9) Backup Systems
(10) Hot Standby Systems
(11) On-Line Transaction Processing
(12) Distributed Databases
(13) Corporate Information Systems
(14) Processing Control Systems
(15) Parallel Processing Type Applications
(16) Any other application that benefits from reliable one-to-many and/or many-to-many data communications.

These examples will be discussed in detail in the section on USES OF THE PRESENT INVENTION.

BRIEF DESCRIPTION OF THE DRAWINGS

These and other features and advantages of the present invention may be better and more completely understood by referring to the following detailed description of presently preferred exemplary embodiments in connection with the appended sheets of drawings, of which:

FIG. 41 shows exemplary additions data structures for the retransmission computer;

FIG. 43 shows exemplary message control block which is used to keep track of the activities between the retransmission computer and the general participant computer on network A as specified in FIG. 40;

FIG. 45 shows exemplary additional data structure for the, designated recorder computer;

FIG. 46 shows an exemplary message control block which is used to keep track of the activities between the designated recorder computer and the retransmission computer on network B as specified in FIG. 44;

FIG. 47 shows an exemplary message control block which is used to keep track of the activities between the designated recorder computer and the playback recorder computer on network A as specified in FIG. 44;

FIG. 49 shows exemplary additional data structure for the playback recorder computer;

FIG. 62 is an exemplary system to handle software distributions with the present invention;

FIG. 63 is an exemplary system to handle teaching or demonstrations with the present invention;

FIG. 64 is an exemplary system to handle communication with unknown group of receivers with the present invention;

FIG. 65 is an exemplary system to handle network management functions with the present invention;

FIG. 66 is an exemplary system to handle network security monitoring with the present invention;

FIG. 67 is an exemplary system to handle computer conferences with the present invention;

FIG. 74 is an exemplary system to handle corporate information systems with the present invention;

FIG. 75 is an exemplary system to handle process control systems with the present invention;

FIG. 76 is an exemplary system to handle patent searches with the present invention;

FIG. 87A is exemplary message format of a sender message used by the embodiment shown in FIG. 83;

FIG. 87B is an exemplary message format showing the reservation feature of the embodiment shown in FIG. 83;

FIG. 88 is a flowchart of exemplary program control steps performed by a receiver node in the embodiment shown in FIG. 83;

DETAILED DESCRIPTION OF PRESENTLY PREFERRED EXEMPLARY EMBODIMENTS

The detailed description of presently preferred exemplary embodiments is organized as follows in order to facilitate more rapid and easy understanding of the concepts of the present invention by those skilled in the art.

First, the structure of the presently preferred exemplary embodiment of a communications system S in accordance with the present invention is described in connection with FIG. 1.

The overall method by which the FIG. 1 embodiment communicates messages is now described in connection with FIG. 2.

Figure 3:
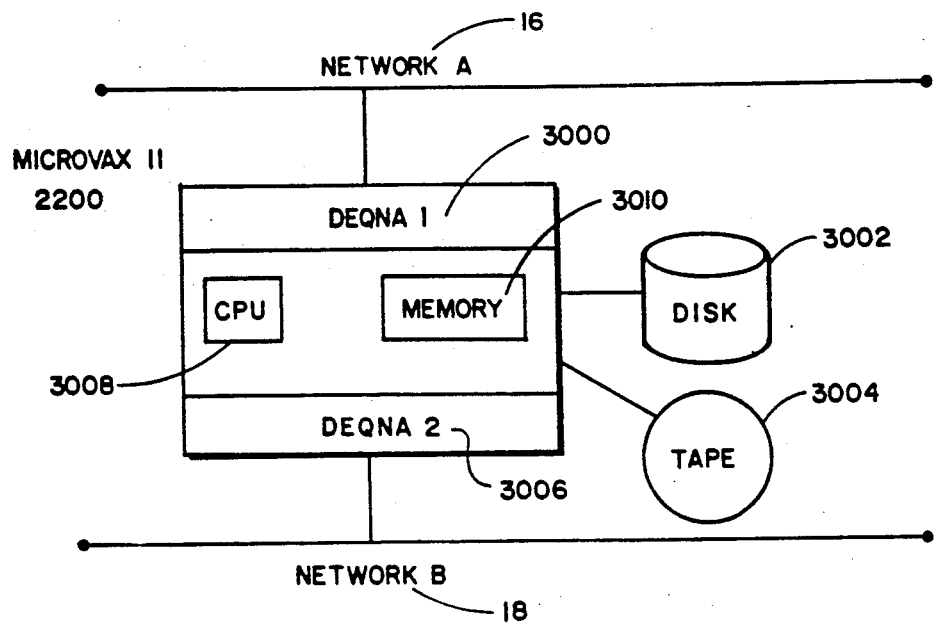
FIG. 3 is an exemplary hardware configuration of the structure of an exemplary station shown in FIG. 1.

The hardware configuration of the various stations are then described in connection with FIG. 3.

Next, the exemplary message protocol used by the preferred embodiment is described in connection with FIG. 4.

The operation of the FIG. 1 embodiment is then discussed in connection with the flowcharts of exemplary program control steps and the schematic illustrations of exemplary data structures shown in FIGS. 5-33 and 40-59.

Additional embodiments of the present invention providing alternate network architectures and/or combining multiple functions within the same network station are then discussed in connection with FIGS. 34-39.

After description of the various alternate embodiments, some additional features of the present invention are discussed, including:

exemplary error recovery techniques;

exemplary techniques for using the present invention in satellite communications in which transmission delay is an important factor;

exemplary techniques for using the present invention in network environments in which broadcast capability is not explicit (e.g., token ring networks);

exemplary hardware arrangements which may improve the efficiency of the system; and exemplary techniques by which an application programmer or the end user may interface to the communications system provided by the present invention.

exemplary uses of the present invention (described in connection with FIGS. 60-76).

The operation of an arbirtator node embodiment will then be explained. This arbitrator node embodiment has many advantages over the other embodiments except in the case of satellite communications.

A FIRST EMBODIMENT PROVIDED BY THE PRESENT INVENTION

Figure 1:
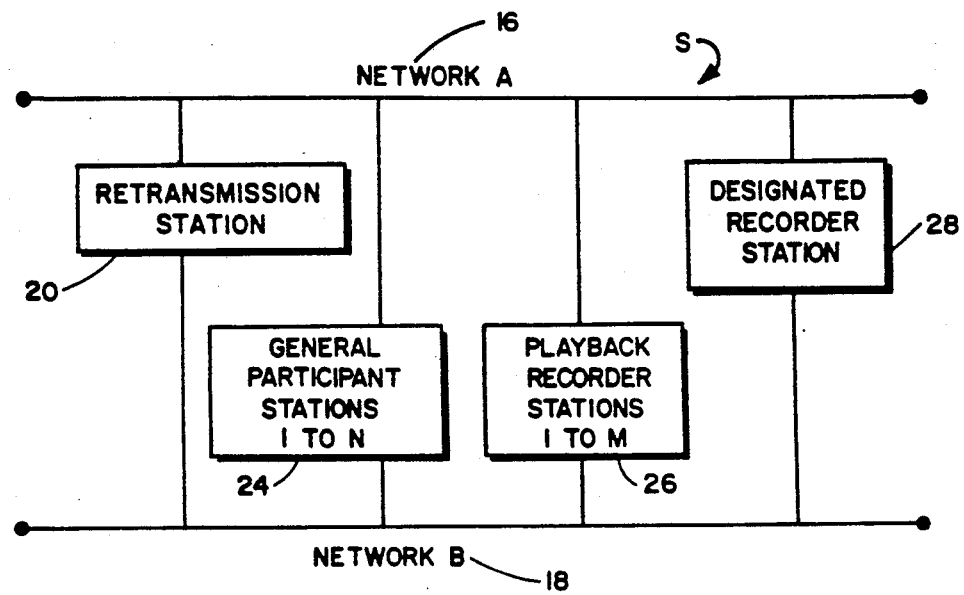
FIG. 1 is a schematic diagram of the presently preferred exemplary embodiment of a communications system S in accordance with the present invention.
Figure 2:
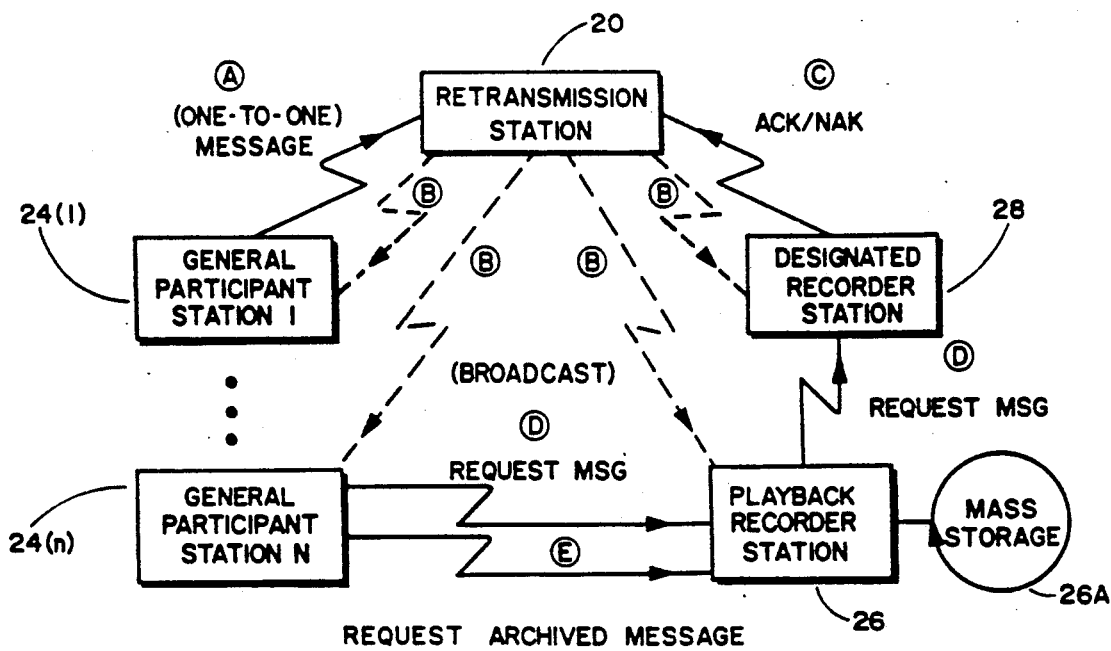
FIG. 2 is a schematic diagram illustrating typical communications exchanges in the FIG. 1 system.

FIG. 1 is a schematic block diagram of a first presently preferred exemplary embodiment of a communications system S. Communications system S is implemented in a two-bus network configuration including a network A16 and a network B18.

This embodiment shown in FIG. 1 provides the following system functions:

(a) a retransmission function (performed by a retransmission station 20);

(b) a designated recorder function (performed by a designated recorder station 28);

(c) a playback recorder function (performed by playback recorder stations 1 to M at 26); and (d) general participant functions (performed by general participant stations 1 to N at 24).

In the FIG. 1 embodiment, each major function provided by the system S in accordance with the present invention is implemented by one or more separate network stations (each of which comprise a separate computer in the preferred embodiment, as will be explained). No management function or station is included in the FIG. 1 embodiment because—as will be explained—conference numbers are preassigned and only nonconfidential conferences are supported.

In order to make the invention as clear as possible and to reduce the need for a lot of experimentation, specific hardware and operating system software for the first embodiment are described here. However, it should be noted that the invention can be implemented on almost any type of computer with any operating system. The only requirement is that such a computer must support a communication interface that can access a shared communication facility. Examples of such include token rings, Ethernet, radio, microwave and satellite networks.

In the first embodiment, the hardware to be used is as follows:

(a) Both network A16 and network B18 are Ethernets.

(b) All the computers (retransmission computer 20, designated recorder computer 28, playback recorders 26 and general participant computers 24) are microVAX II computers from Digital Equipment Corporation.

(c) The Ethernet communication interfaces are DEQNAs, also from Digital Equipment Corporation.

(d) The operating system software is VAX/VMS. The reasons for the above choice are as follows:

(a) MicroVAX II has proven to be reliable.

(b) A MicroVAX II can support two DEQNA communication interfaces.

(c) VAX/VMS operating systems provides and fully documents use of system services to:
   send and receive messages with the DEQNA communication interface;
   set timers;
   handle keyboard interrupts.

(d) VAX/VMS is a multiuser, multitasking operating system which would be necessary for testing of the other embodiments (2 to 8). These embodiments reduces the number of computers used by putting many functions on a single computer.

(e) VAX/VMS provides excellent program development tools.

(f) VAX/VMS already allows a privileged program to select messages based on protocol type or group (multicast) address.

(g) VAX/VMS already has good one-to-one communication capability in DECnet. Implementing the present invention on VAX/VMS can demonstrate:
   coexistence with other network software (DECnet in this case);
   large performance improvement over other network software (DECnet in this case) for one-to-many or many-to-many applications.

(h) To keep hardware simple and exchangeable, all microVAX IIs will have identical configuration, namely:
   MicroVAX II processor;
   four megabytes of memory;
   two DEQNA interfaces;
   two hard disks each of which can store 100 Megabytes of data or more;
   one or more terminals;
   a device to load the operating system software such as the TK50 (also from Digital Equipment Corporation)

It should be noted that the present invention can be implemented on computers from other vendors (such as IBM, Apple, Wang, Unisys, Sun, etc.). In fact, the invention is extremely suitable for communication in a mixed vendor environment.

The embodiment shown in FIG. 1 is somewhat simplified in its functionality in that it is based on the following assumptions or limitations (which would be appropriate for many applications but inappropriate for some applications):

(a) All conferences are preassigned and known to all participants. Conference numbers 1 to 10 are reserved for system use, and conference numbers 10,000 and up are available for nonconfidential conferences;

(b) Only nonconfidential conferences are supported;

(c) Upon the occurrence of fatal errors, the whole system S just stops and waits for attention by an operator;

(d) There are no system resource errors such as memory buffers, disk storage or disk read/write errors (these errors can be handled using entirely conventional techniques well known to those of ordinary skill in this art);

(e) The one-to-one communication technique used is a simple conventional communication technique known to those skilled in this art.

There are two separate networks in system S embodiment shown in FIG. 1: network A16 and network B18. All stations 20, 24, 26, 28 have two separate communication interfaces, one connected to network A16 and the other connected to network B18. Network A16 is used for one-to-one communications and is capable of supporting many pairs of these one-to-one communications simultaneously by resolving conflicts using conventional network technology (e.g., by use of the conventional Ethernet protocol).

Network B18 shown in FIG. 1 is a special network in the preferred embodiment used only for broadcast messages. The only pair of network stations which communicate with one another (and are each capable of transmitting messages) over network B18 is the retransmission station 20 and the designated recorder station 28. All other stations just listen to this single pair of stations 20, 28 conversing with one another over network B. The network technology required for this network B18 is much simpler than that required for network A16—as there is only one pair of one-to-one communications between the retransmission station 20 and the designated recorder station 28 (and thus no conflicts with other stations can arise). All other stations can be thought of as simply tapping in or listening to the conversation between these two stations. The implementation can use standard communication interfaces for the retransmission station 20 and the designated recorder station 28. The communication interfaces for all the other computers are even simpler. They do not need to have the transmission logic at all—just receive logic. In actual real life implementation, people may choose to have the same kind of network for both network A16 and for network B18 for redundancy purposes. That is, if network A16 fails, network B18 can serve as the backup and vice versa.

Guaranteed, reliable one-t-many communication can be achieved as follows:

(a) Referring to FIG. 1, a general participant station 24(1), for example, wants to send the same message to general participant stations 24(2)–24(N). General participant stations 24(1) first sends the message to the retransmission station 20 using a guaranteed, reliable, one-to-one communication technique on network A16. The general participant station 24(1) also specifies that the conference number 10,000 is to be used.

Figure 4:
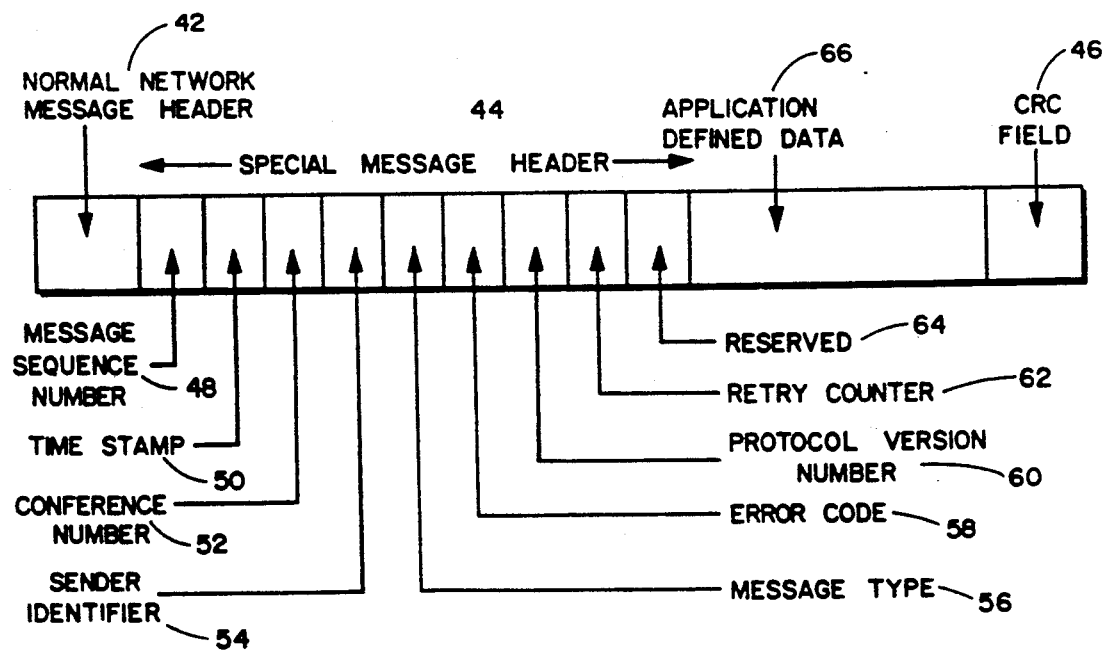
FIG. 4 is a schematic diagram of an exemplary message format of the communications protocol used by the FIG. 1 embodiment.

(b) The retransmission station 20 changes the message to a special format such as that shown in FIG. 4. The retransmission station 20 then retransmits the message on network B18 to the designated recorder station 28. Since all of the other stations 24, 26 are also monitoring communications on network B18, retransmission station 20 in effect broadcasts the message to all stations at the same time it transmits to the designated recorder station 28.

The designated recorder station 28 ensures that the transmitted message is correct by sending a message back to the retransmission station 20 over network B18 acknowledging the correct reception of the message. It also stores the correctly received messages for a short period of time (for example, less than 10 minutes). Because of the message acknowledgement and the error detection mechanism used in the preferred embodiment, the designated recorder station 28 is guaranteed to receive all messages from the retransmission station 20 correctly (with a theoretical undetected error probability of $10^{-13}$).

Meanwhile, all stations listen to the communication between the retransmission station 20 and the designated recorder station 28 because they are physically connected to network B18. Each of these stations can detect whether it has missed a message by examining the message sequence number field 48 in the special message header 44 (see FIG. 4).

For example, if a station receives messages 1, 2, 3, 4, 6, it knows that it failed to receive message 5. Thus, missing messages can always be detected by examining the message sequence number field 48. Of course, messages may be corrupted or distorted as well as completely not received, such errors are detected by a well known technique called cyclic redundancy check (CRC), which requires the transmitting data processing station to examine the data to be transmitted and comes up with a CRC value 46 which is appended to the message to be transmitted.

Turning now briefly to FIG. 4 (a schematic block diagram of an exemplary special message protocol for messages transmitted by the retransmission station 20 in accordance with the presently preferred exemplary embodiment of the present invention), all messages transmitted by the retransmission station in the preferred embodiment include three parts:

(1) Network header field 42 (contents determined by the specific type of network B being used);

(2) Special message header 44 (generated by the retransmission station 20); and (3) an error checking/correction field 46.

Briefly, the special message header 44 includes the following fields (see FIG. 4):

(i) Message sequence number field 48 (assigned by the retransmission station in accordance with the sequence the messages are transmitted by the retransmission station);

(ii) Time stamp field 50 (the time and date upon which the retransmission station initially transmits the message);

(iii) Conference number field 52 (in the preferred embodiment, the retransmission station assigns this field value in accordance with the identification and/or conference number information provided by the general participant station 24 originating the message, and the field value is used by receiving general participant stations to determine whether or not they are intended recipients of the message);

(iv) Sender identifier field 54 (this field contains a unique identifier associated with the general participant station 24 originating the message);

(v) Message type field 56;

(vi) Error code field 58;

(vii) Protocol version field 60;

(viii) Retry counter field 62 (used by the retransmission station 20 to indicate the number of times the currently transmitted message has been repeated in response to a negative or no acknowledgement by the designated recorder station 28);

(ix) a reserved field 64; and (x) a data field 66 (the contents of this field typically are generated by the originating general participant station and constitutes the useful message data to be communicated).

After reception of the message, the receiving station uses the same CRC technique to examine the data and comes up with a CRC value. If this CRC value is the same as that sent by the transmitting station, the message is accepted as correct. If this CRC value is different from that sent by the transmitting station, the message is treated as distorted or having a CRC error.

Using the error detection techniques described above, a general participant station 24 can always detect whether messages received from the retransmission station 20 are complete and correct. If a general participant station 24 detects an error, it tries to get the correct information from a playback recorder station 26. Note that there is no message acknowledgement from a general participant station 24 to the retransmission station 20. Thus, if there were no errors, general participant computers 24 can just listen to the messages sent from the retransmission station 20 to the designated recorder station 28, disregarding all messages except those with conference number 10,000. This means the general participant computers 24(2)-24(N) can all receive the messages originated by the general participant station 24(1). If errors occur, the playback recorder station 26 will get involved.

(c) A playback recorder station 26 acts in many ways like a general participant station 24. The playback recorder station 26 listens to the messages sent from the retransmission station 20 to the designated recorder station 28 over network B; and it also sends no message acknowledgement back to the retransmission station 20. However, a playback recorder station 26 is responsible for recording all messages belonging to one or more conferences on a mass storage medium 26A. The recorded messages may be kept for days, weeks, months or even years. The storage medium may be disks, tapes or any other medium. The new write once read many times (WORM) laser technology may be used.

There is preferably more than one playback recorder station 26 used to record a particular conference. Thus, even if a playback recorder station 26 recording conference 10,000 goes down, the information is still available from another playback recorder station. The actual recording technique used in a playback recorder station 26 may vary. Sequential recording and retrieval is only one of the many possible techniques. A playback recorder station 26 may also serve as a file server for a number of general participant computers 24 and the actual recording technique used may be specific to the file server.

If a playback recorder station 26 detects that there is a missing message from the retransmission station 20 to the designated recorder station 28, it recovers the missed message from the designated recorder station 28 using a guaranteed, reliable, one-to-one communication technique on network A16 (at "C"). If a playback recorder station 26 detects a distorted message (or a message with CRC error), it does not record this distorted message. Instead, it waits for the next message and treats the distorted message as if it were lost.

(d) A general participant station 24 can have guaranteed reception of all messages from the retransmission station 20. If a general participant station 24 detects an error, it can request the missed messages from a guaranteed reliable playback recorder station 26 using a guaranteed, reliable one-to-one technique over network A16. Furthermore, a general participant station 24 can be turned off for many days or weeks. When it is turned back on, it can request the playback recorder station 26 to transmit to it all the missed messages during the time it was turned off. This is possible because of the sequence number field 48 and the time stamp field 50 in the special message header 44 as shown in FIG. 4. The software on the general participant station 24 records the last correctly received message with the time stamp 50 and the message sequence number 48 information before the general participant station 24 is turned off. After the general participant station 24 is turned back on, it first requests a playback recorder station 26 to recover all missed messages before it listens on network B18 again. Thus, general participant stations 24(2)-24(N) are guaranteed to receive the messages from general participant station 24(1) on conference 10,000, and guaranteed, reliable one-to-many data communication is achieved.

It is very easy to modify the scheme described above to achieve guaranteed, reliable, many-to-many data communications. General participant stations 24 can all write to conference 10,000. The special message header 44 as shown on FIG. 4 includes a sender identifier field 54 to identify the actual sender. Thus, general participant stations 24 can communicate amongst themselves or achieve many-to-many data communication by sending and/or receiving messages on conference 10,000. Guaranteed, reliable, many-to-many data communication is achieved.

DETAILED DESCRIPTION OF THE RETRANSMISSION STATION

FIGS. 40 to 43 show the data structures used by the retransmission station. The data structures are arranged as follows:

(a) Values that do not change dynamically, such as component name 802, node address table 804;

(b) Values that change as the program runs, such as CRC error count 822, message received on network A flag 858;

(c) Pointers to other data structure, such as message control block 834, message block 913.

A message control block is a data structure used to manage the message traffic between a pair of stations for a particular conference. For example, message control block 834 manages the message traffic between the retransmission station 20 and the designated recorder station 28. In this case, the conference number 884 has no significance. For message control block 836, the conference number 884 will contain the number 10000. If another conference, such as conference 10200, is also present between the retransmission station 20 and the general participant station 24(1); a separate message control block will be used to manage this conference 10200.

Figure 58:
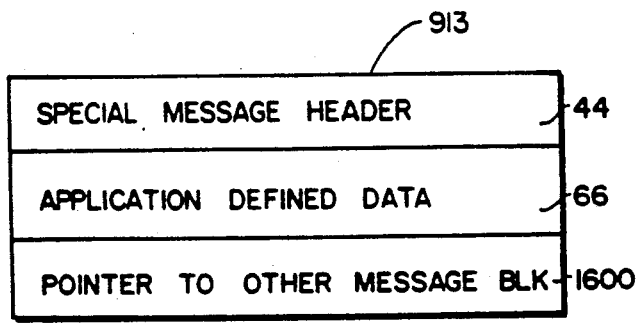
FIG. 58 shows an exemplary message block for all of the stations shown in FIG. 1.
Figure 59:
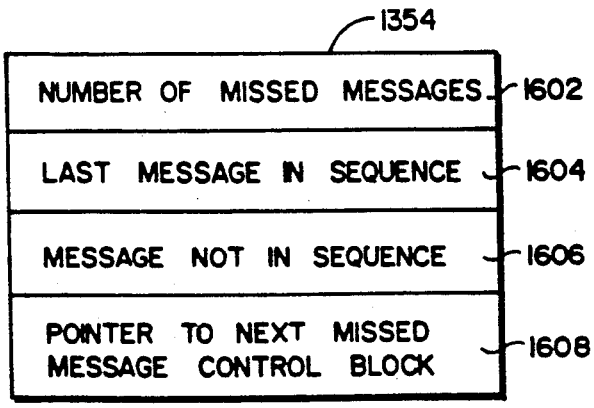
FIG. 59 shows an exemplary missed message control block for all of the stations shown in FIG. 1.

A message block contains the actual message and a pointer to the next message block. FIG. 58 shows the actual format of the message block.

Note that data structures are designed to be common for all the various stations. As a result, there may be fields within a particular data structure marked as not used.

Figure 5:
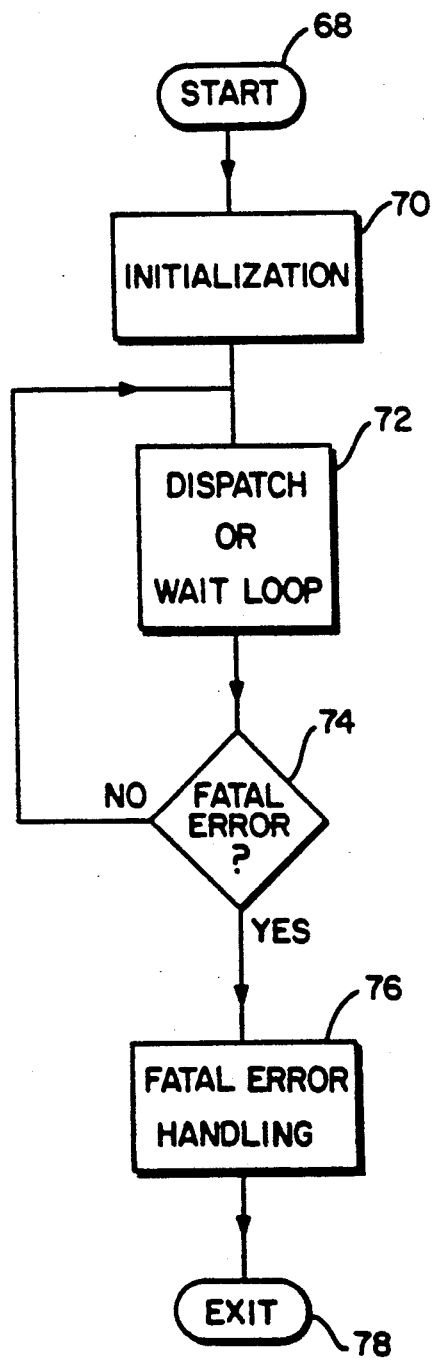
FIG. 5 is a schematic logic flow diagram of exemplary program control steps performed by the retransmission station shown in FIG. 1.

FIGS. 5-11 are flowcharts of exemplary program control steps performed by the retransmission station 20 shown in FIG. 1. In FIG. 5, the overall system logic flow for the retransmission station is shown. When the retransmission station 20 is started, there would be some one time setup code that would be done in the initialization 70 portion of the processing. However, the main processing is done in the dispatch or wait loop 72 portion of the processing. If there were no fatal errors, the dispatch or wait loop 72 portion of the processing is repeated again and again.

The retransmission station 20 waits for some event such as reception of a message to occur (the MSG received on network A flag 858 or MSG received on network B flag 860 is set) and then dispatches to a special processing routine to handle the event. At the end of the special processing routine, control returns back to the main line of processing and if there were no errors, the retransmission station 20 waits for the next event as shown on FIG. 5. If there are fatal errors, control is passed to the fatal error handling 76 portion for processing. The program exits after the fatal error processing in the embodiment shown.

Figure 6:
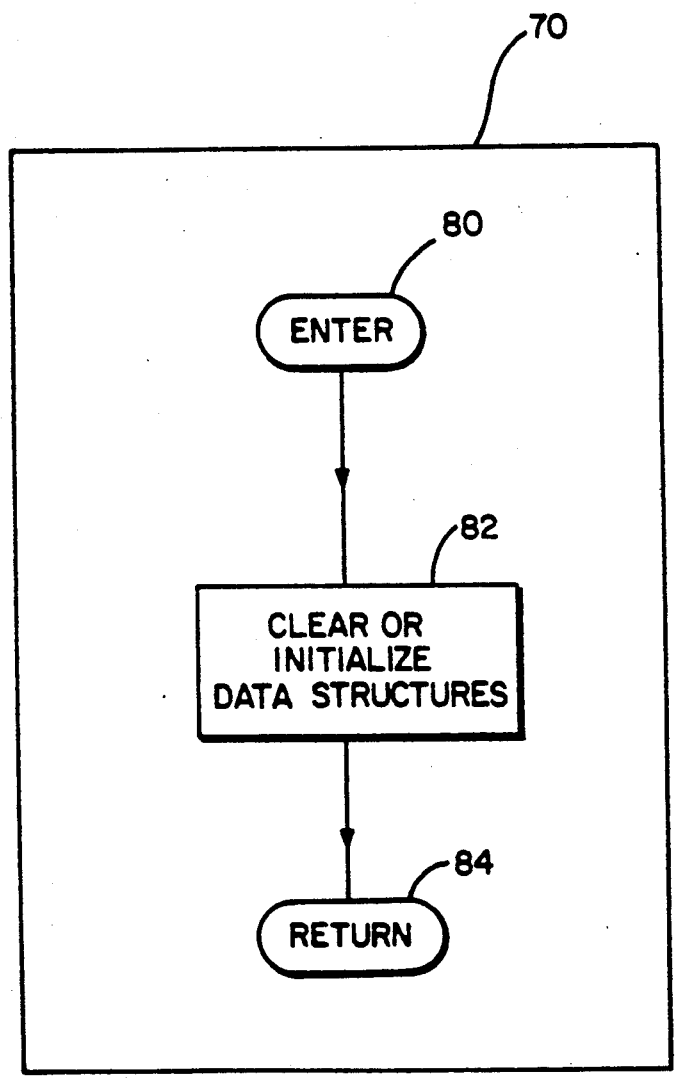
FIG. 6 is a detailed schematic flow diagram of the initialization block shown in FIG. 5.

FIG. 6 shows the initialization 70 portion of the processing in greater detail. Note that a box is drawn around the whole processing to show that this is just one of the processing boxes as shown on FIG. 5. The processing is very simple—clear or read in some initial values for data structures. This initialization process consists of the following:

set up a message control block list which consists of the message control block for DRC 834, message control block for GPC1 836, message control block for GPC2 838, . . . , message control block for GPC n 840;

set every counter in the data structures to 0;

set the ready to send flag 904 to true, all other flags are set to false;

set all pointers other than the pointer to the message control block list 832 to null.

Figure 7:
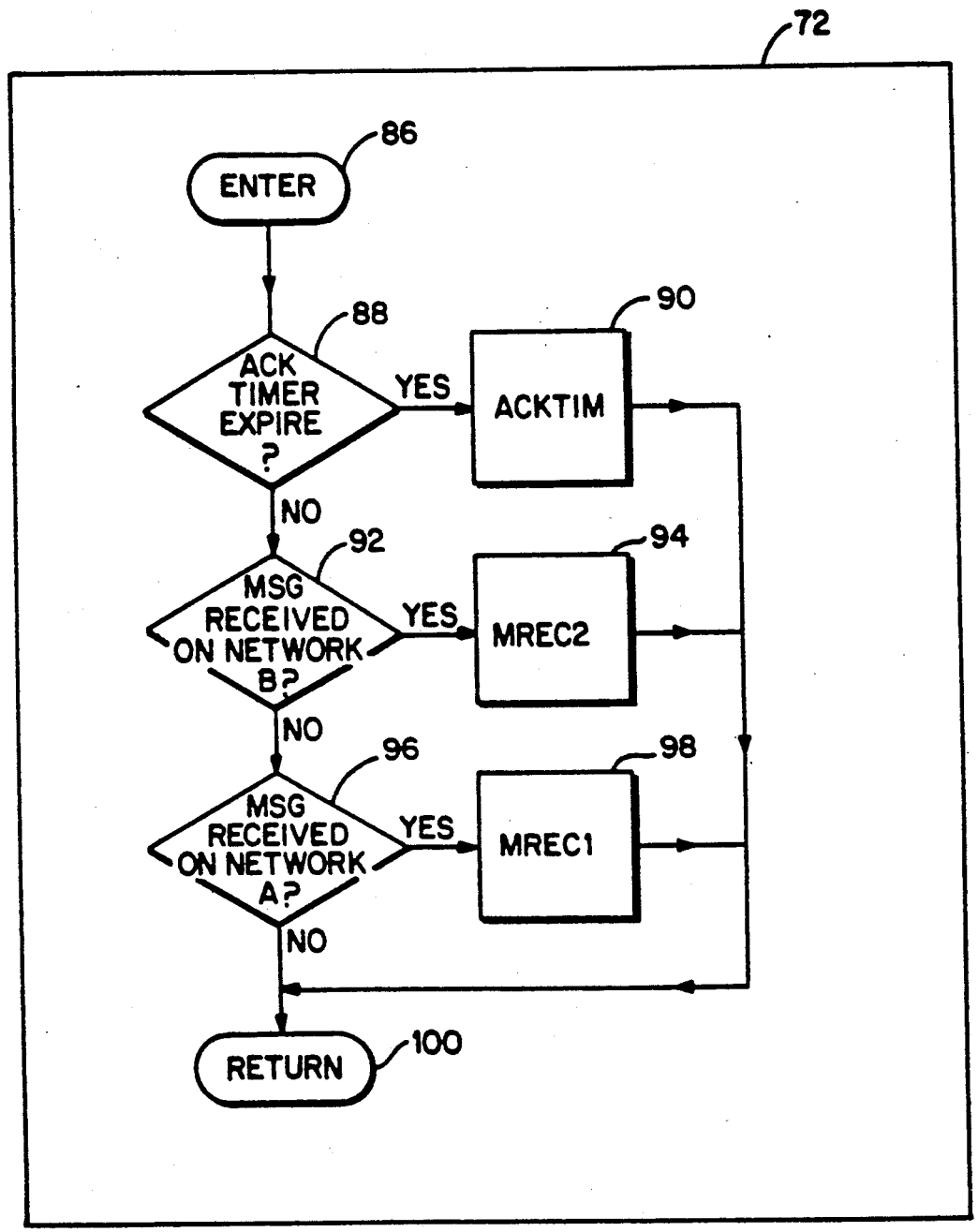
FIG. 7 is a detailed schematic flow diagram of the dispatch and wait loop block shown in FIG. 5.

FIG. 7 shows the dispatch or wait loop 72 portion of FIG. 5 in greater detail. The events to be handled by the retransmission station 20 are as follows:

(1) The retransmission station 20 uses an acknowledgement timer in order to test for lost or distorted messages. After the retransmission station 20 sends a message on network B18, it starts a timer. Normally, the acknowledgement message from the designated recorder station 28 is expected to arrive before the timer expires. In case of a lost or distorted message, the designated recorder station 28 does not send an acknowledgement message. The timer would expire (the ACK timer expired on network B flag 866 would be set) and the last unacknowledged message 913 is resent (as tested for by decision block 88). This message can be picked up by using the pointer to last sent message 902 in the message control block for DRC 834. The processing routine which sends the message is called ACKTIM 90.

(2) Decision block 92 tests for a message received on network B18. This generally means the designated recorder station 28 is sending an acknowledgement message. The processing routine used to handle received messages is called MREC2 94.

(3) Decision block 96 tests for a message received on network A16 (generally indicating a general participant station 24 is trying to communicate with the retransmission station 20 for the purpose of requesting the retransmission station 20 to broadcast a new message on network B18). The processing routine to handle messages received on network A16 is called MREC1 98. Note that the decision processing steps deal with expiration of acknowledgement timer first, followed by reception of message on network B18 and then reception of message on network A16—this is done relative to their relative priority in real life situations.

Figure 8:
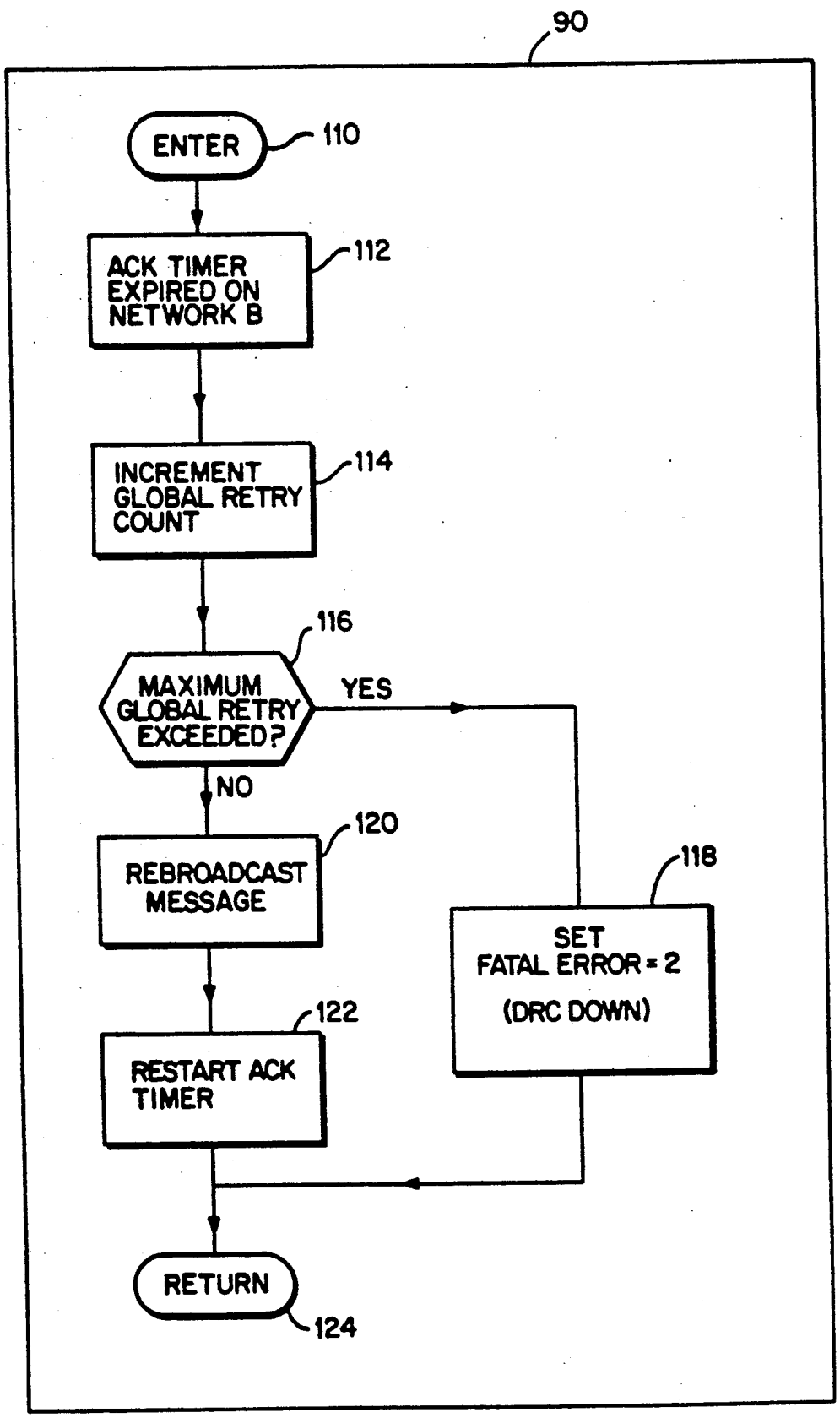
FIG. 8 is a detailed schematic flow diagram of the processing routine block ACKTIM shown in FIG. 7, which is executed when the acknowledgement timer expires.

FIG. 8 shows the processing routine ACKTIM 90. This processing routine is entered when the acknowledgement timer expires (generally indicating that the designated recorder station 28 failed to send an acknowledgement message back to the retransmission station 20). The failure may be due to CRC or missing messages either from the retransmission station 20 or from the designated recorder station 28. The retransmission station 20 tries to rebroadcast the previously sent message (at block 120), but there is a limit to how many times it can keep trying. If the limit (maximum retry limit 854) is exceeded (as tested for by blocks 114, 116), the error is regarded as fatal. This occurs if the designated recorder 28 is down or there are unrecoverable hardware errors. On fatal error, a fatal error indicator (fatal error number 824) is set (block 118) and no more rebroadcast occurs.

Figure 9:
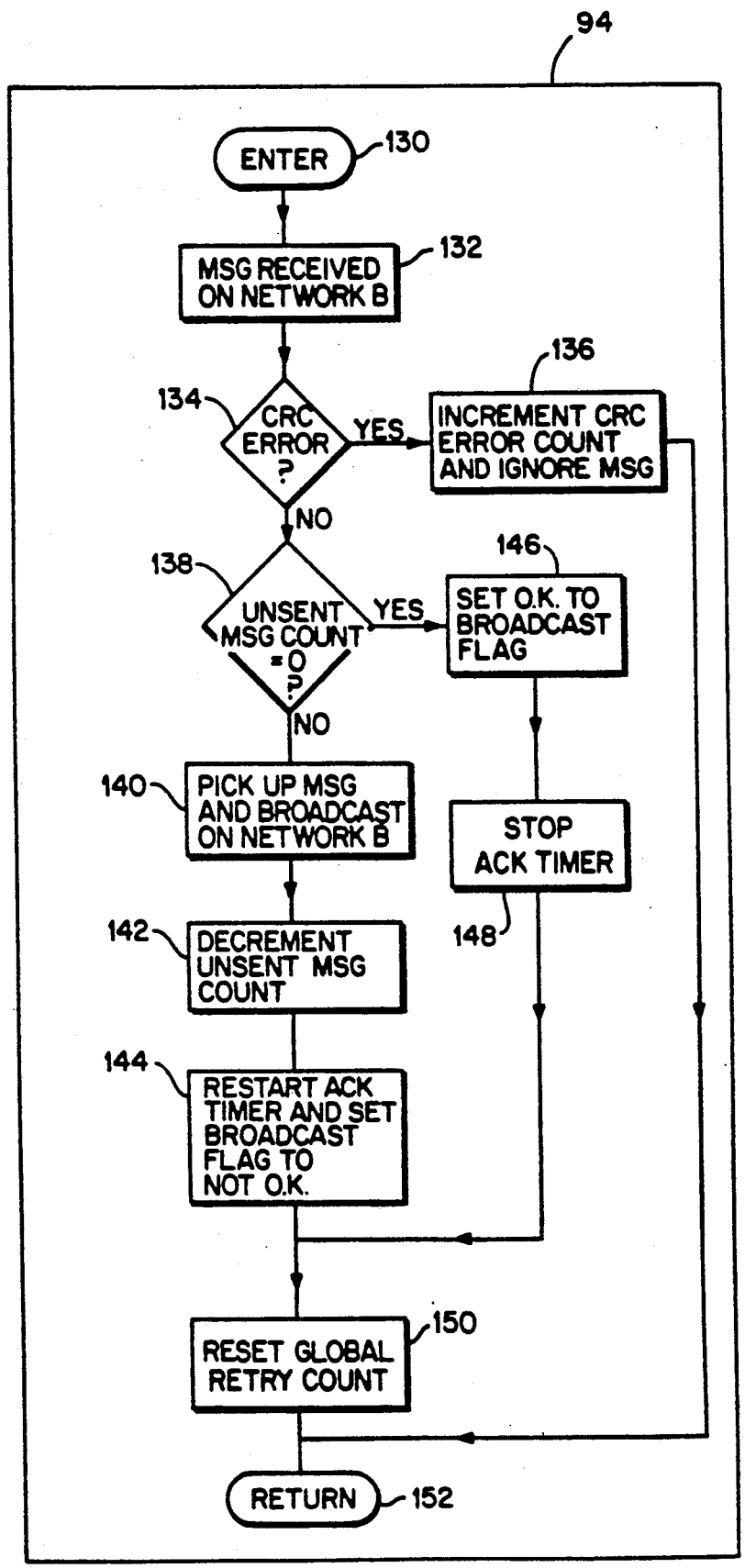
FIG. 9 is a detailed schematic flow diagram of the processing routine MREC2 shown in FIG. 7, which is performed after a message is received on network B.

FIG. 9 shows the processing routine MREC2 94. This processing routine is entered when there is a message received on network B18. This generally means that an acknowledgement message has arrived from the designated recorder station 28. CR error handling is very simple. The CRC error is recorded and the message is discarded and ignored completely (blocks 134, 136). Suppose the message with the CRC error is an acknowledgement message from the designated recorder station 28. If this message is ignored, the acknowledgement timer as discussed in the processing routine ACKTIM 90 will expire and the retransmission station 20 will send out the unacknowledged message again.

After receiving an acknowledgement message from the designated recorder station 28, the retransmission station 20 is ready to broadcast the next message on behalf of one of the general participant stations 24. The messages from these general participant stations 24 are placed into a queue when they are received and are thus waiting to be processed and broadcasted. This queue is pointed to by the pointer to unsent message list 896 in the message control block for DRC 834. If there are no messages in the queue waiting to be processed and broadcasted (tested for by decision block 138), the retransmission station 20 just sets the ready-to-send flag 904 to indicate that the next message from a general participant station 24 can be sent immediately when the retransmission station 20 receives it on network A16 and does not need to be put onto a queue (block 146). The acknowledgement timer is cancelled (block 148) as an acknowledgement message has come in. If there are messages in the queue waiting to be processed and broadcasted, the retransmission station 20 will broadcast the next message in the queue (blocks 140-144). The message that was just broadcasted is taken out of the queue and pointed to by the pointer to last sent message 902; the acknowledgement timer is restarted; the ready to send flag 904 is set to false; send retry count 892 is reset to 0 and the unsent message count 894 is decremented by one.

Figure 10:
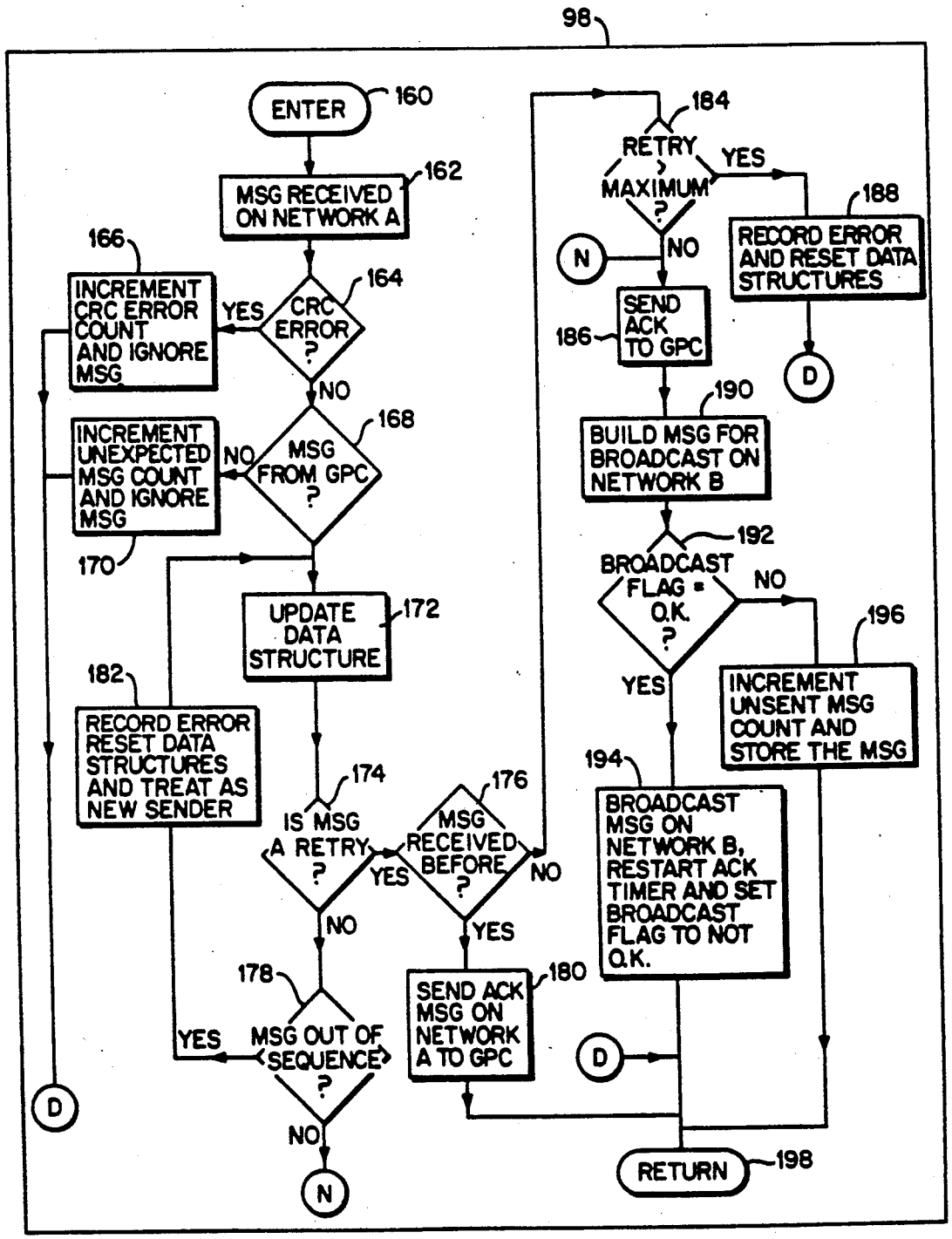
FIG. 10 is a detailed flow diagram of the processing routine MREC1 shown in FIG. 7, which is performed after a message is received on network A.

FIG. 10 shows the processing routine MREC1 98. This processing routine is entered when there is a message received on network A16. This generally means that a general participant station 24 is trying to send a message to the retransmission station 20 for broadcasting. CRC error handling is very simple. The CRC error is recorded and the message is discarded and ignored completely (blocks 164, 166). Suppose the message is a request to send from a general participant station 24 (tested for by decision block 168). If this message is ignored, there will be no acknowledgement message sent back to the general participant station 24 to indicate that the retransmission station 20 has accepted its request. The general participant station 24 will resend the request once more. It is possible for the retransmission station 20 to receive the same request from a general participant station 24 more than once (tested for by blocks 174, 176). This may occur if the retransmission station 20 is busy and fails to send the acknowledgement message within the acknowledgement timer expiration period. The general participant station 24 then sends the same request again assuming the previous request is lost. However, this fact will be noted in a retry count field 62 in the special message header 44.

In the one-to-one communication between the retransmission station 20 and a general participant station 24 on network A16, it is possible for messages to go out of sequence (tested for by decision block 178). This is possible because a general participant station 24 may go down anytime. When it is restarted, it may have lost the information regarding the last message sequence exchanged with the retransmission station 20. Because of the one-to-one message acknowledgement scheme, out of sequence messages are acceptable in this situation. If there were no errors, the retransmission station 20 sends an acknowledgement message back to the general participant station 24 (block 180) and tries to build and send the broadcast message (block 190). If it cannot send the message on network B18 immediately, it may put the message in a queue. A message is picked out from this queue every time an acknowledgement message is received from the designated recorder station 28 on network B18 as described in processing routine MREC2 94.

Figure 11:
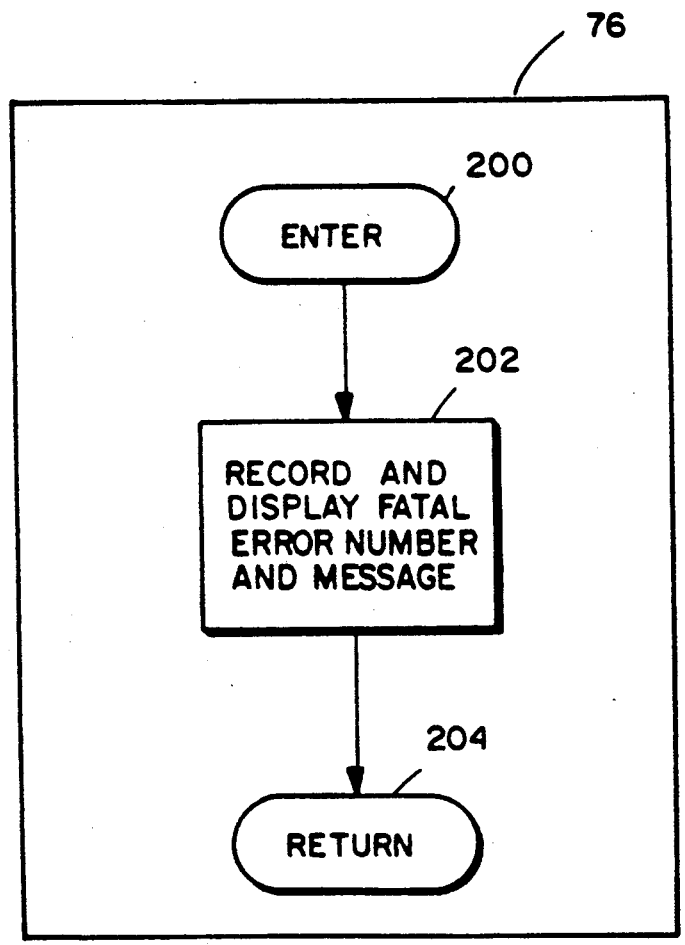
FIG. 11 is a detailed flow diagram of the fatal error handling block shown in FIG. 5.

FIG. 11 shows the fatal error handling routine 76 for the retransmission station 20. The fatal error considered here is the failure to receive acknowledgement message from the designated recorder 28. This can be caused by problems with the designated recorder station 28 or hardware problems dealing with message reception at the retransmission station 20. The fatal error handling here is very simple. A message is displayed (block 202) and then the program exits which means the whole conference stops.

DESCRIPTION OF THE DESIGNATED RECORDER STATION 28

Figure 44:
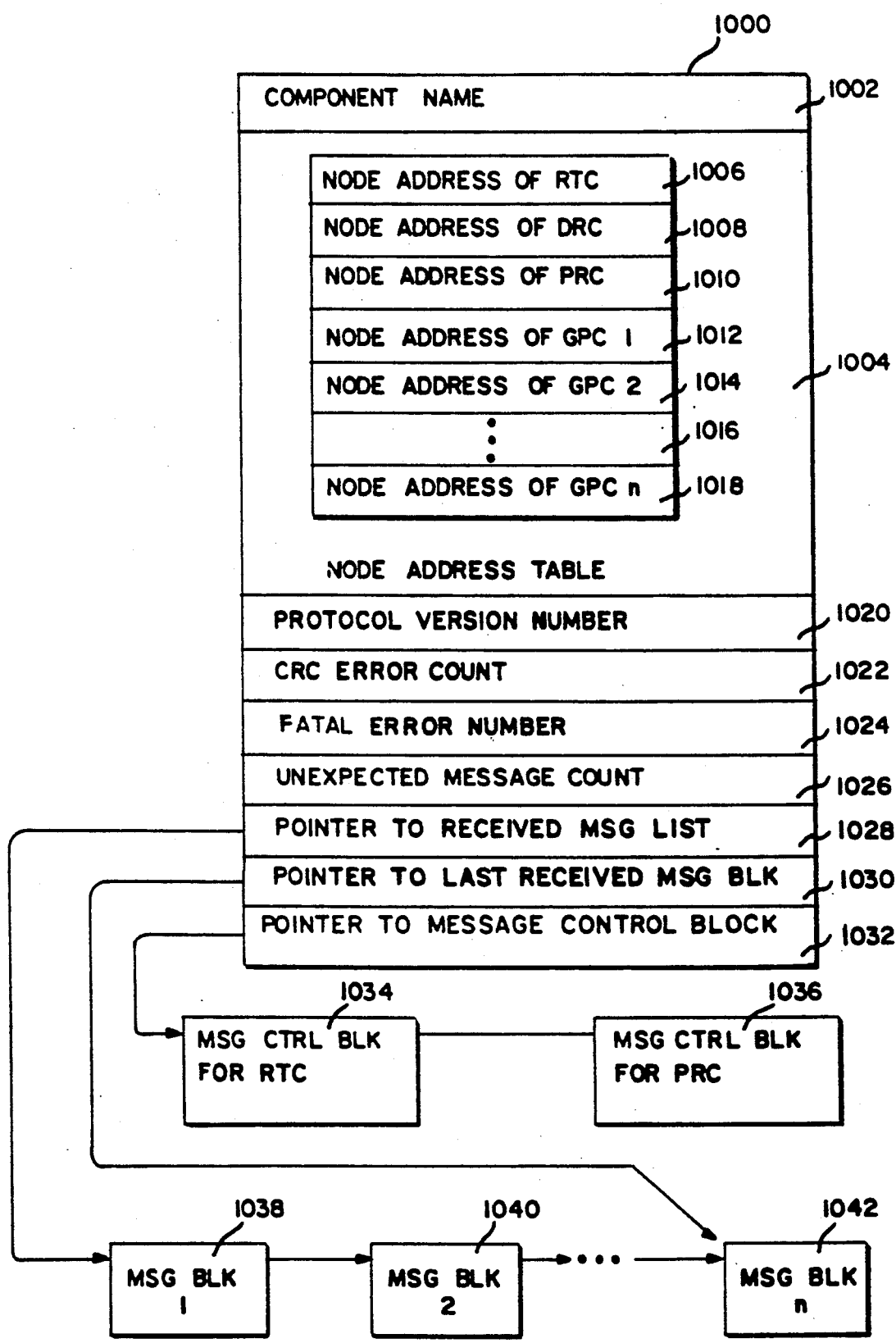
FIG. 44 shows exemplary data structures for the designated recorder computer.

FIGS. 44-47 show the data structures used by the designated recorder station 28. FIGS. 44 and 45 show the main data structures. FIGS. 46-47 describe these data structures in detail. These data structures are similar in format to those for the retransmission computer 20.

FIGS. 12 to 17 describe the detailed operation of the designated recorder computer 28. The main functions of the designated recorder station 28 in the preferred embodiment are:

(1) to ensure that the messages sent from the retransmission station 20 are received in sequence and that the messages are not distorted. This is achieved by sending an acknowledgement message to the retransmission station 20 after reception of a good message from the retransmission station 20. If the message contains CRC errors, no acknowledgement message is sent. The retransmission station 20 is expected to resend the message after an acknowledgement time out period as discussed in FIG. 8. Out-of-sequence messages are treated as fatal software errors and the program exits.

(2) to store messages temporarily for the possible use by the playback recorder stations 26. The playback recorder stations 26 normally get the messages directly from network B18. However, if they detect errors, they ask the designated recording station 28 to send them the correct messages.

Figure 12:
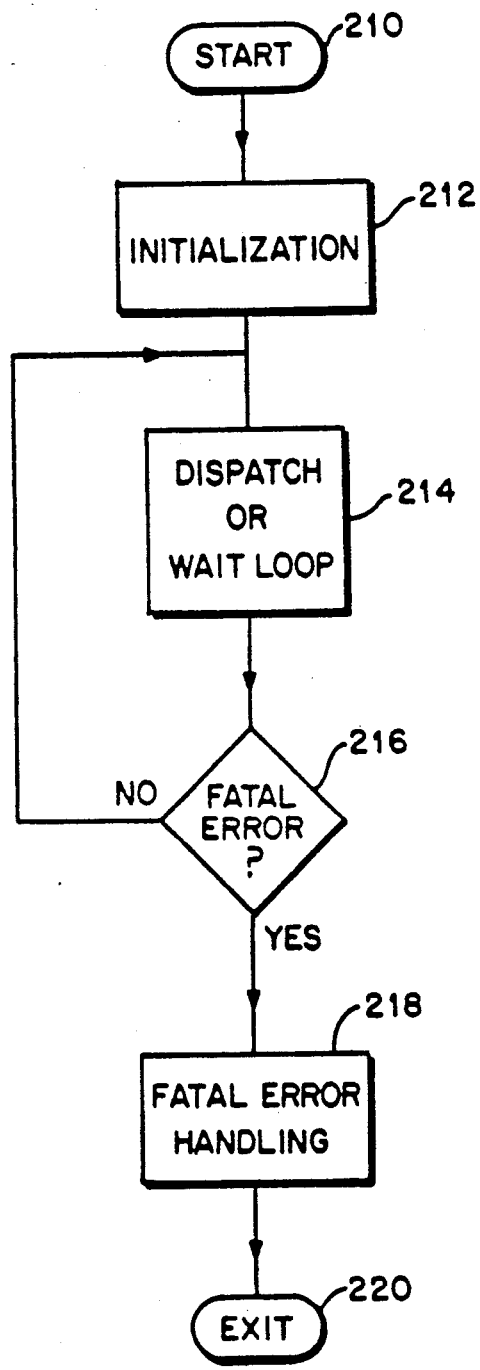
FIG. 12 is a schematic flow diagram of exemplary program control steps performed by the designated recorder station shown in FIG. 1.

FIG. 12 shows the overall system logic flow for the designated recorder station 28. When the designated recorder station 28 is started, there is a one time setup routine that is performed in the initialization 212 portion of the processing. However, the main processing is performed in the dispatch or wait loop 214 portion of the processing. If there are no fatal errors, the dispatch or wait loop 214 portion of the processing is repeated again and again. If there are fatal errors, control is passed to the fatal error handling 218 portion for processing. The program exists after the fatal error processing.

Figure 13:
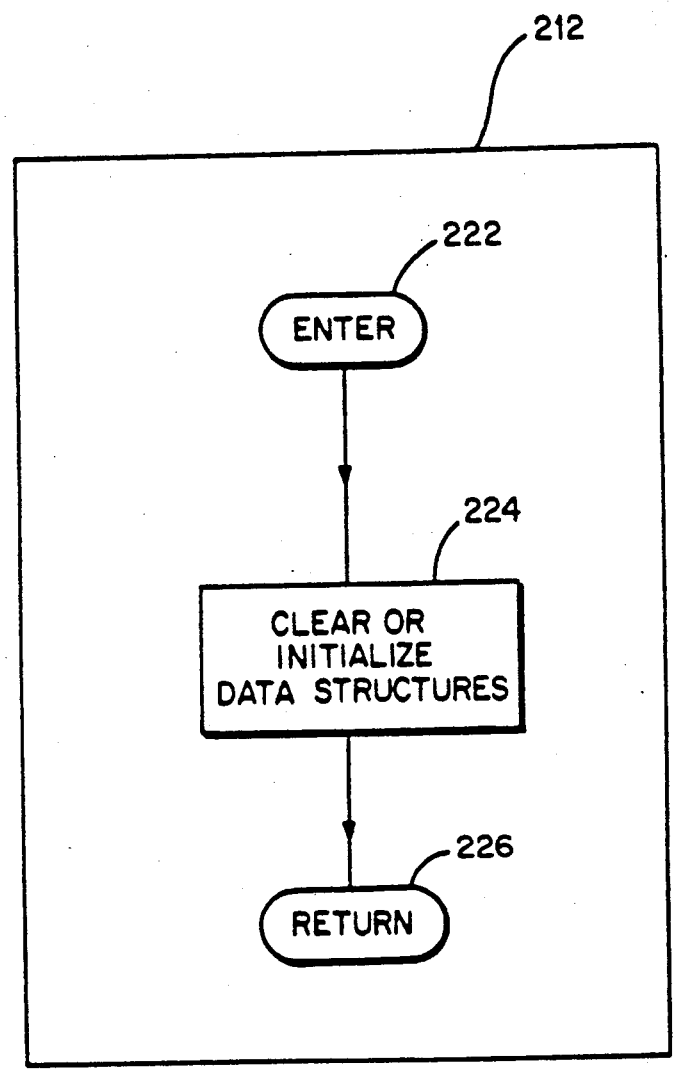
FIG. 13 is a detailed flow diagram of the initialization block shown in FIG. 12.

FIG. 13 show the initialization 212 portion of the processing in greater detail. The processing consists of the following steps:
  set up message control block list which consists of the message control block for RTC 1034 and the message control block for PRC 1036;
  set every counter in the data structures to 0;
  set ready-to-send flag 1104 to true, all other flags are set to false;
  set all pointers other than the pointer to the message control block list 1032 to null.

Figure 14:
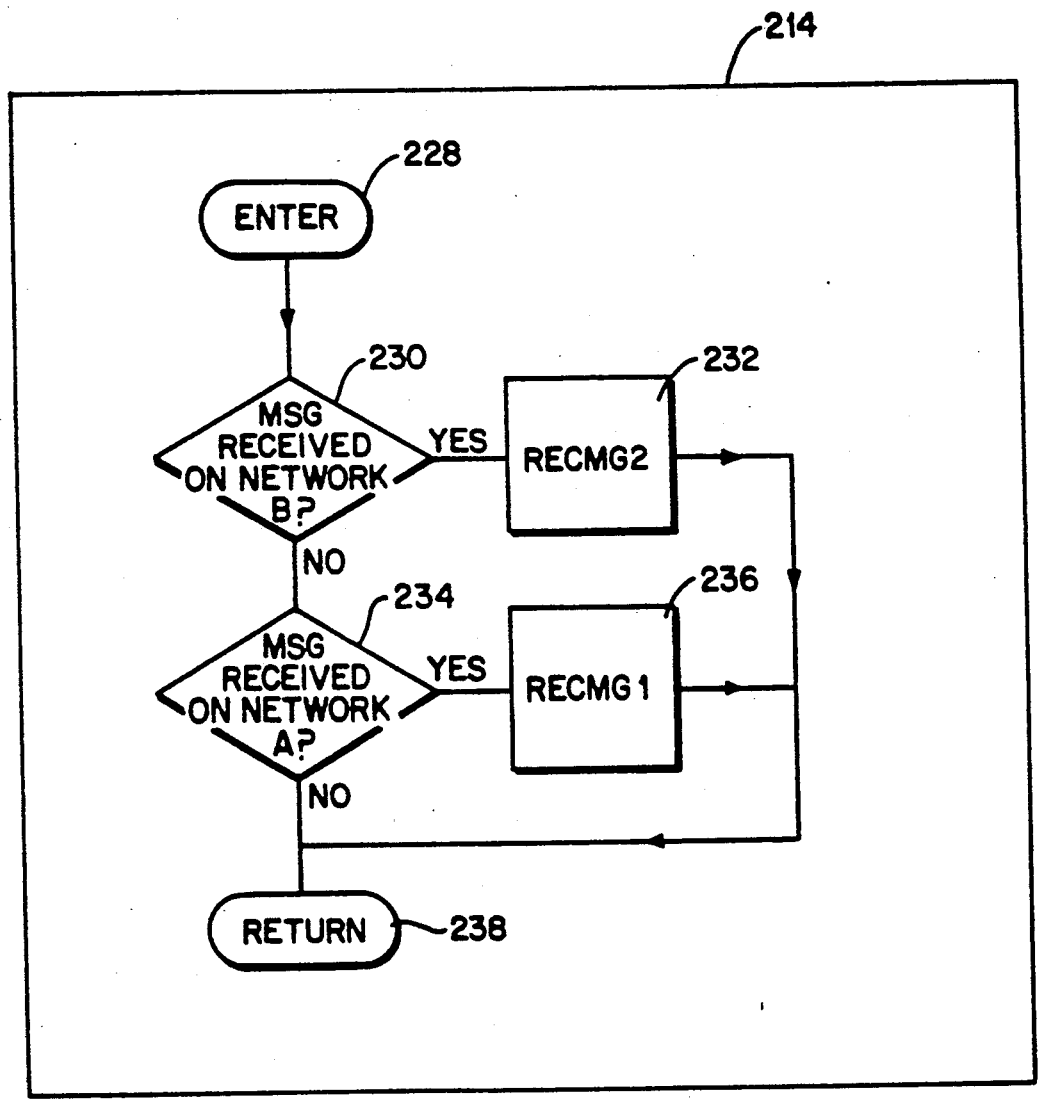
FIG. 14 is a detailed block diagram of the dispatch and wait loop box shown in FIG. 12.

FIG. 14 shows the dispatch or wait loop 214 portion of FIG. 12 in greater detail. The events to be handled by the designated recorder station 28 are as follows:

(1) A message is received on network B18 (block 230)—typically from the retransmission station 20. A processing routine called RECMG2 checks to see if the message contains CRC errors. If not, an acknowledgement message is sent.

(2) A message is received on network A16 (block 234). This generally means a request message has been received from one of the playback recorders 26 to retrieve a lost message. The processing routine which handles this type of message is called RECMG1 236.

Figure 15:
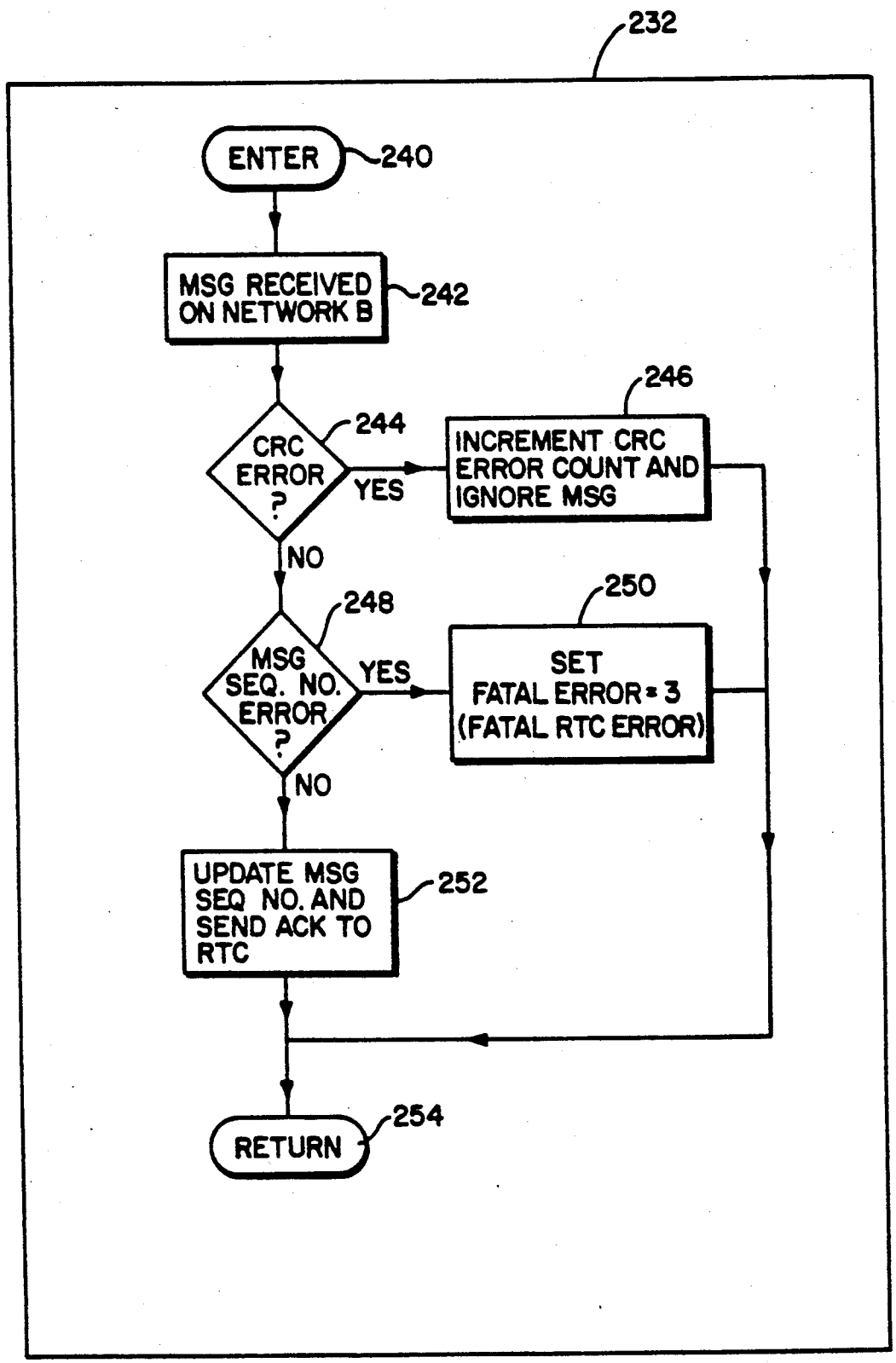
FIG. 15 is a detailed block diagram of the processing routine RECMG2 shown in FIG. 14, which is executed when a message is received by the designated recorder station.

FIG. 15 shows the processing routine RECMG2 232. This processing routine is entered when there is a message received on network B18 by the designated recorder station 28 (decision block 230 of FIG. 14). This generally means a message has arrived from the retransmission station 20. CRC error handling is very simple. The CRC error is recorded and the message is discarded and ignored completely (blocks 244, 246). Suppose the message is a message from the retransmission station 20. If this message is ignored, the acknowledgement timer as discussed in the processing routine ACKTIM 90 on the retransmission station 20 will expire. The retransmission station will then resend the message with the retry count 62 increased by 1.

Out-of-sequence messages should never happen and are regarded as fatal (blocks 248, 250). The whole system would have to be shut down in the preferred embodiment. If no errors are detected, an acknowledgement is sent back to the retransmission station 20 (block 252).

Figure 16:
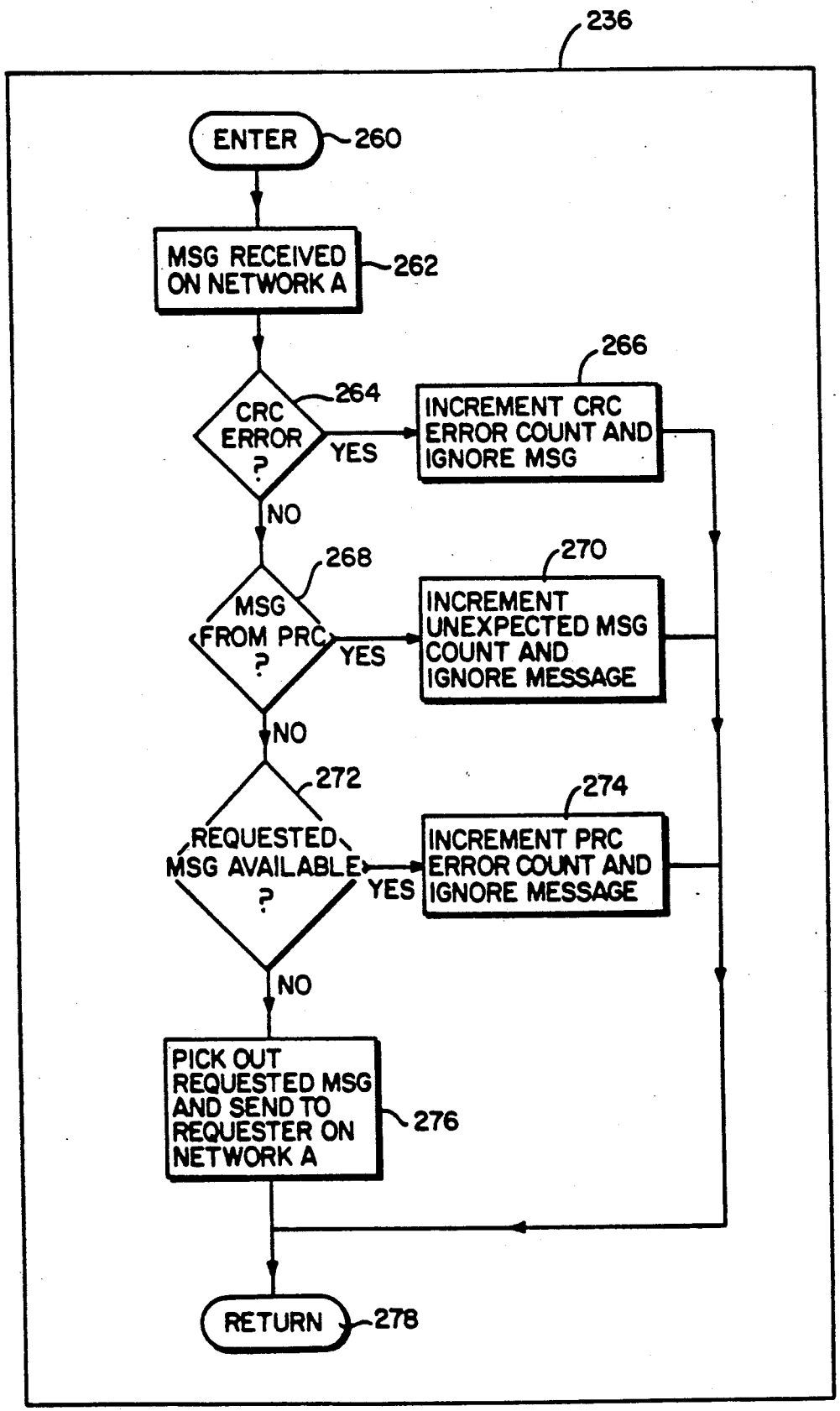
FIG. 16 is a detailed flow diagram of the processing routine RECMG1 shown in FIG. 14, which is executed when a message is received from one of the playback recorder stations on network A.

FIG. 16 shows the processing routine RECMG1 236. This processing routine is entered when there is a message received on network A16 (decision block 234, FIG. 14). This generally means that a playback recorder station 26 is requesting a missed message. CRC error handling is very simple. The CRC error is recorded and the message is discarded and ignored completely (blocks 264, 266). Suppose the message is a request message from a playback recorder station 26. If this message is ignored (blocks 268, 270), the acknowledgement timer (as will be discussed in the processing routine ACKTMO 312) will expire and the request message will be resent again. If there are no errors, the missed message as specified in the request message is retrieved from memory buffer or from temporary storage and sent to the requesting playback recorder station 26 (block 276).

Figure 17:
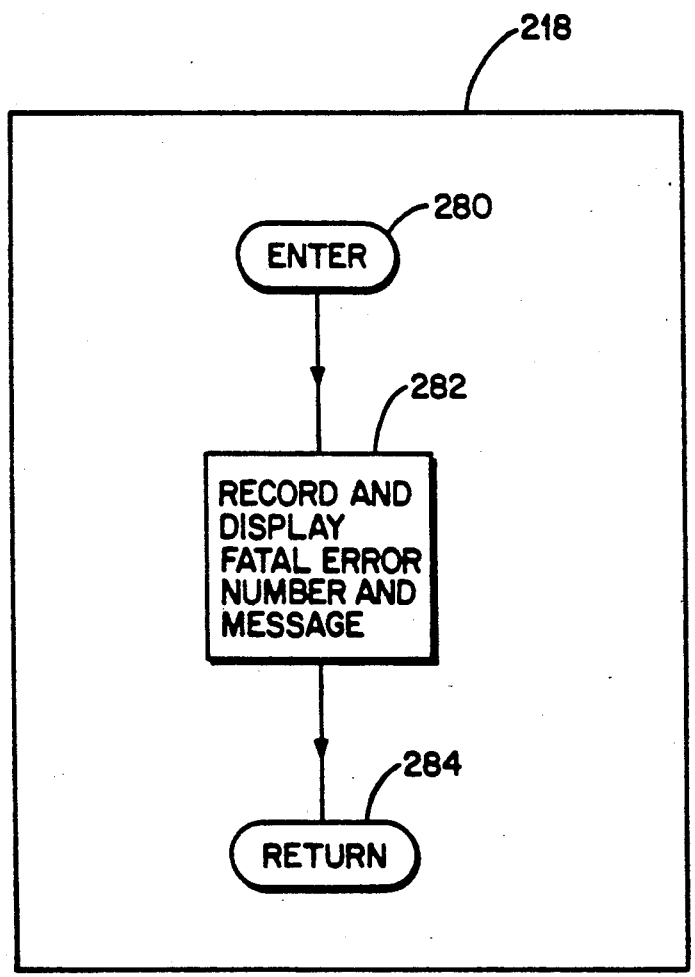
FIG. 17 is a detailed flow diagram of the fatal error handling block shown in FIG. 12.

FIG. 17 shows the fatal error handling routine 218 for the designated recorder station 28. The fatal error considered here is the out-of-sequence messages from the retransmission station 20. This would be a major, fatal software bug. The fatal error handling here is very simple. A message is displayed and then the program exits which means the whole conference stops (block 282).

DESCRIPTION OF A PLAYBACK RECORDER COMPUTER 26

Figure 48:
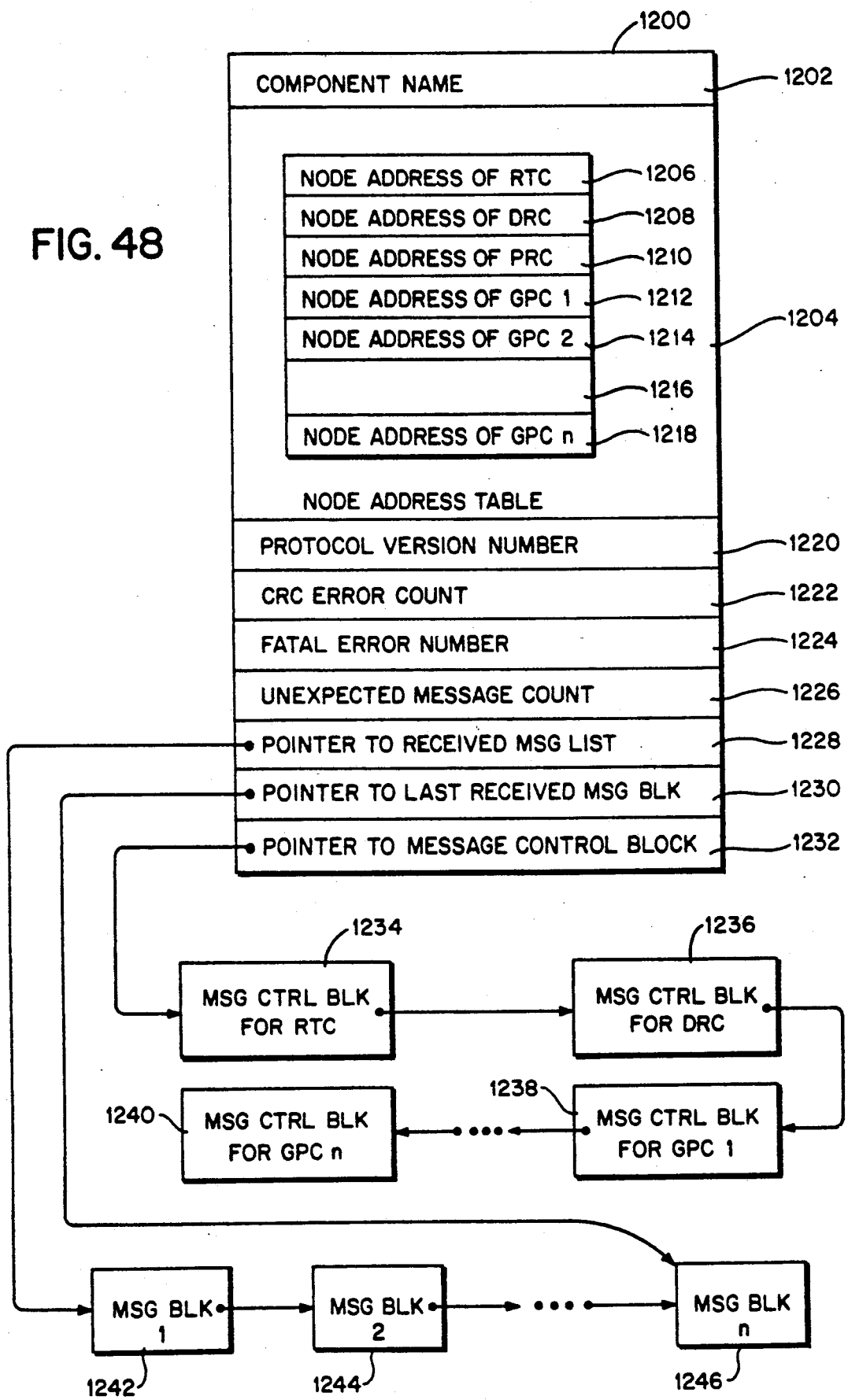
FIG. 48 shows exemplary data structures for the playback recorder computer.
Figure 50:
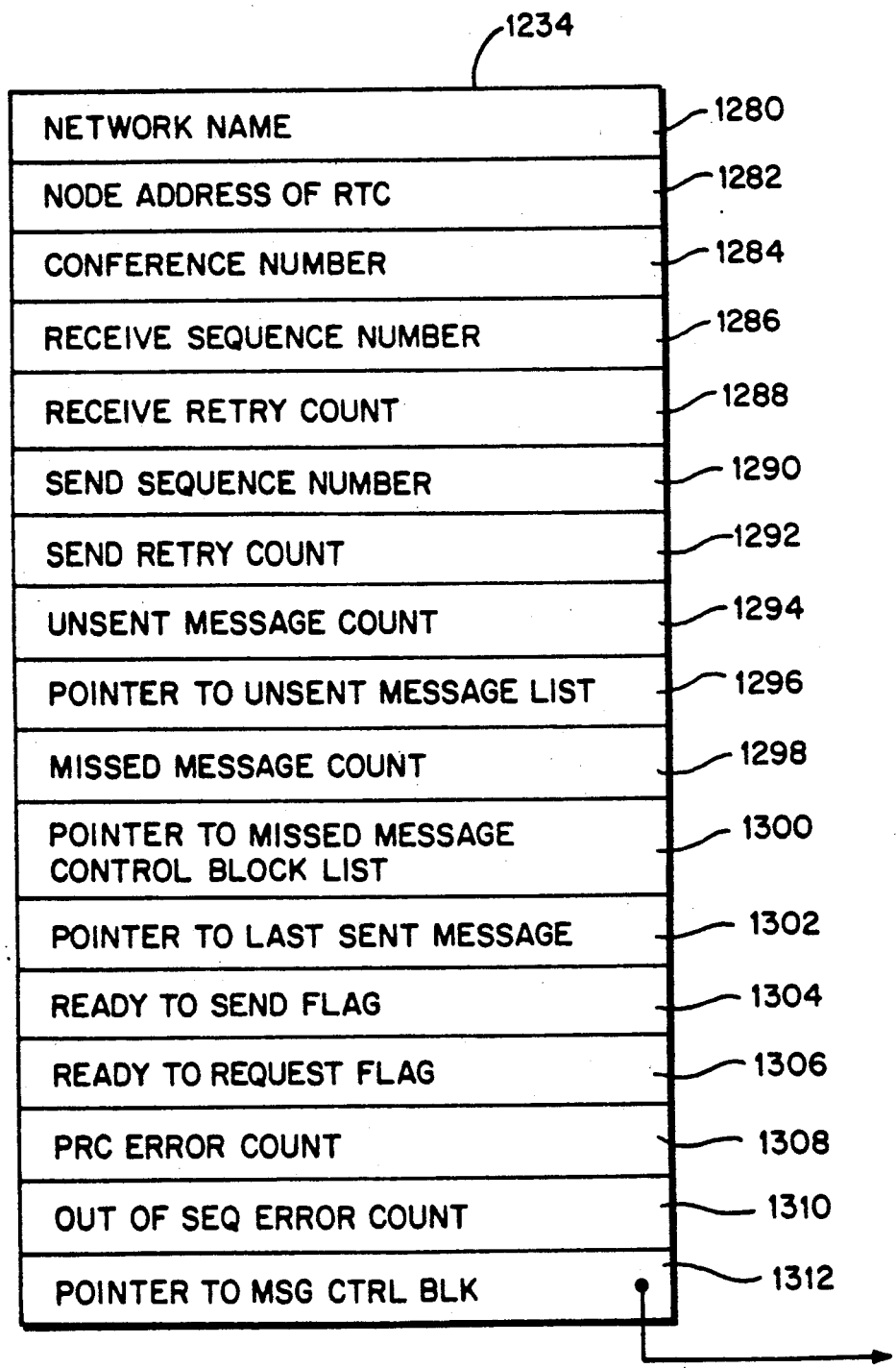
FIG. 50 shows an exemplary message control block which is used to keep track of the activities between the playback recorder computer and the retransmission computer on network B as specified in FIG. 48.
Figure 51:
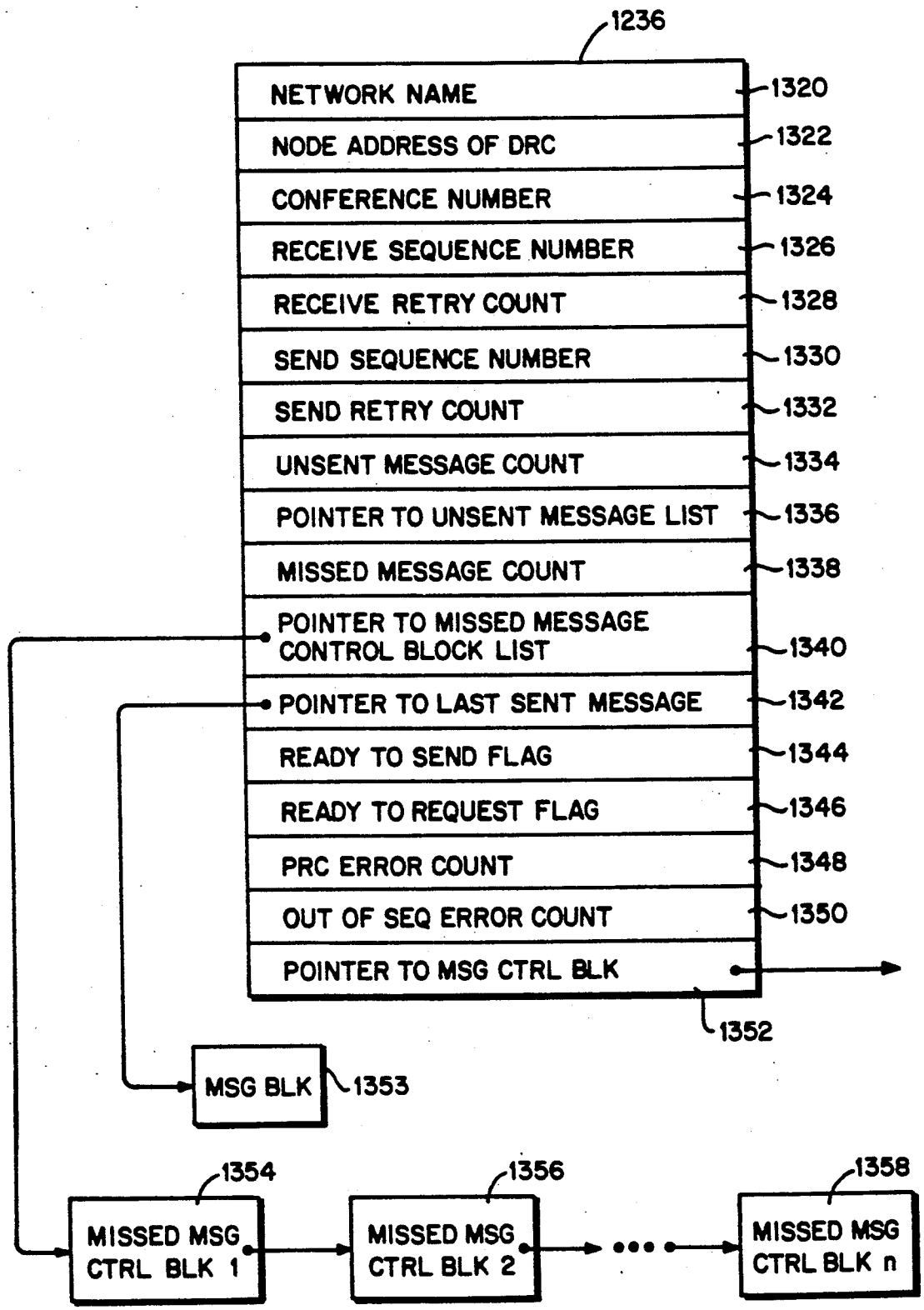
FIG. 51 shows an exemplary message control block which is used to keep track of the activities between the playback recorder computer and the designated recorder computer on network A as specified in FIG. 48.
Figure 52:
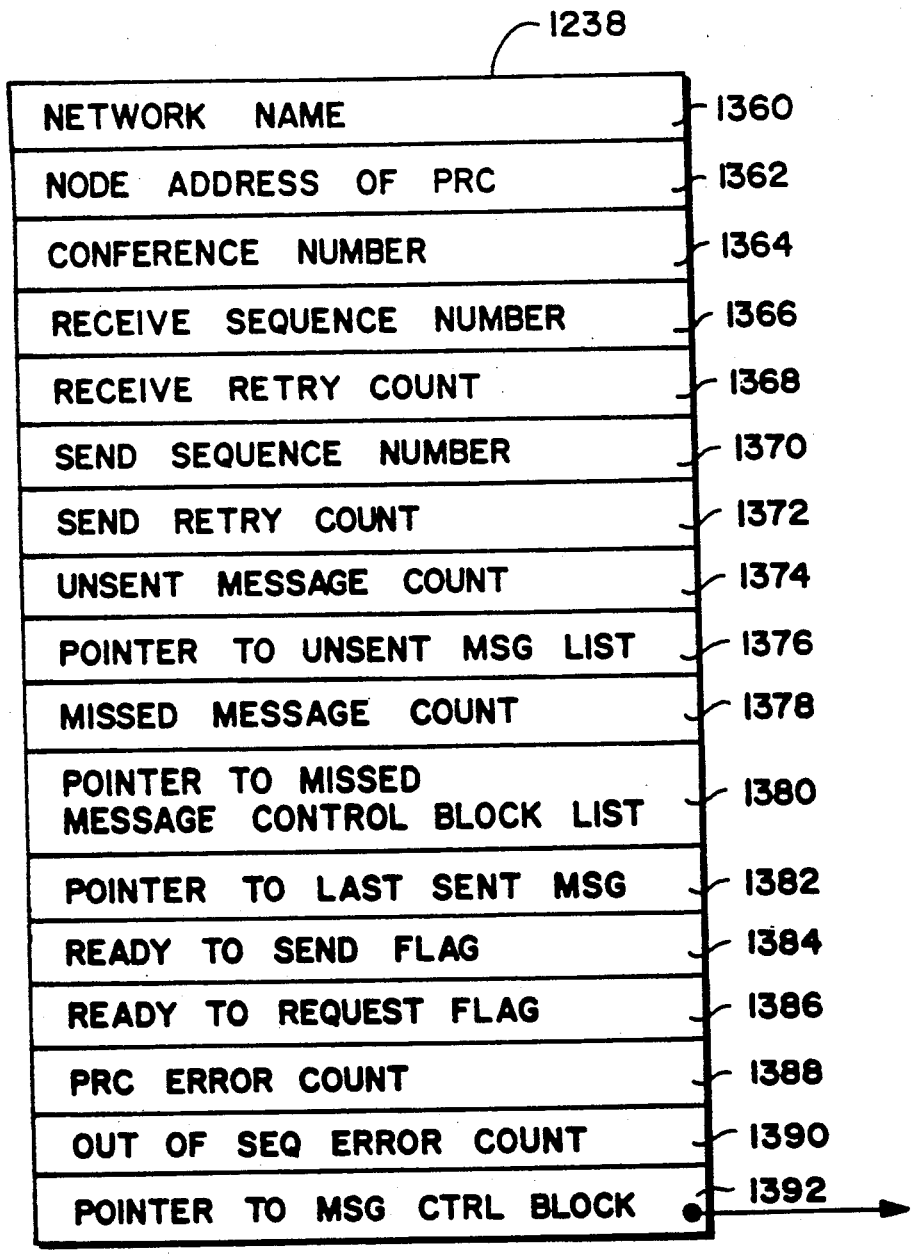
FIG. 52 shows an exemplary message control block which is used to keep track of the activities between the playback recorder computer and the general participant computer on network A as specified in FIG. 48.

FIGS. 48-52 show the data structures used by the playback recorder computer. FIGS. 48 and 49 show the main data structures. FIGS. 50-52 describe the data structures in detail. These data structures are similar in format to those for the retransmission computer 20.

FIGS. 18-24 describe the detailed operation of a playback recorder station 26. The main functions of a playback recorder station are:

(1) Listen to the messages sent from the retransmission station 20 to the designated recorder station 28 on network B18 and store the messages based on conference number for later possible retrieval by a general participant station 24.

(2) If the playback recorder station 26 fails to get the correct message from listening on network B18, it gets the correct message from the designated recorder station 28.

(3) A general participant station 24 normally gets the messages directly from network B18. However, it may require the playback recorder station 26 to send it one or more messages at station startup time or when it detects message errors.

Figure 18:
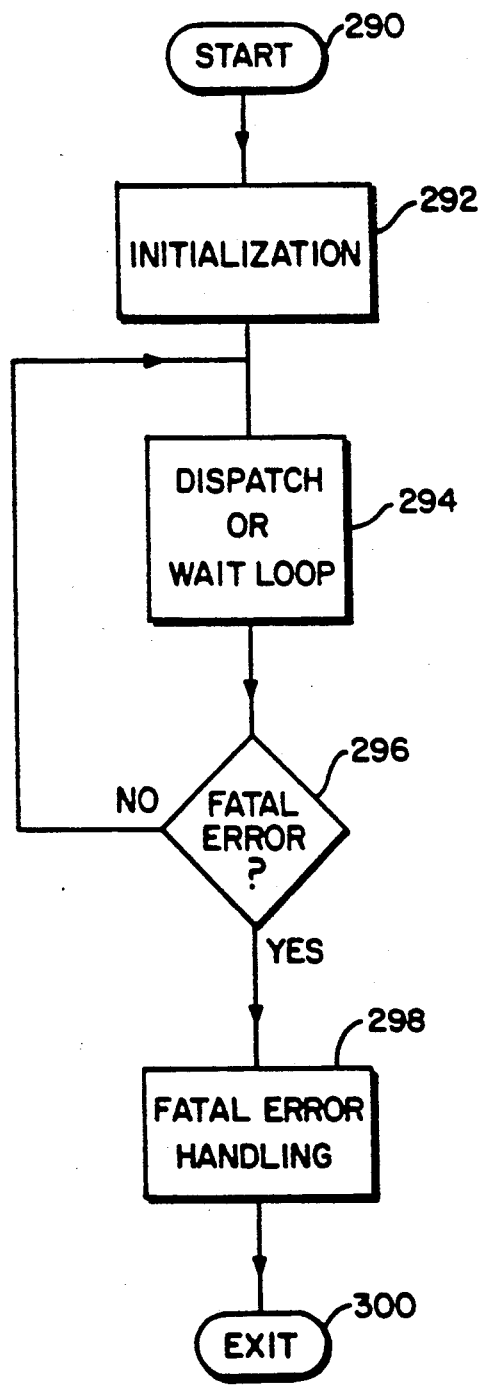
FIG. 18 is a schematic flow diagram of exemplary program control steps performed by the playback recorder station shown in FIG. 1.

FIG. 18 shows the overall system logic flow for a playback recorder station 26. When a playback recorder station 26 is started, it performs a one time setup routine in the initialization 292 portion of the processing. However, the main processing is done in the dispatch or wait loop 294 portion of the processing. If there are fatal errors, the dispatch or wait loop 294 portion of the processing is repeated again and again. If there were fatal errors, control is passed to the fatal error handling 298 portion for processing. The program exits after the fatal error processing.

Figure 19:
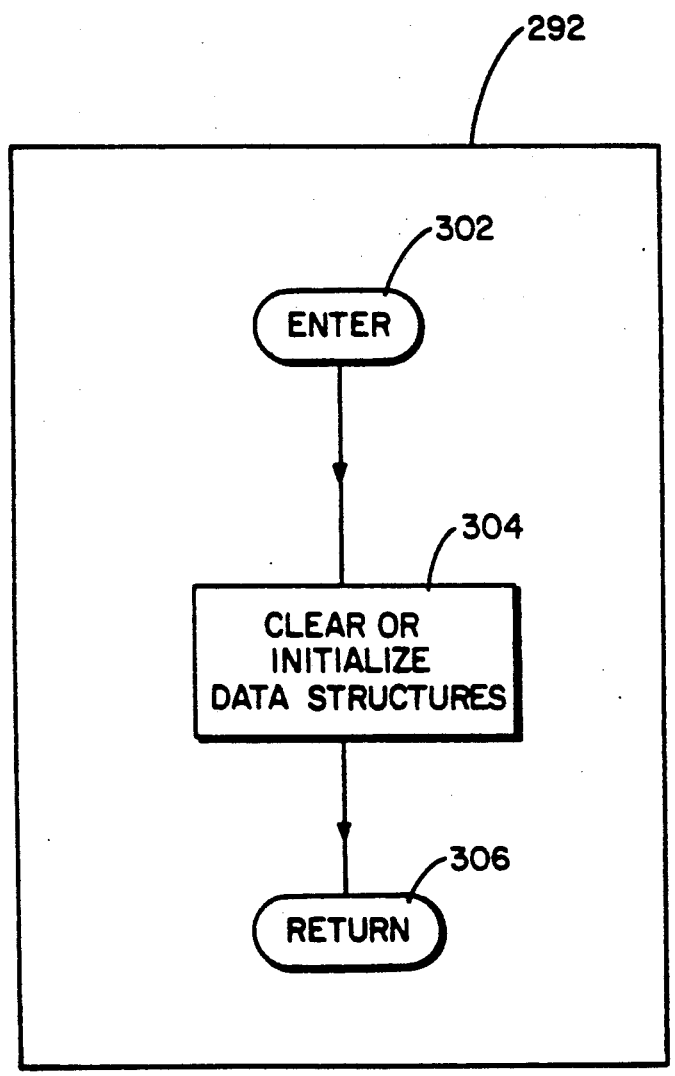
FIG. 19 is a detailed flow diagram of the initialization block shown in FIG. 18.

FIG. 19 shows the initialization 292 portion of the processing in greater detail. The processing consists of the following steps:
   set up a message control block list which consists of the message control block for RTC 1234, message control block for DRC 1236, message control block for GPCI 1238, ..., message control block for GPC n 1240.

Figure 20:
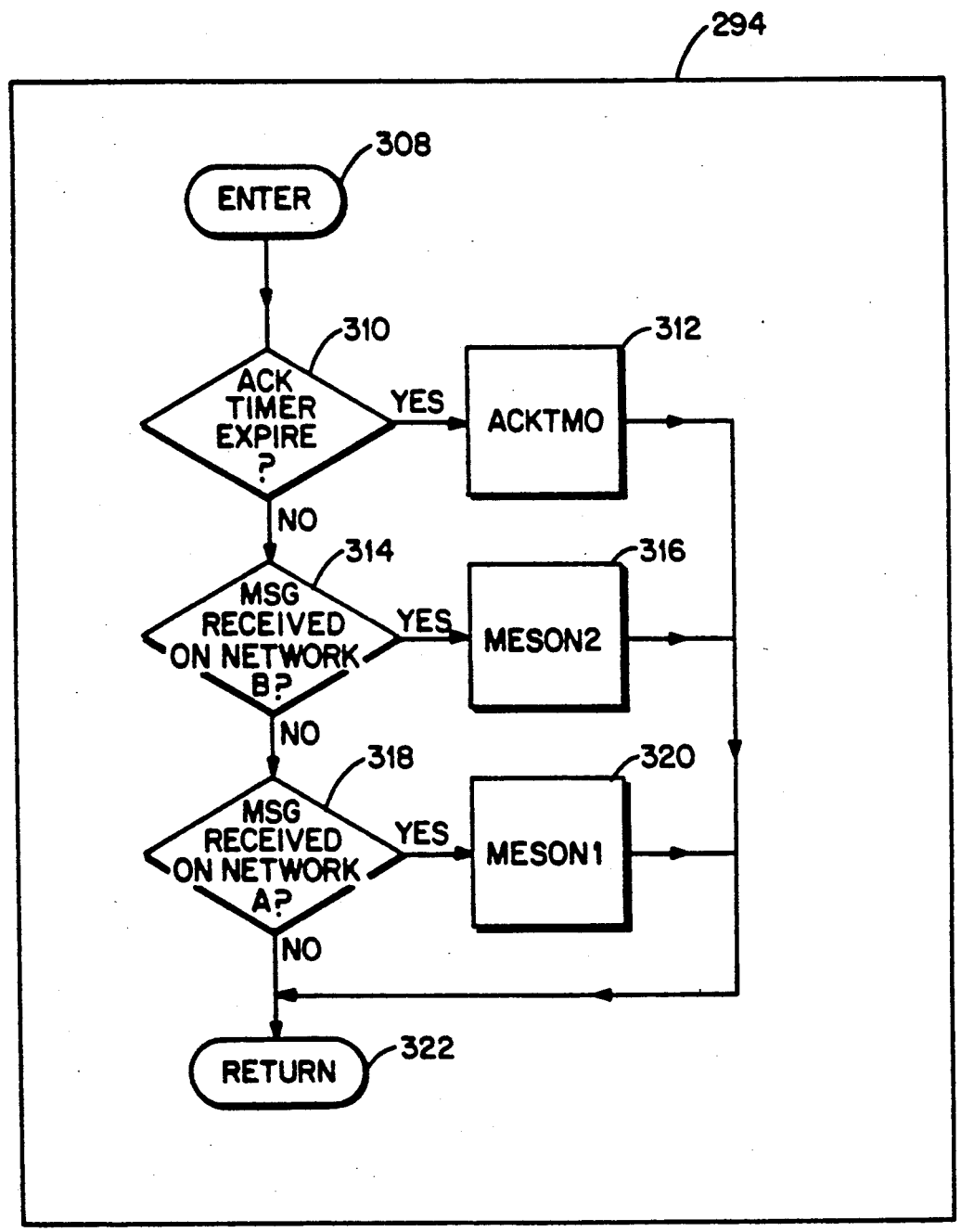
FIG. 20 is a detailed flow diagram of the dispatch or wait loop block shown in FIG. 18.

FIG. 20 shows the dispatch or wait loop 294 portion of FIG. 20 in greater detail. The events handled by the playback recorder station 26 in the preferred embodiment are as follows:

(1) Acknowledgement timer expires on network A16 (decision block 310). An acknowledgement timer is started when the playback recorder station 26 requests a missed message from the designated recorder station 28. Expiration of the timer means that no reply has been received by the playback recorder station 26. This may be due to CRC errors, missed messages, designated recorder station problems or hardware failures. The processing routine that handles the acknowledgement timer is called ACKTMO 312.

(2) A message is received on network B18 (decision block 314). This generally means a message has been received from the retransmission station 20. The message is checked to see if it has errors by a routine called MESON2 (block 316). If there are no errors, the conference number field 52 is examined to see if the message should be stored. In this example, only messages belonging to conference 10,000 are stored. The messages are stored using the structure of a link list. Two pointers are used to keep track of the message list. They are pointer to received message list 1228 which points to the beginning of the list and pointer to last received message block 1230 which points to the end of the list. This processing routine is called MESON2.

(3) A message is received on network A16 (decision block 318). This generally means that (a) a request message has come in from a general participant station 24; or (b) a reply message has come in from the designated recorder station 28. A processing routine called MESON1 320 handles messages from network A.

Figure 21:
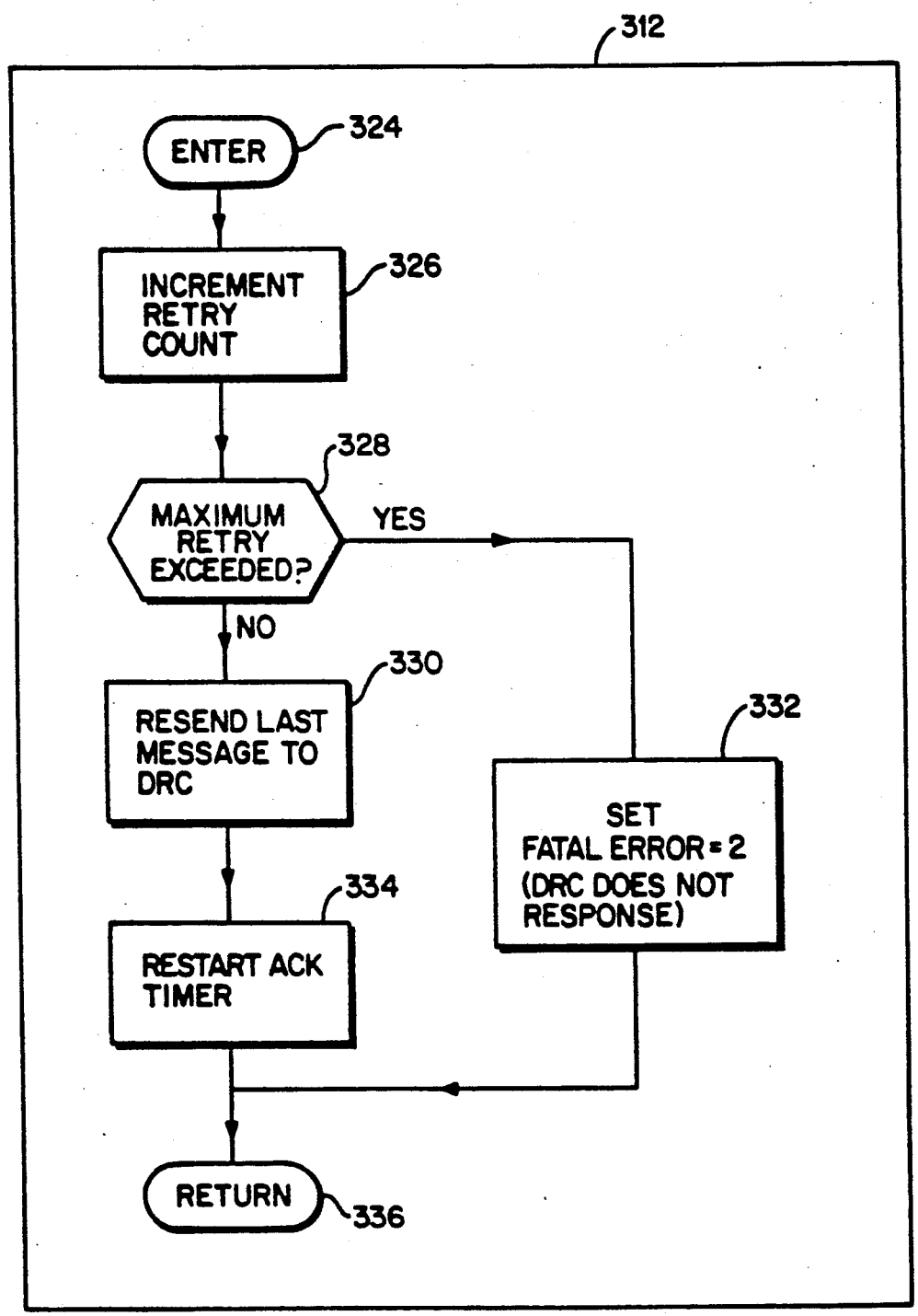
FIG. 21 is a detailed flow diagram of the ACKTMO processing routine block shown in FIG. 20, which is executed by the playback recorder station when the message acknowledgement timer expires on network A.

FIG. 21 shows the processing routine ACKTMO 312. This processing routine is entered when no reply message comes in from the designated recorder station 28 after a request message has been sent to it (decision block 310 of FIG. 20). The request message is resent (block 330) unless the maximum retry count has been exceeded (tested for by block 328). If the retry count has been exceeded, the error is regarded as fatal and is handled by block 332).

Figure 22:
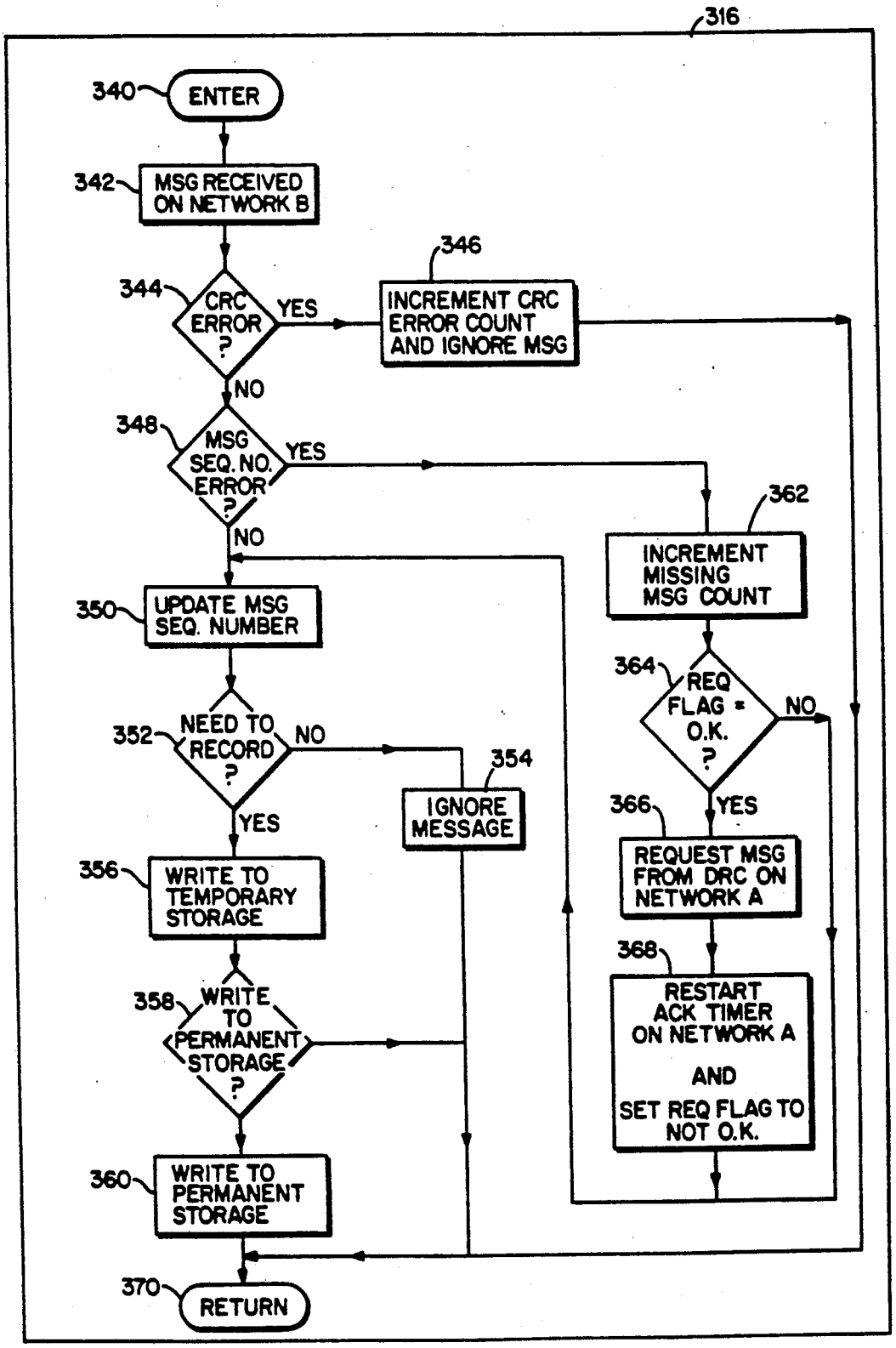
FIG. 22 is a detailed flow diagram of the processing routine block MESON2 shown in FIG. 20, which is executed by the playback recorder station when a message is received on network B.

FIG. 22 shows the processing routine MESON2 316. This processing routine is entered when there is a message received on network B18 (decision block 316 of FIG. 20). This generally means a message is received from the retransmission station 20. CRC error handling is very simple. The CRC error is recorded and the message is discarded and ignored completely (blocks 344, 346). If the discarded message is a message from the retransmission station 20, the next message coming in will be out of sequence (tested for by decision block 348). Out-of-sequence messages are stored temporarily in memory buffers and a request is made to the designated recorder station 28 to retrieve the missed message (blocks 362-368). The missed messages are kept track by a link list of missed message control block 1354 ... 1358 pointed to by the pointer to missed message control block list 1340. The missed message control block is shown in detail in FIG. 59. If there are no errors, the message is examined to see whether it should be recorded (block 352). In this example, only conference 10,000 is recorded (blocks 356-360).

Figure 23:
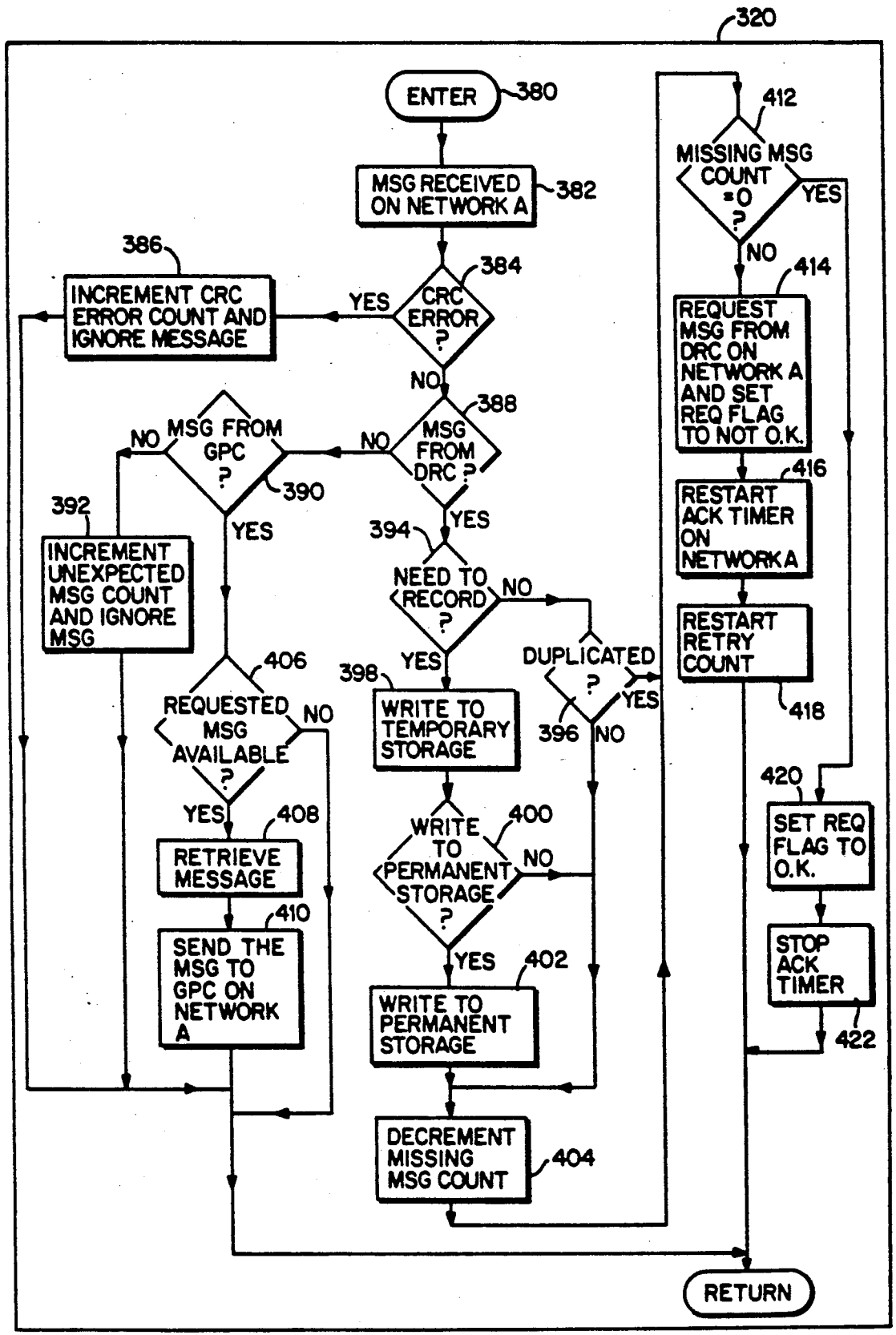
FIG. 23 is a detailed flow diagram of the processing routine block MESON1 shown in FIG. 20, which is executed by the playback recorder station when a message is received on network A.

FIG. 23 shows the processing routine MESON1 320. This processing routine is entered when there is a message received on network A16 by the playback recorder station 26 (decision block 318 of FIG. 20). This generally means either the received message is from a general participant station 24 or from the designated recorder station 28. CRC error handling is very simple. The CRC error is recorded and the message is discarded and ignored completely (blocks 384, 386). If the message is a request message from a general participant station 24 and this message is ignored, the acknowledgement timer as will be described in the processing routine ACKTM2 480 would expire and the general participant station 24 will resend the request message. If the message is a reply message from the designated recorder station 28 and this reply message is ignored, the acknowledgement timer as described in the processing routine ACKTMO 312 expires. The playback recorder station 26 then resends the request message.

If the message is from the designated recorder station 28, (this means the designated recorder station 28 is supplying correct message information as requested), the correct message is checked to see if it is to be recorded based on the conference number field 52 (block 394). In this example, only conference 10,000 is recorded (block 398, 402). If the playback recorder station 26 is still missing messages (blocks 404, 412), it can send another request message for the designated recorder station 28 (block 414). Otherwise, the ready to request flag 1346 is set to show if the next request message for the designated recorder station 28 can be sent without waiting (block 420). If the message is from a general participant station 24 (tested for by decision block 390), (this means a general participant station 24 has missed a message and is requesting this missed message from the playback recorder station 26), the playback recorder station 26 will send a reply message over network A providing the correct information (if it is available) (blocks 406-410). If the message is not available (e.g., if the playback recorder station 26 missed the same message and is requesting the designated recorder station 28 for it), the request is ignored (decision block 406). This is acceptable because the general participant station 24 is expected to request again after a certain time as will be described in the processing routine ACKTM2 480.

Figure 24:
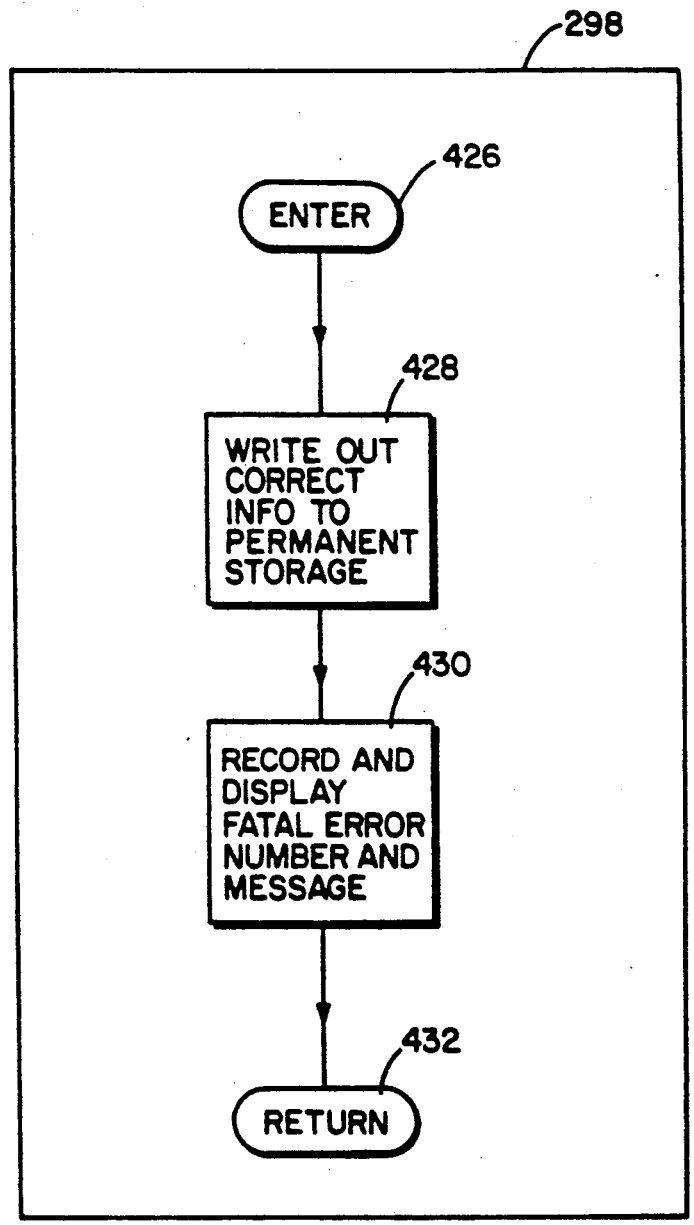
FIG. 24 is a detailed flow diagram of the fatal error handling block shown in FIG. 18.

FIG. 24 shows the fatal error handling routine 298 for the playback recorder station 26. The fatal error to be considered here is the failure to get a reply from the designated recorder station 28 after the maximum number of retries. A message is displayed and then the program exits which means the whole conference stops (blocks 428, 430).

DESCRIPTION OF A GENERAL PARTICIPANT STATION 24

Figure 53:
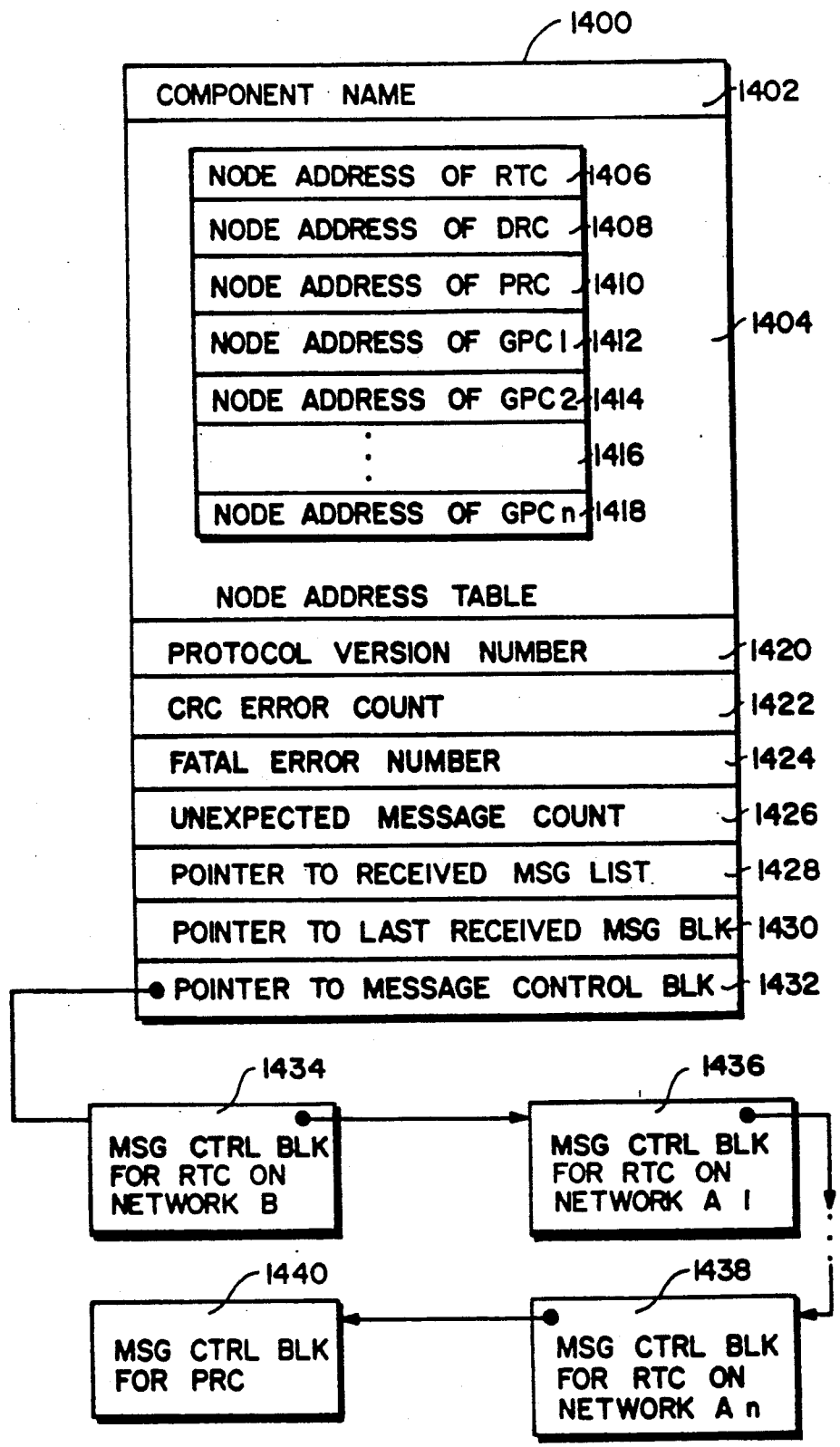
FIG. 53 shows exemplary data structures for the general participant computer.
Figure 54:
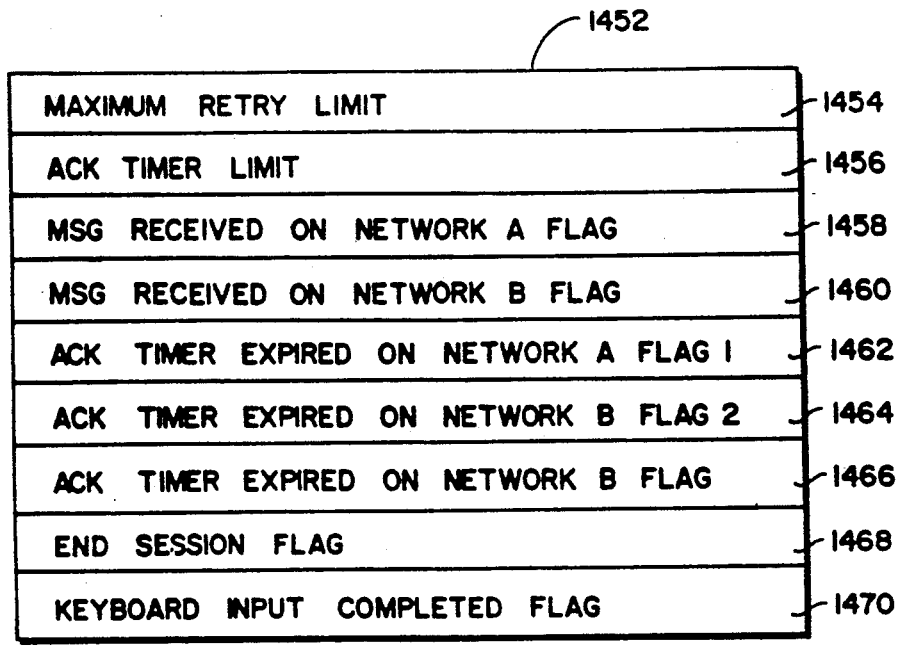
FIG. 54 shows exemplary additional data structure for the general participant computer.
Figure 55:
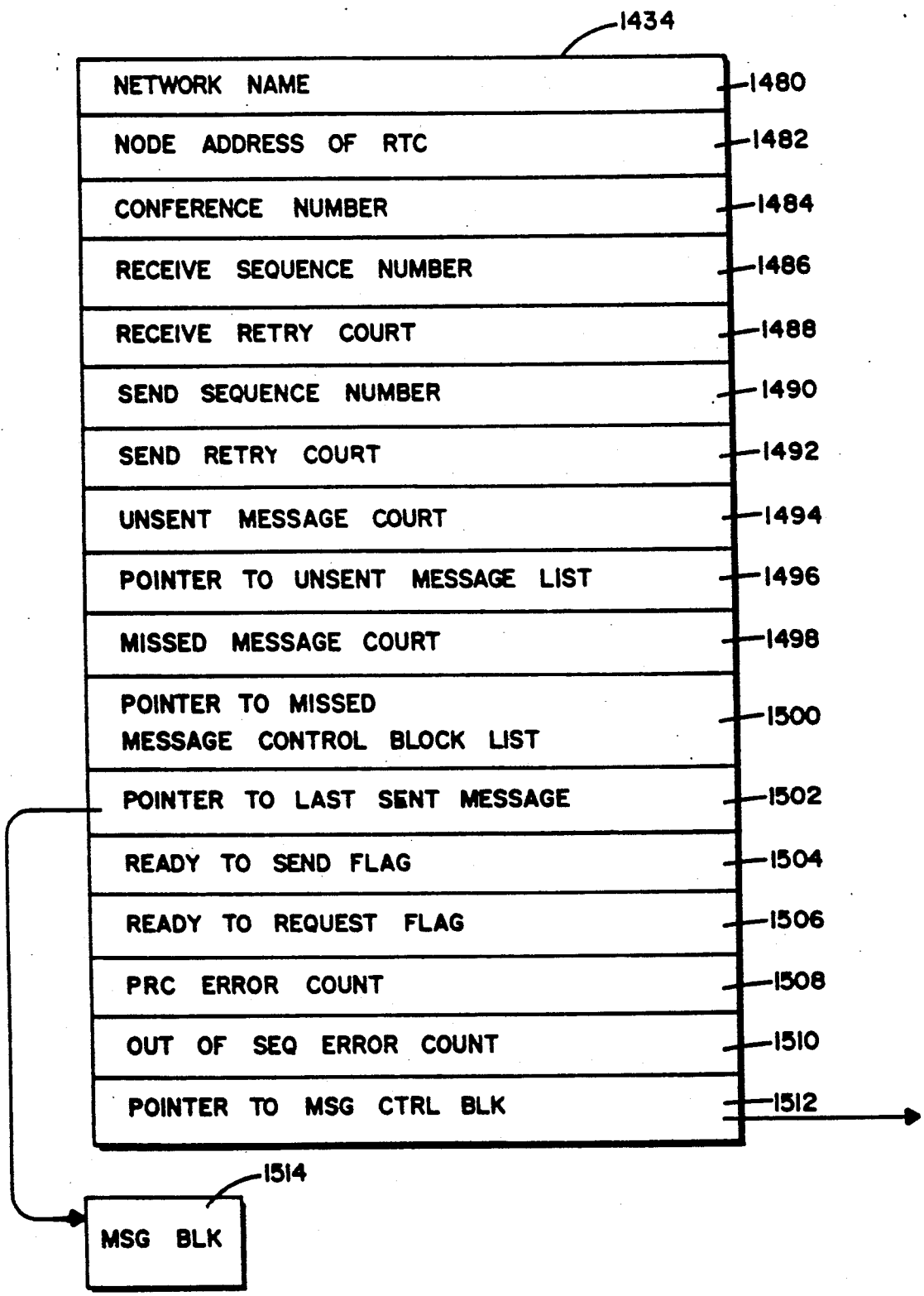
FIG. 55 shows an exemplary message control block which is used to keep track of the activities between the general participant computer and the retransmission computer on network B as specified in FIG. 53.
Figure 56:
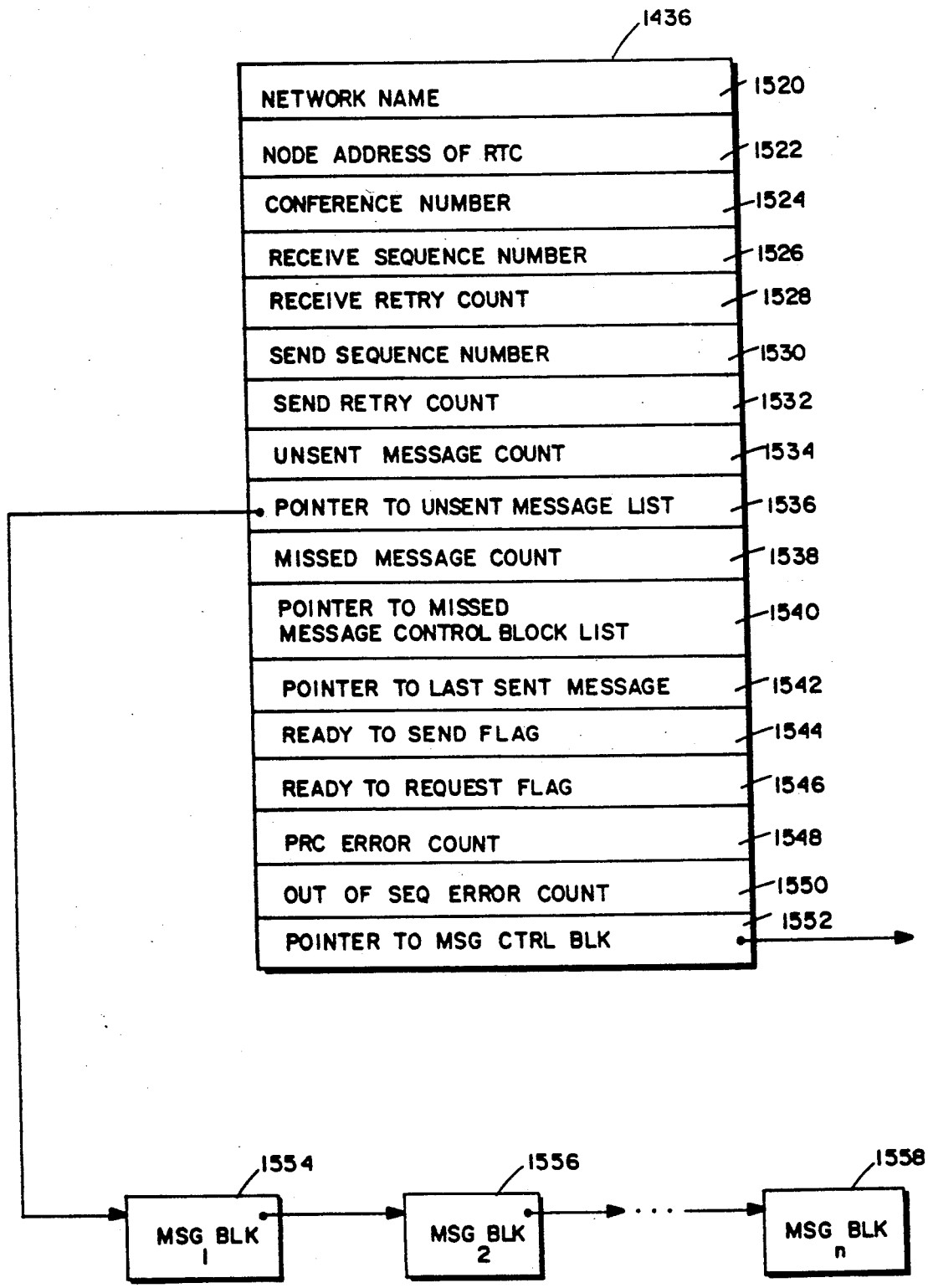
FIG. 56 shows an exemplary message control block which is used to keep track of the activities between the general participant computer and the retransmission computer on network A as specified in FIG. 53.
Figure 57:
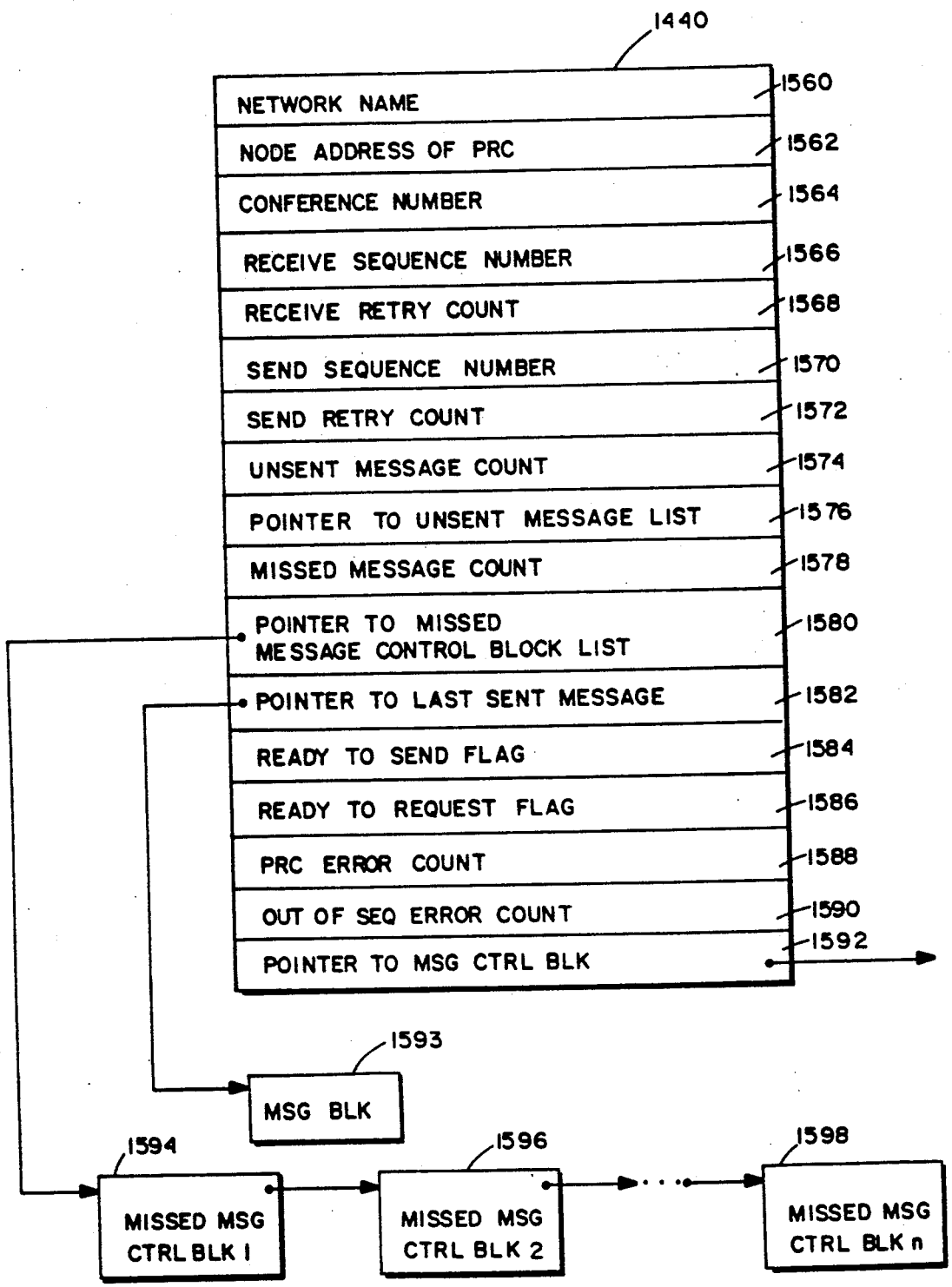
FIG. 57 shows an exemplary message control block which is used to keep track of the activities between the general participant computer and the playback recorder computer on network A as specified in FIG. 53.
Figure 60:
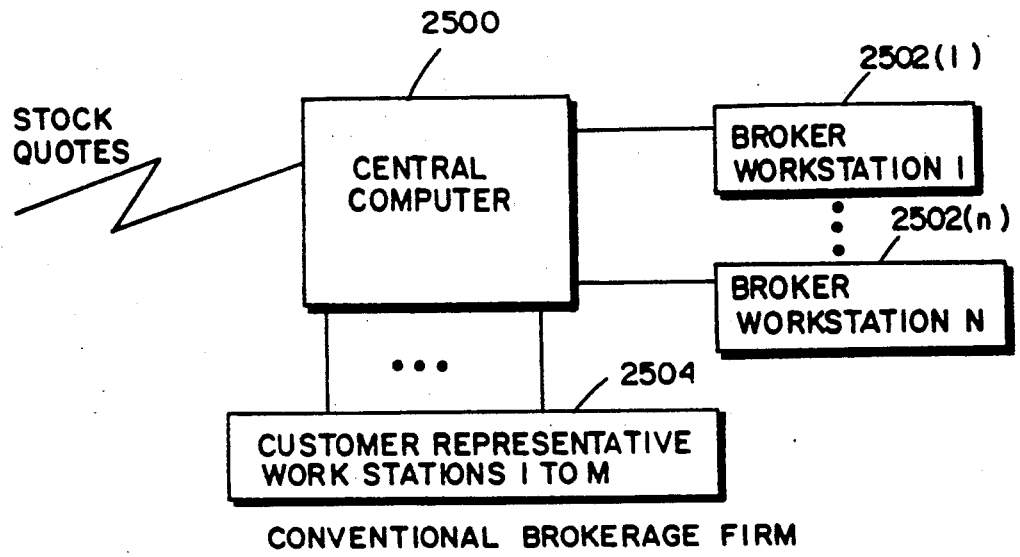
FIG. 60 is a conventional system to handle stock quote information in brokerage firms.
Figure 61:
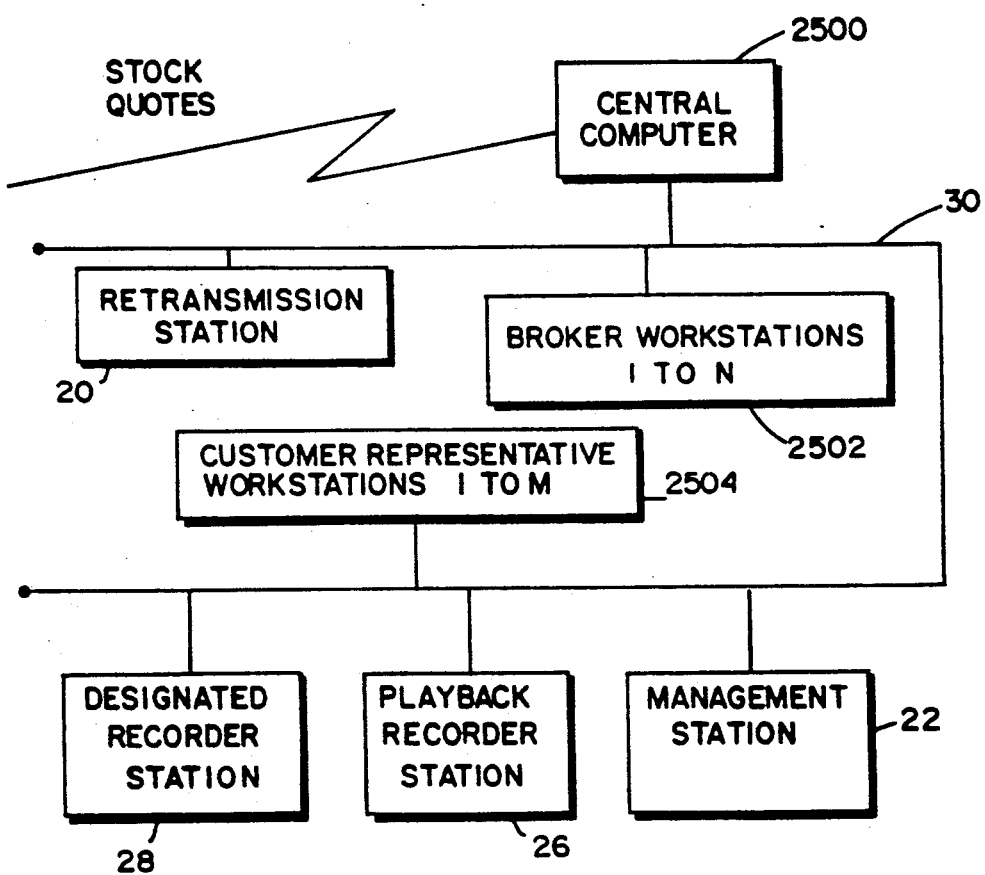
FIG. 61 is an exemplary system to handle stock quote information with the present invention.
Figure 68:
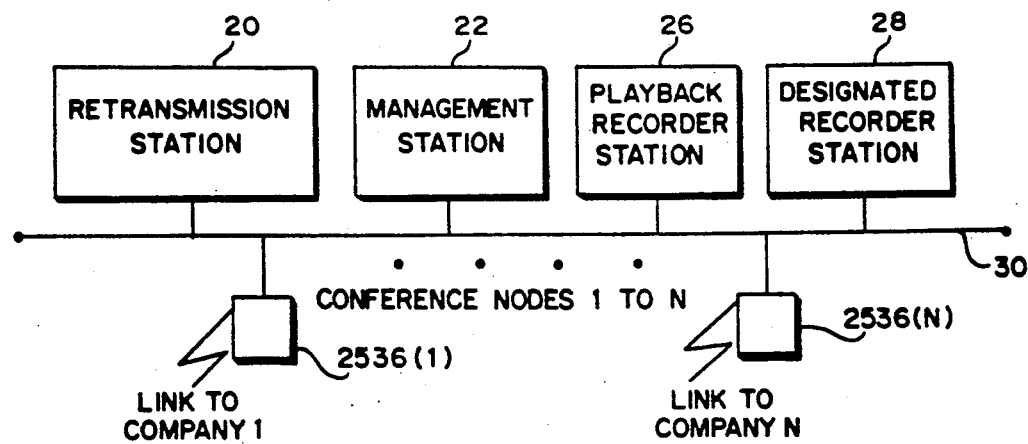
FIG. 68 is an exemplary system to handle support for different companies with the present invention.
Figure 69:
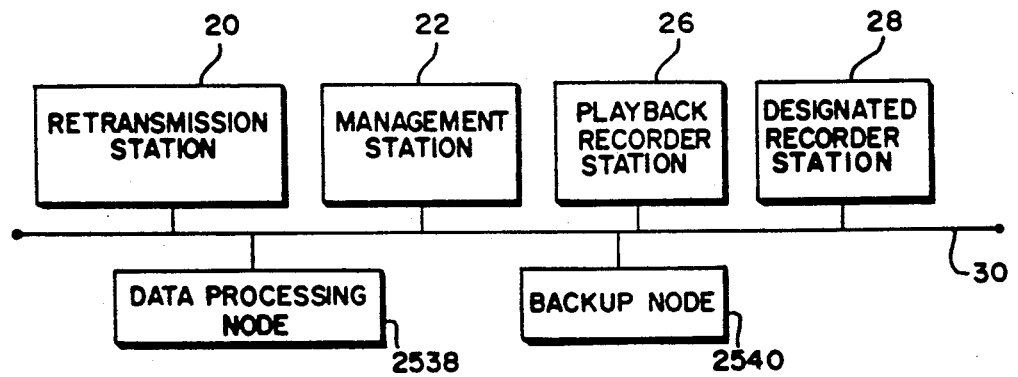
FIG. 69 is an exemplary system to handle backup of data processing stations with the present invention.

FIGS. 53-57 show the data structures used by the general participant station 24. FIG. 53 and 54 show the main data structures. FIGS. 55-57 describe the data structures details. These data structures are similar in format to those for the retransmission station 20.

FIGS. 25-33 describe the detailed operation of a general participant station 24. The main functions of a general participant station are:

(1) to listen to the messages sent from the retransmission station 20 to the designated recorder station 28 on network B18 and determine whether the message should be passed to the application program. In this embodiment, any message with conference number field 52 equal to 10,000 is displayed.

(2) to detect any missed or distorted messages and obtain the correct messages from a playback recorder station 26.

(3) to send (originate) messages to all other general participant stations 24 using conference 10,000. In this embodiment, two or more general participant stations are used.

Figure 25:
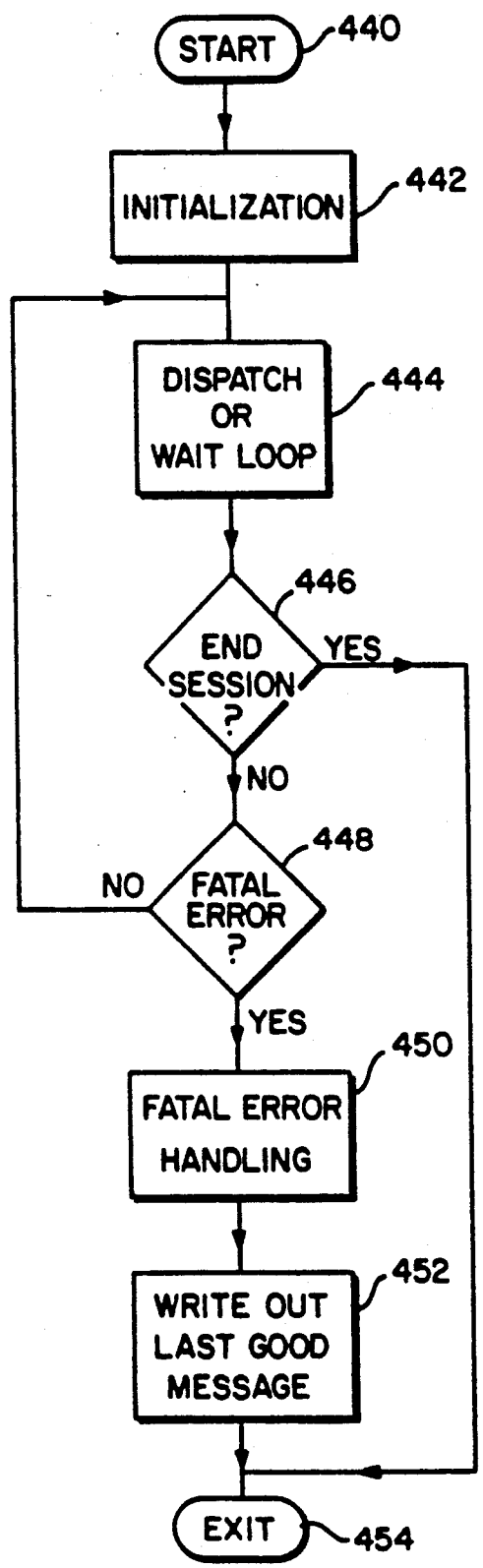
FIG. 25 is a schematic flow diagram of exemplary program control steps performed by the general participant station shown in FIG. 1.

FIG. 25 shows the overall system logic flow for the general participant station 24. When the general participant station 24 is started, a one time processing routine is performed to obtain from a playback recorder station 26 all messages on conference 10,000 before the general participant station 24 was started (block 442). However, the main processing is done in the dispatch or wait loop 444 portion of the processing. If the user does not want to end the session and there are no fatal errors, the dispatch or wait loop 444 portion of the processing is repeated again and again. The program exits either if the user wants to exit (block 446) or if fatal errors occur (block 450). The last good message received is stored before the program exits (block 454).

Figure 26:
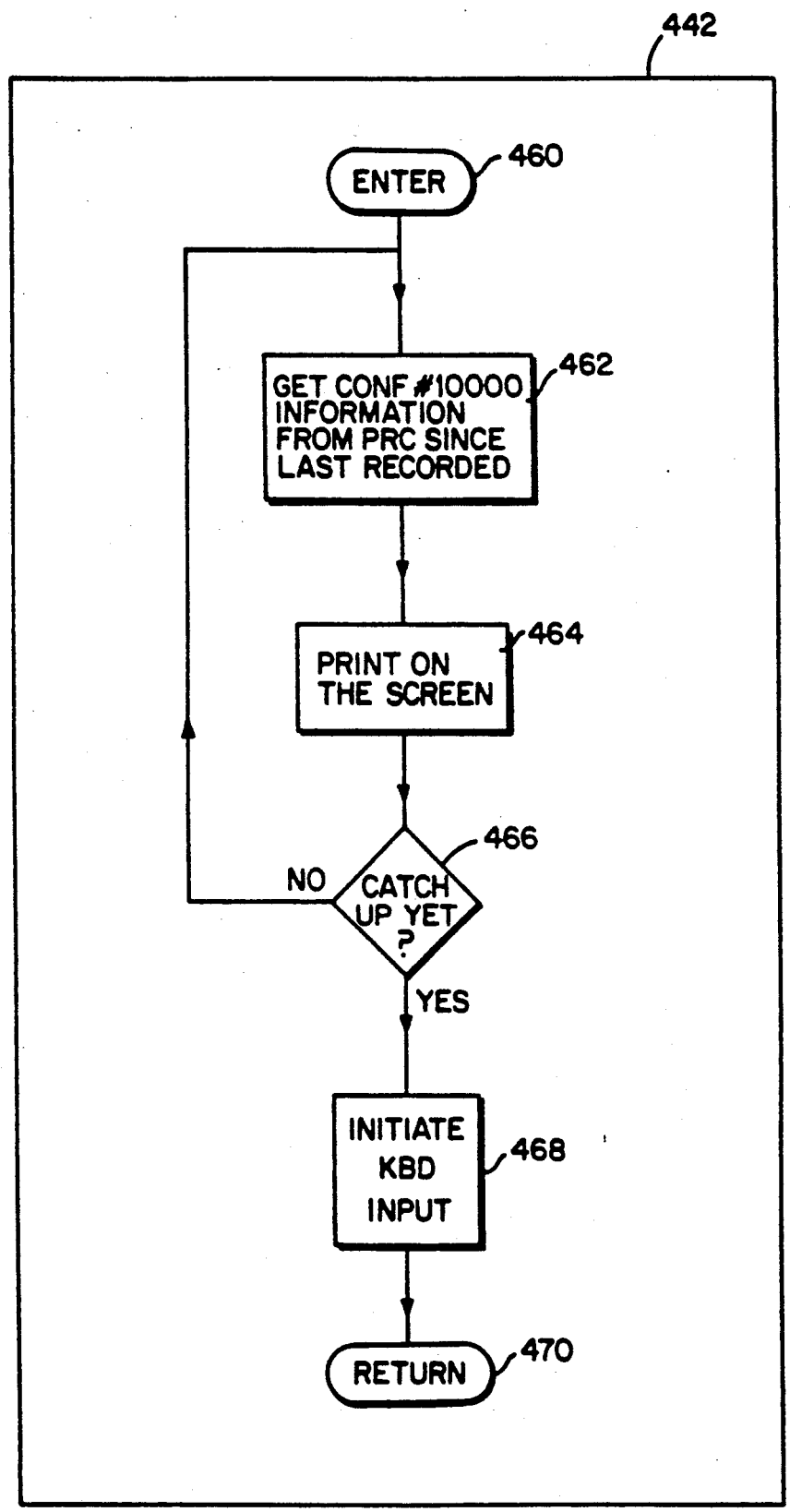
FIG. 26 is a flow diagram of the initialization block shown in FIG. 25.

FIG. 26 shows the initialization 442 portion of the processing in greater detail. The first initialization process consists of the following:

set up a message control block list which consists of the message control block for RTC on network B 1434, message control block for RTC on network A1 1436, . . ., message control block for RTC on network An 1438, and the message control block for PRC 1440;

set every counter in the data structures to 0;

set ready-to-send flag 1504 to true (this flag is used to control the flow of the communication between the general participant station and the retransmission station on network A16). All other flags are set to false;

set all pointers other than the pointer to the message control block list 1432 to null.

The data structures are recorded periodically to disk so they can be retrieved whenever the station gets back into the conference after it left the conference for any reason. For example, at startup, the general participant station 24 first obtains messages that have not been received for conference 10,000 from a playback recorder station 26 (block 462). These messages are then displayed (block 464). Input from the keyboard or other input devices are then enabled (block 468).

Figure 27:
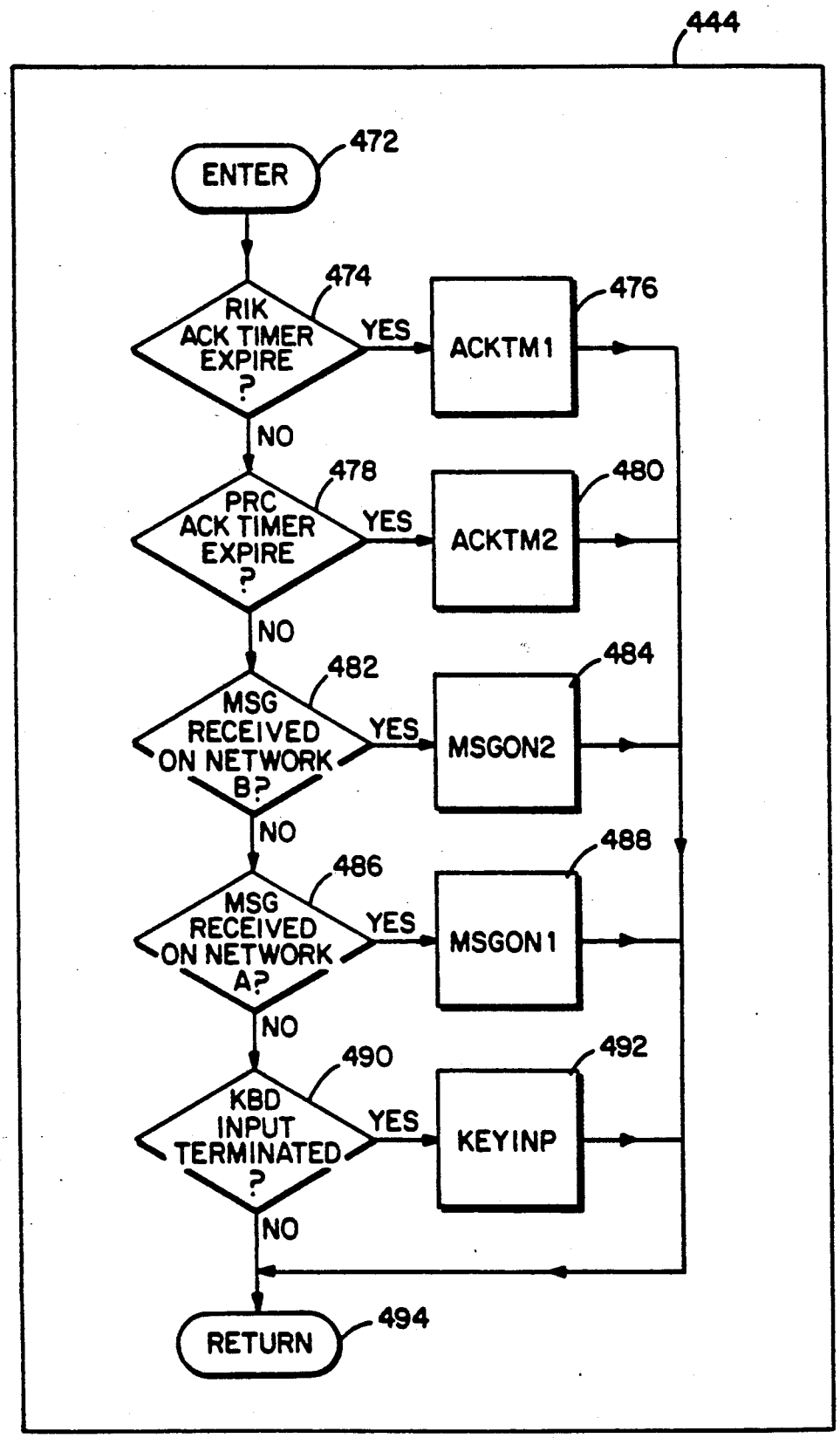
FIG. 27 is a detailed flow diagram of the dispatch or wait loop block shown in FIG. 25.

FIG. 27 shows the dispatch or wait loop 444 portion of the processing in greater detail. The events to be handled by a general participant station are:

(1) Maintaining an acknowledgement timer for the retransmission station 20 on network B and determining when it expires. Expiration of the acknowledgement timer means that the retransmission station 20 has failed to send an acknowledgement message back after the general participant station 24 has sent a message to the retransmission station 20 for broadcasting. The processing routine that handles the acknowledgement timer processing is called ACKTM1 476.

(2) Maintaining a further acknowledgement timer for the playback recorder station 26 on network A16 and determining when the timer expires. Expiration of this timer means that the playback recorder station 26 has failed to send a reply message after the general participant station 24 has sent a request message to the playback recorder station 26. The processing routine that handles this further acknowledgement timer processing is called ACKTM2 480.

(3) A message received on network B18. This generally means a message has been received from the retransmission station 20. The message is checked to see if it has errors by a routine called MSGON2 484. If there are no errors, the conference number field 52 is examined to see if the message should be displayed. In this embodiment, only messages belonging to conference 10,000 are displayed.

(4) A message is received on network A16. This generally means that:

(a) an acknowledgement message has come in from the retransmission station 20; or (b) a reply message has come in from a playback recorder station 26. The processing routine that handles these messages is called MSGON1 488.

(5) An input from the keyboard or another local input device must be handled. This generally means that:

(a) user has decided to end the program; or (b) user has typed in a message to be sent to all general participant stations 24 via conference 10,000. A routine called KEYINP 492 handles user input.

Figure 28:
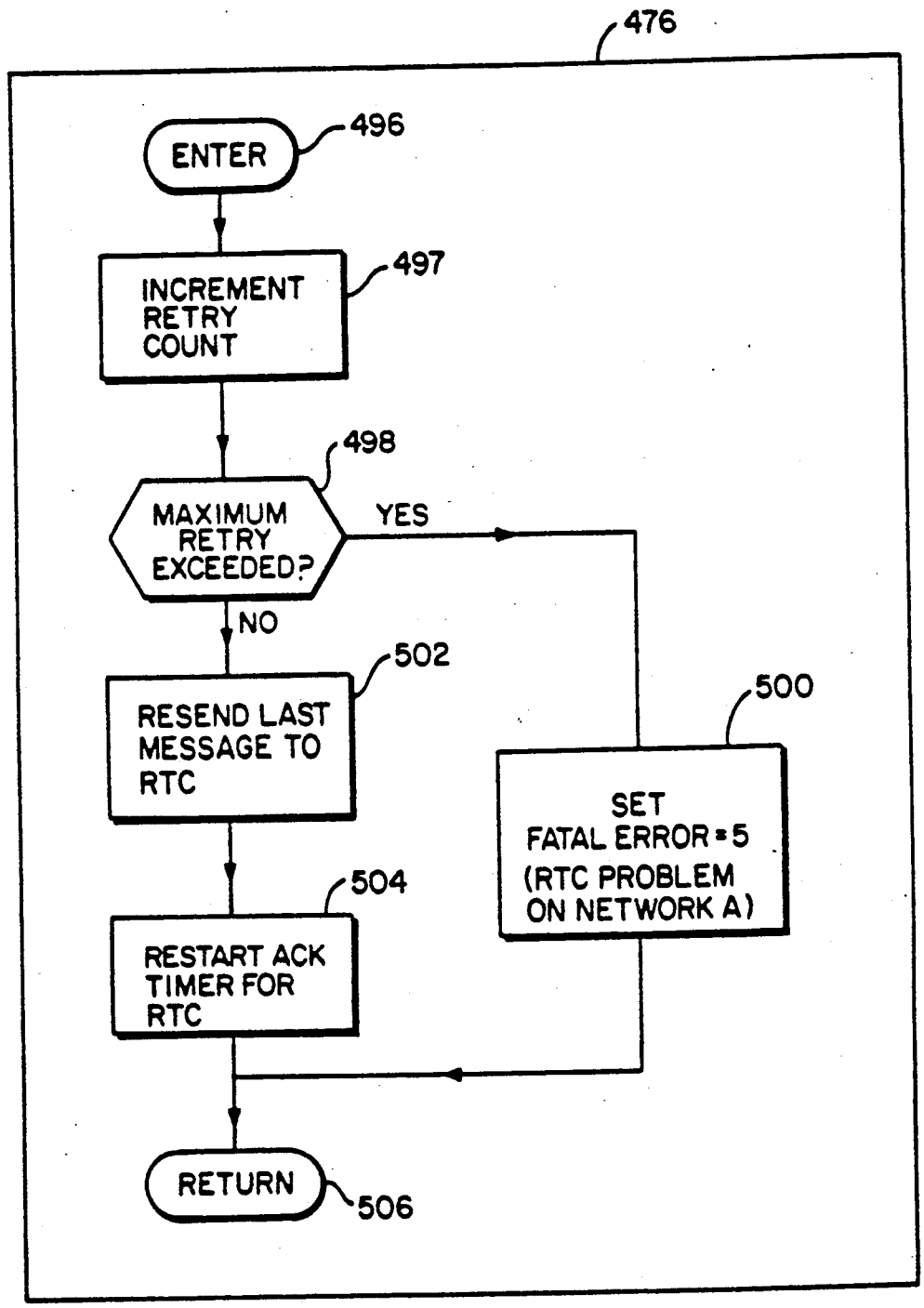
FIG. 28 is a detailed flow diagram of the processing routine ACKTM1 shown in FIG. 27, which is performed by the general participant station when the retransmission computer acknowledgement timer expires.

FIG. 28 shows the processing routine ACKTM1 476. This processing routine is entered when the acknowledgement timer for the retransmission station 20 expires (decision block 474, FIG. 27). This means no acknowledgement message has been received after the general participant station 24 has sent a message for broadcast. The message is resent (block 502) unless the maximum retry count has been exceeded (decision block 498). Exceeding the maximum retry count means failure to communicate with the retransmission station 20 for the purpose of sending broadcast messages. The error is regarded as fatal in this embodiment (block 500).

Figure 29:
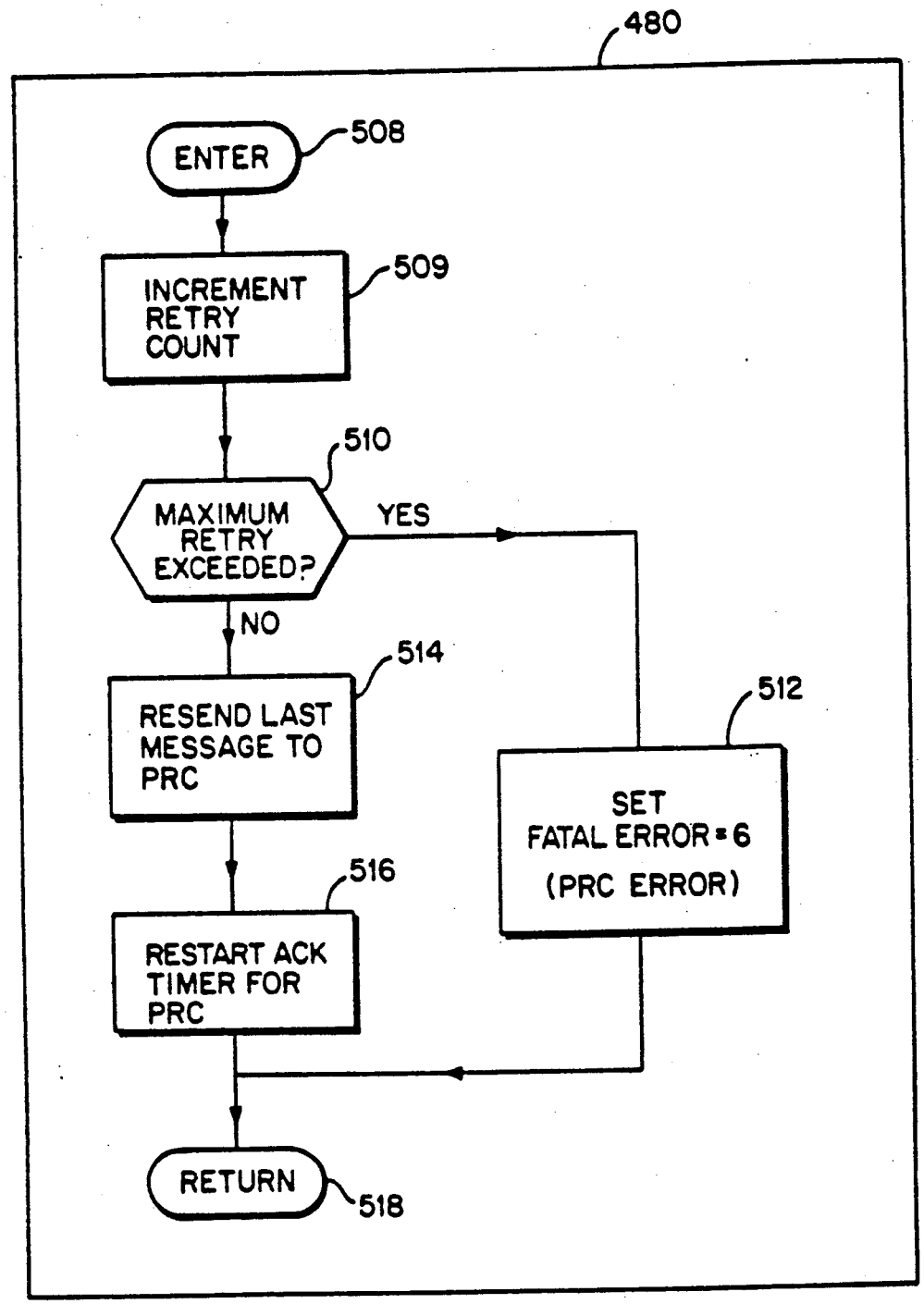
FIG. 29 is a detailed flow diagram of the processing routine ACKTM2 shown in FIG. 27, which is performed by the general participant station when the acknowledgement timer expires.

FIG. 29 shows the processing routine ACKTM2 480. This processing routine is entered when the acknowledgement timer for the playback recorder station 26 expires (tested for by decision block 478 shown in FIG. 27). This means no reply has been received from the playback recorder station 26. The request message is resent (block 514) unless the maximum playback recorder station retry count has been exceeded (decision block 510). Exceeding this count means failure to communicate with the playback recorder for the purpose of recovering missed messages. The error is regarded as fatal in this embodiment (block 512).

Figure 30:
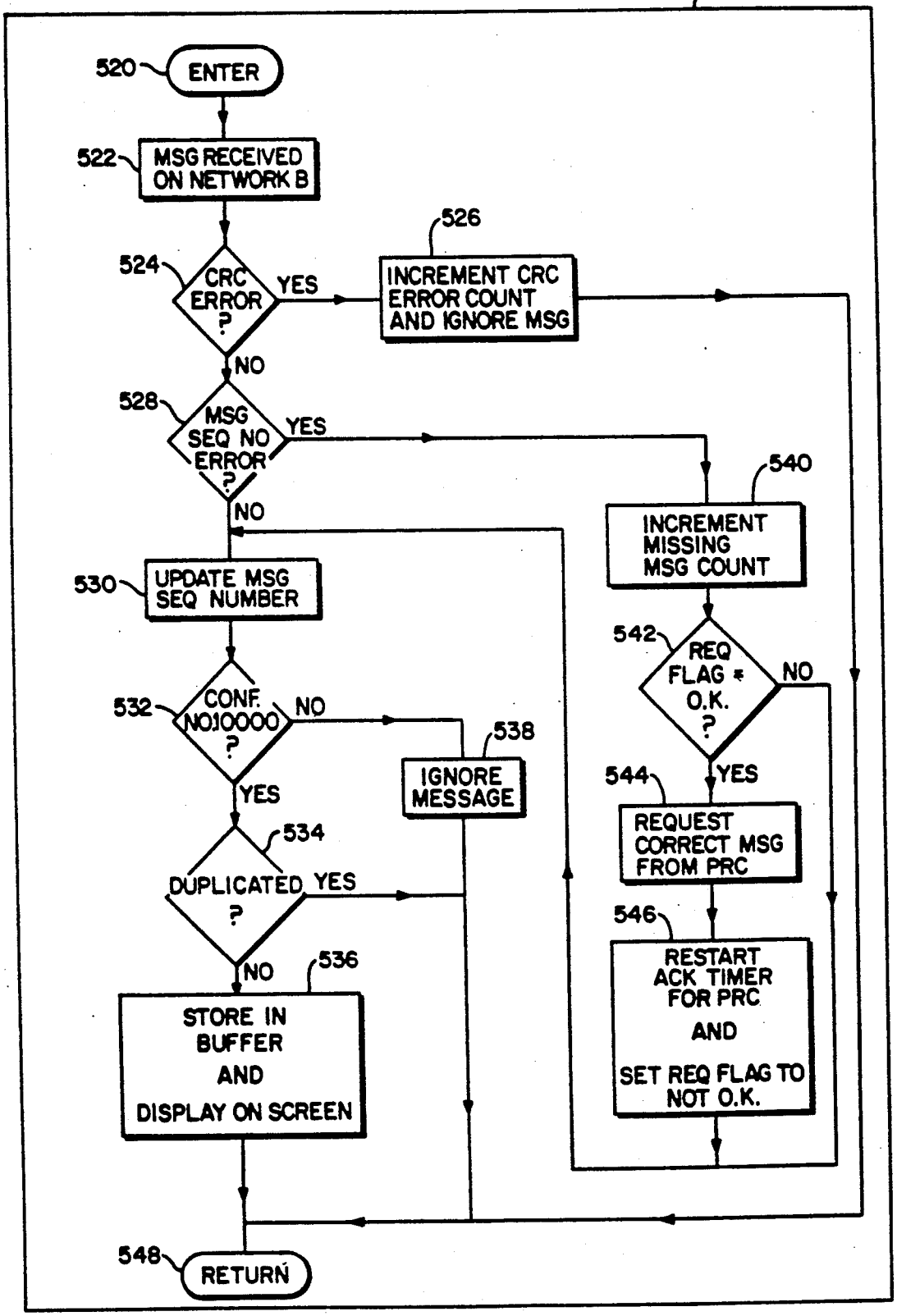
FIG. 30 is a detailed flow diagram of the processing routine MSGON2 shown in FIG. 27, which is performed by the general participant station when a message is received on network B.

FIG. 30 shows the processing routine MSGON2 484. This processing routine is entered when there is a message received on network B18 (tested for by decision block 478 in FIG. 27). This generally means a message is received from the retransmission station 20. CRC error handling is very simple. The CRC error is recorded and the message is discarded and ignored completely (blocks 524, 526). If the message is from the retransmission station 20 and is ignored, the next message coming in will be out of sequence (decision block 528). Out-of-sequence messages are stored temporarily in memory buffers and a request message is sent to the playback recorder station 26 to retrieve the missed message (blocks 540–546). If there are no errors, the message is examined to see whether it should be displayed (decision block 532). In this embodiment, only messages for conference 10,000 are displayed.

Figure 31:
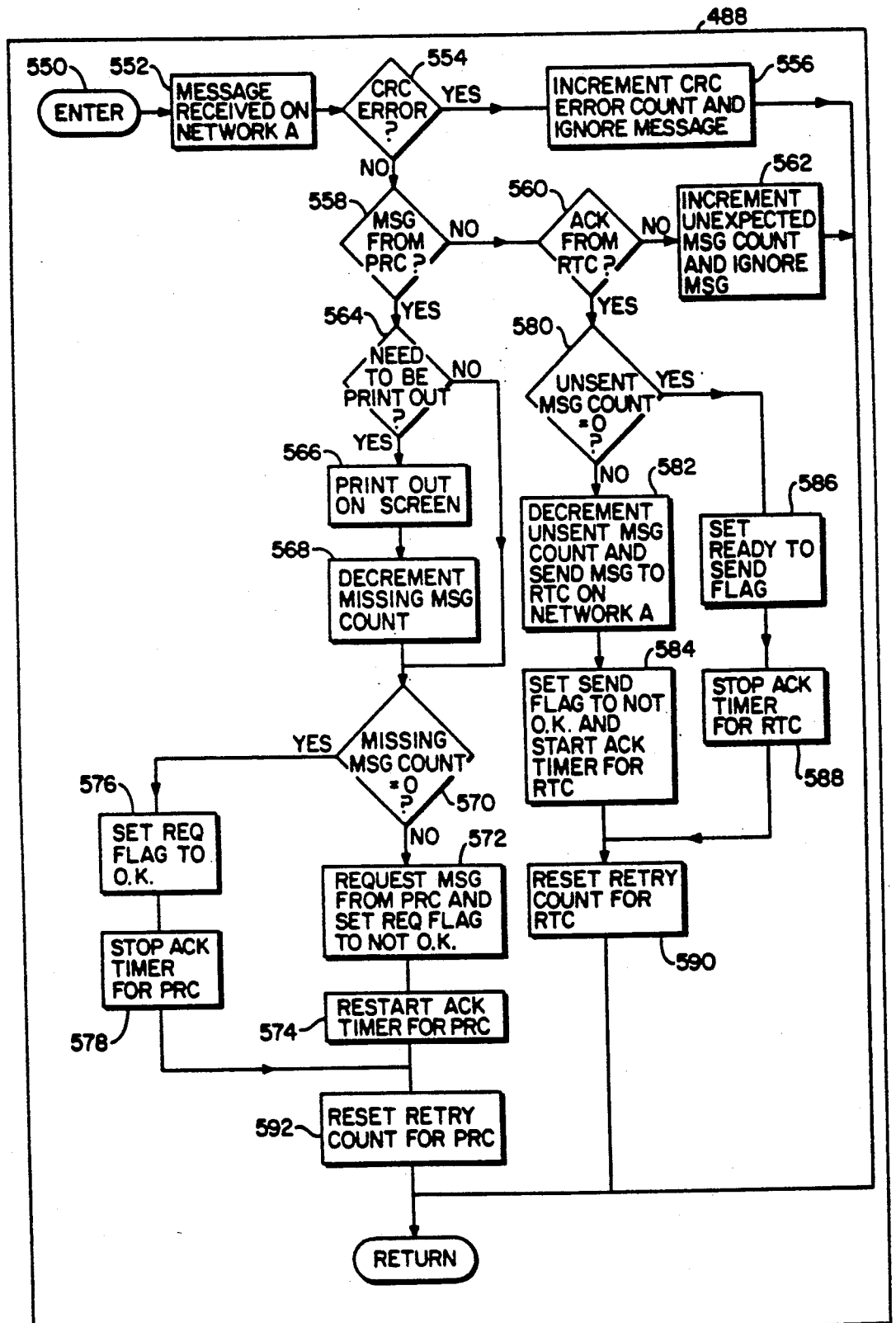
FIG. 31 is a detailed flow diagram of the processing routine block MSGON1 shown in FIG. 27, which is performed when a message is received on network A by the general participant station.

FIG. 31 shows the processing routine MSGON1 488. This processing routine is entered when there is a message received on network A16 by the general participant station 26 (tested for by decision block 486 in FIG. 27). This means either an acknowledgement message has been received from the retransmission station 20 or a reply message has been received from the playback recorder station 26. CRC error handling is very simple. The CRC error is recorded and the message is discarded and ignored completely (blocks 554–556). If the message is an acknowledgement message from the retransmission station 20 and is ignored, the acknowledgement timer as described in the processing routine ACKTM1 476 would expire—causing the general participant station 24 to resend the message.

If the message is a reply message from the playback recorder station 26 (tested for by decision block 558) and this message is ignored, the acknowledgement timer as described in the processing routine ACKTM2 480 expires. The request message is resent by the general participant station 24. If the message is an acknowledgement message from the retransmission station 20 (decision block 560), the next complete message typed in from the keyboard (as will be described in KEYINP 492) is sent to the retransmission station 20 for broadcasting (block 582). If the message is a reply message from the playback recorder station 26 (tested for by decision block 558), the message is checked to see if it is for conference 10,000 (block 564). If it is, the message is displayed (block 566).

Figure 32:
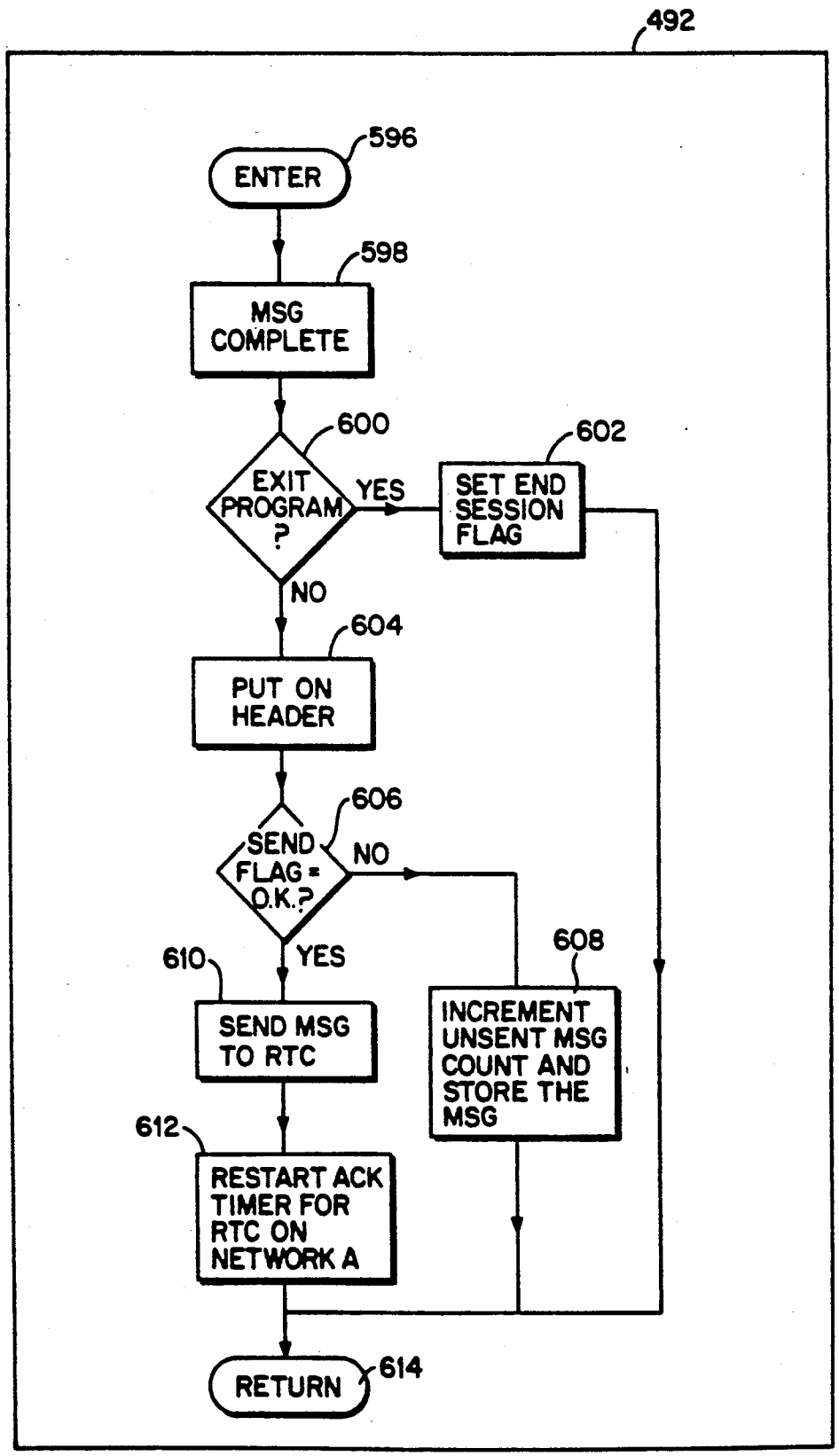
FIG. 32 is a detailed flow diagram of the processing routine block KEYINP shown in FIG. 27, which is performed when a complete message to be transmitted has been inputted via the keyboard or other input device of the general participant station as shown in FIG. 1.

FIG. 32 shows the processing routine KEYINP 492. This routine is entered when there is a completed message entered from the keyboard (tested for by decision block 490 of FIG. 27). The completed message can be an end of program indication (block 600, 602) or a message to be broadcasted using conference 10,000 (blocks 604–612).

Figure 33:
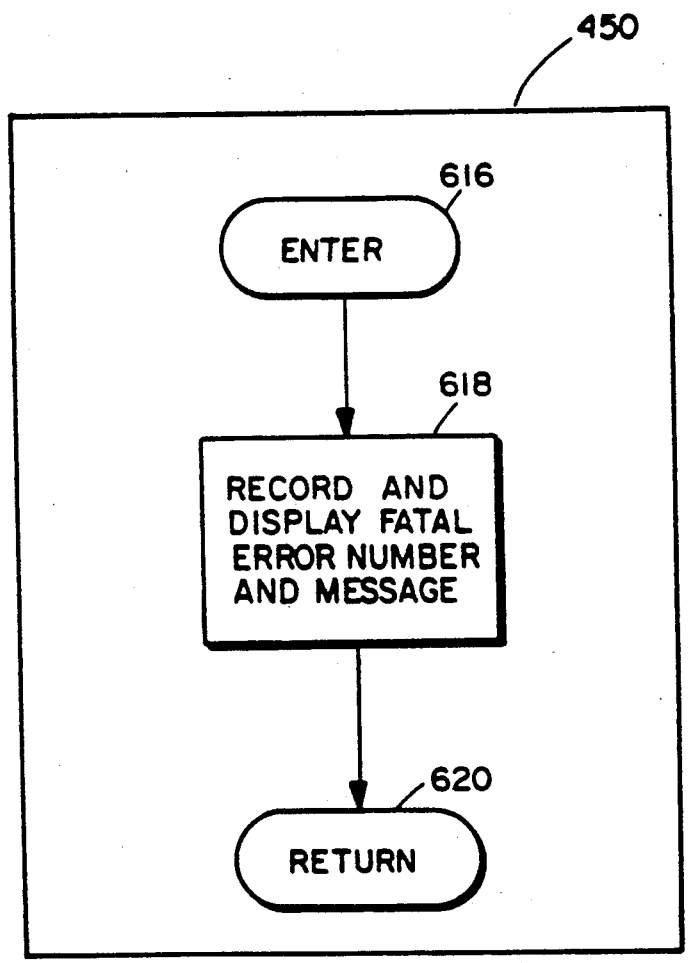
FIG. 33 is a detailed flow diagram of the fatal error handling block shown in FIG. 25.

FIG. 33 shows the fatal error handling routine 450 for the general participant station 24.

The fatal errors to be considered here are the failure to get an acknowledgement message from the retransmission station 20 and the failure to get a reply message from the playback recorder station 26 after maximum number of retries. The fatal error handling here is very simple. A message is displayed and the program exits (block 618). Note that in this case, the next processing step 452 on FIG. 25 stores the last good message. This stored information serves as the initial value when the program is started once again.

ADDITIONAL EMBODIMENTS

Second Embodiment

Figure 34:
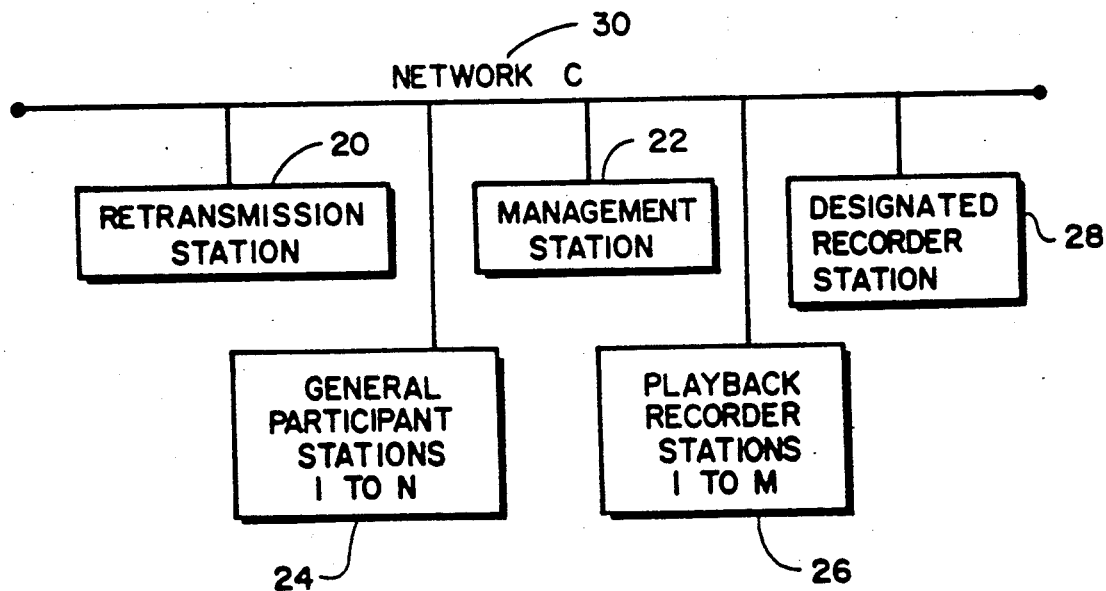
FIGS. 34-39 are generalized schematic diagrams of further exemplary non-limiting embodiments of the present invention.

Another preferred embodiment of the present invention is shown on FIG. 34. This second embodiment is different from the first embodiment shown in FIG. 1 in that it includes a management station 22. The functions of this management station 22 may include the following:

(1) Handling start and stop of conferences. Conference number 1 is special in this embodiment. It is sometimes referred to as the "global conference" and is used by the management station 22 to announce information to all the other stations. Such information may include:

(a) Requesting all playback recorder stations to identify themselves, their characteristics and capabilities (such as storage capacity, the conference numbers they will record, etc.).

(b) Announcing the start of a new conference. The announcement message includes conference number, conference initiator information, conference title, brief description of conference, who are the invited writers and readers of the conference, and which playback recorder stations 26 will record the conference.

(c) Announcing the end of an existing conference. A conference may be ended by explicit request from one of the conference controllers to the management station, expiration of conference end date, or commands from the management station;

(d) Announcing unexpected events. The entire network may have to be taken down for software or hardware update reasons or because of communication or electrical power problems.

(2) Authorization of new conferences. A general participant station 24 wanting to start a new conference must get a conference number from the management station 22 so as to avoid any conference number conflicts.

(3) Handling of confidential conferences. Some conferences may hold confidential information and only authorized users can write or read the information. The steps required to handle confidential conferences are as follows:

(a) Conference numbers 10 to 9,999 are reserved for confidential conferences in the preferred embodiment. The retransmission station 20 accepts messages for these conferences only if they come from the management station 22. That is, messages with a conference number in the range 10 to 9,999 from any of the general participant stations 24 are rejected.

(b) Before any general participant station 24 can send or receive messages on a confidential conference, they must be pre-registered with the management station 22. This mean they must provide certain information to the management station 22 beforehand. Such information is not sent over the network for security reasons. Such information may include node and sender identification, authorization level, an encryption/decryption key for communication with the management station 22 and other information to be used for user authentication purposes.

(c) Assume general participant station 24(1) wants to start up a confidential conference with general participant stations 24(5)–24(7). It would first communicate with the management station 22. The management station 22 executes an authentication procedure to ensure that general participant station 24(1) is genuine and not an imposter. The management station 22 then communicates with general participant station 24(1) to get information such as conference title, brief description, list of allowed writers, list of allowed readers and how conference should end. The management station 22 then allocates a conference number between 10 and 9,999 for this conference. The data in the one-to-one communication between the management station 22 and general participant station 24(1) is encrypted for secure communication using a pre-registered encryption key.

(d) The management station 22 then sends a conference startup message on global conference number 1 announcing the start of this new conference (for example, conference number 99). Information about conference title, brief description, list of allowed writers, list of allowed readers, and list of playback recorder stations 26 is contained in the conference startup message.

(e) When general participant stations 24(5)–24(7) hear that they are allowed readers on this new conference 99, they each communicate with the management station 22—which authenticates them using an authentication procedure. A conference 99 decryption key is provided to general participant stations 24(5)–24(7). This decryption key must be used to decrypt all messages for conference 99. All readers for conference 99 are given the same decryption key.

(f) Assume general participant station 24(7) is an allowed writer on this new conference 99 and that it wants to write to this conference 99. It sends a message to the management station 22 encrypted with an individual encryption key previously pre-registered with the management station 22. The management station 22 decrypts the message with the individual key and re-encrypts it with the conference 99 encryption key. The encrypted message will then be sent to the retransmission station 20 for broadcasting on network B18. Note that writers for conference 99 do not need to have access to the decryption key for conference 99. Such a scheme allows for authentication of readers and writers of conferences, separation of reader and writer lists and prevention of unauthorized conference participation. The actual authentication, encryption/decryption schemes used could be company or application specific.

(4) Handling of error and/or statistics information. Non-fatal errors or statistical information can be sent via a reserved conference such as conference number 2. The management station 22 can then analyze or display such information. Another example of error handling is the detection of failure of the retransmission station 20, the designated recorder station 28 and the playback recorder stations 26. In particular, failure of a playback recorder station can be detected by periodically sending it messages via one-to-one techniques.

The functions described for the management station 22 above are just some examples. It is possible to have variation of the above technique such as having all conference numbers preassigned for specific uses and/or the use of public and private key schemes for data encryption and decryption. It is also possible to provide some or all of the above described functions in other stations. Additional functions such as network security, alarms and resource allocation are also possible.

Private and public key technique refers to the technique in which keys come in pairs. If the private key is used to encrypt the message, the public key must be used to decrypt the encrypted message and vice versa. Furthermore, even if one knows the public key and the encryption/decryption scheme, one cannot derive the private key.

The embodiment shown in FIG. 34 uses a single bus network C configuration instead of the dual bus arrangement shown in FIG. 1 (although, of course, management station 22 could easily be incorporated into the dual as architecture of FIG. 1). Cost can be reduced by using a single bus network configuration. However, the broadcast communication from the retransmission station 20 to the designated recorder station 28 needs to compete with other one-to-one communications on the same network. The chances of missing messages thus increases with increasing amount of traffic. There is a small possibility of getting into a situation known as "catastrophic jamming" in some networks such as Ethernet. This situation occurs when messages are lost due to high volume of traffic. The recovery technique introduces more network traffic in order to recover the lost messages. This additional traffic, in turn, causes more lost messages. The whole network may become unusable because of this vicious circle.

The chance of catastrophic jamming can be reduced by a number of ways such as by reducing the load on each segment of the network through the use of hardware devices such as bridges; broadcasting alarm messages to slow down the recovery mechanism; global replay of previously broadcasted messages; and/or improved flow control schemes between the retransmission station 20 and the designated recorder station 28 or other similar schemes.

Third Embodiment

Figure 36:
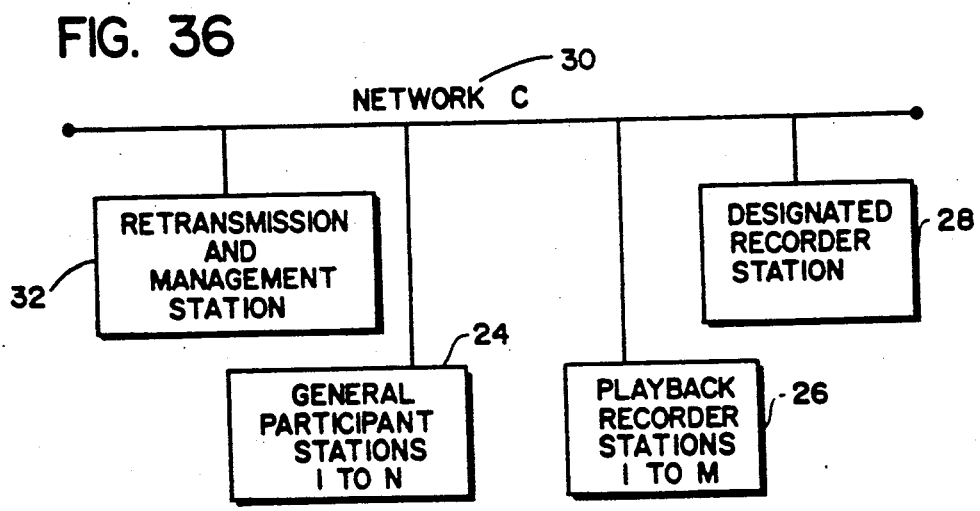

A further presently preferred embodiment of the present invention is shown in FIG. 36. This further embodiment includes a station 32 which performs the functions of the retransmission station 20 and the management station 22. The advantages of this arrangement are reduced cost and reduced number of active stations on the network. A disadvantage is the additional complexity introduced in the combined station 32. Many of the functions of the management station 20 are optional and can be added or modified over time. The systems may be able to tolerate loss of the management station 22 for short periods but loss of the retransmission station 20 is fatal. If the combined station 32 goes down, the system ceases to operate.

It is possible to have two or more management stations. For example, one may be used to handle confidential conferences and the other can handle all other functions. When a combined station 32 is used, such possibility disappears.

Fourth Embodiment

Figure 37:
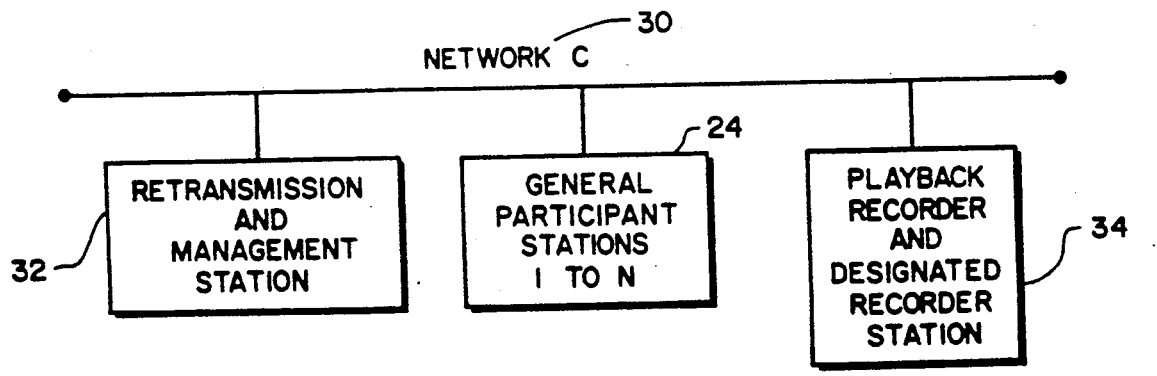

A still further presently preferred exemplary embodiment in accordance with the present invention is shown in FIG. 37. This fourth embodiment includes a single station 34 which performs the functions of both the playback recorder station 26 and the designated recorder station 28. The advantages of this embodiment are further reduced cost, and the reduced number of active stations on the network. Disadvantages of this embodiment include:

(1) If the number of general participant stations 24 increases to many thousands, they would all try to communicate with a single station 34 to recover messages. The problem would be serious if a lot of these general participant stations 24 all wanted the missed messages at the same time such as at the beginning of the day.

(2) As separate stations, some of the playback recorder stations 26 can also act as file servers to some of the general participant stations 24. This is not possible for a combined station 34 in a large network environment, however, station 34 could also perform file server functions.

Fifth Embodiment

Figure 39:
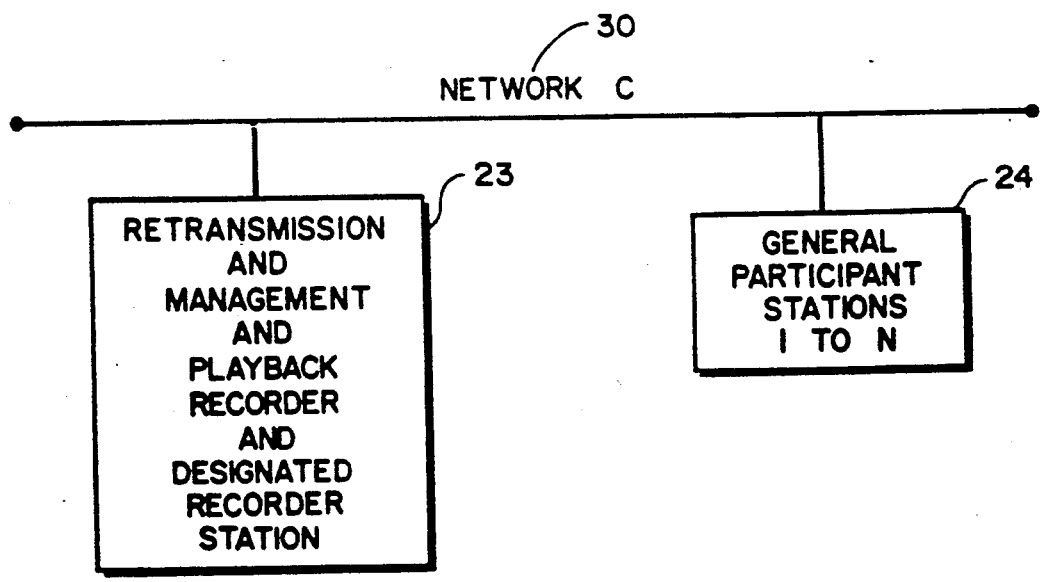
Figure 38:
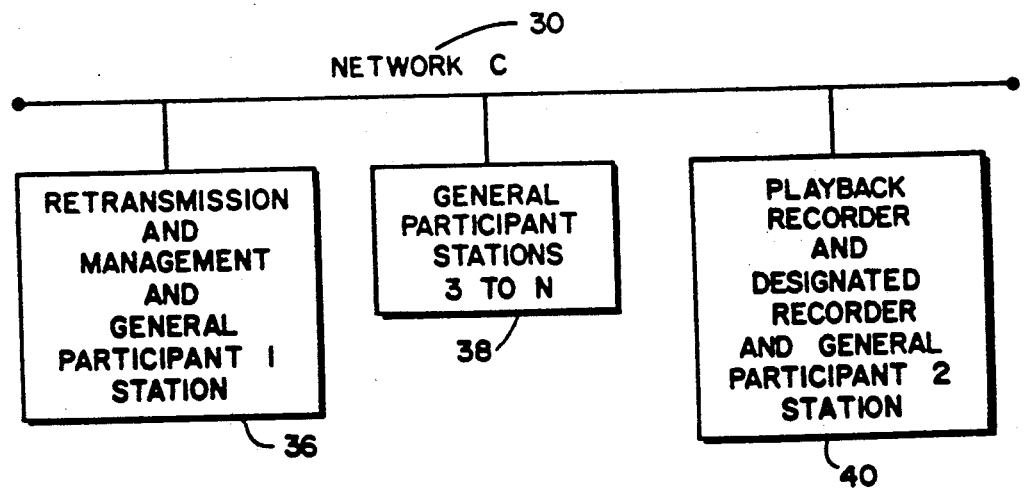
Figure 40:
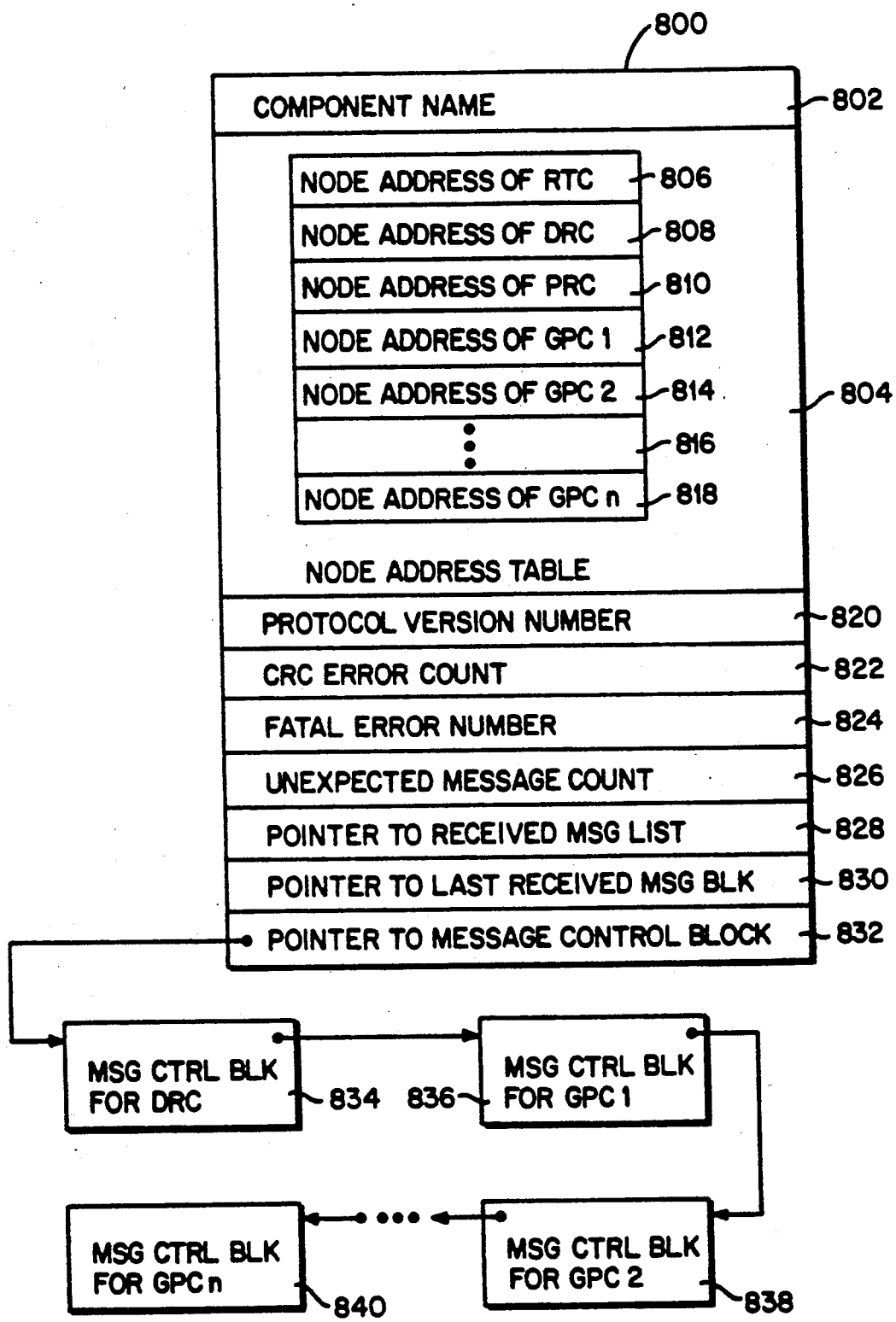
FIG. 40 shows exemplary data structures for the retransmission computer.
Figure 42:
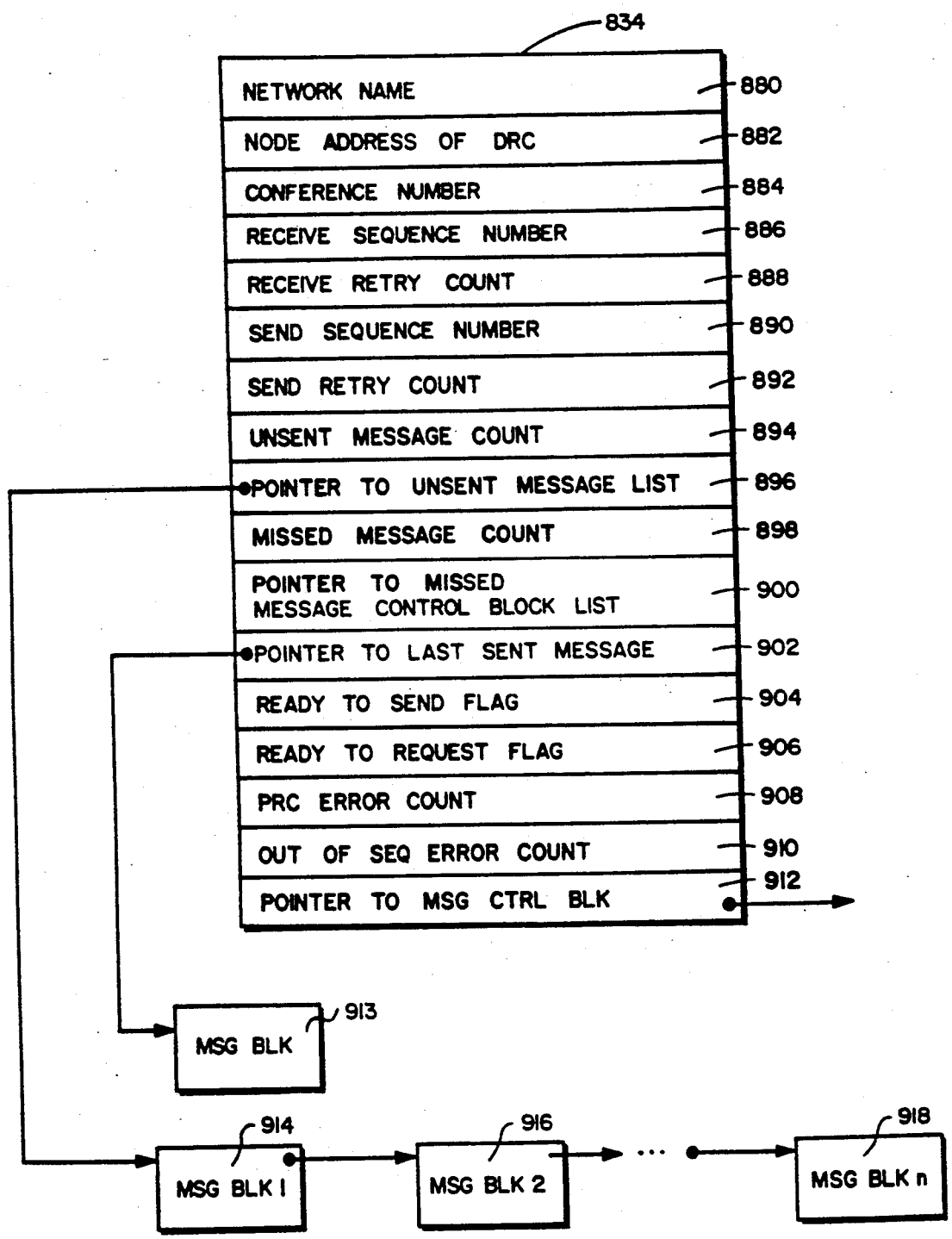
FIG. 42 shows an exemplary message control block which is used to keep track of the activities between the retransmission computer and the designated recorder computer on network B as specified in FIG. 40.

A further presently preferred embodiment in accordance with the present invention is shown on FIG. 38. This further embodiment includes a general participant station 24(1) combined with the combined retransmission and management station to produce a combined station 36. Furthermore, another general participant station 24(2) is combined with the combined playback recorder and designated station to produce the combined station 40. The advantages of this embodiment include reduced cost and reduced number of active stations on the network. The disadvantages include the following:

(1) Increased complexity for the combined station 36 and the combined station 40;

(2) If any one of these combined stations go down, the system ceases to function; and (3) Multitasking capability is needed for the combined station 36 and the combined station 40. Sixth Embodiment A still further presently preferred exemplary embodiment of the present invention is shown in FIG. 39. This embodiment combines the functions of the retransmission, the management, the playback recorder and the designated recorders in a single station.

The advantages of this embodiment are:

(1) Lower cost;

(2) Reduced number of active stations;

(3) No acknowledgement from the designated recorder station 28 is required. The combined station 23 just stores the broadcast messages before sending them out on network C30.

The disadvantages of this minimally configured embodiment are:

(1) Increased complexity for the combined station 23;

(2) Single point of failure at the combined station 23;

(3) Higher load on a single station especially when a lot of general participant stations 24 all want the missed messages at the same time such as at the beginning of the day;

(4) Some transmission errors are not easily or readily detected as there are no acknowledgement messages sent from the designate recorder station 28.

(5) A slow or faulty general participant station 24 can slow down the combined station 23 by constantly asking for missed messages.

Seventh Embodiment

Figure 77:
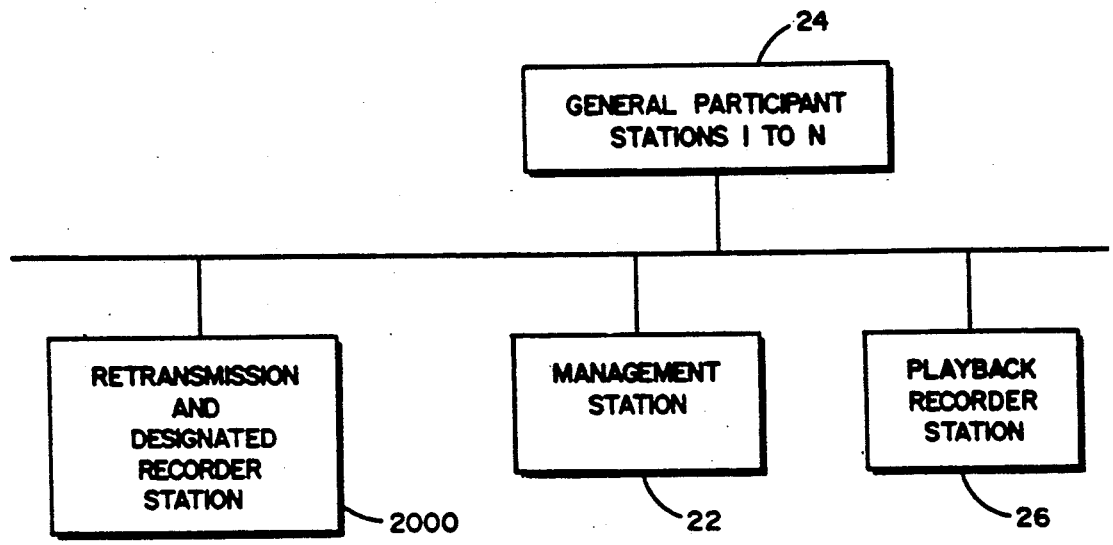
FIG. 77 is a generalized schematic diagram of the seventh embodiment of the present invention.
Figure 78:
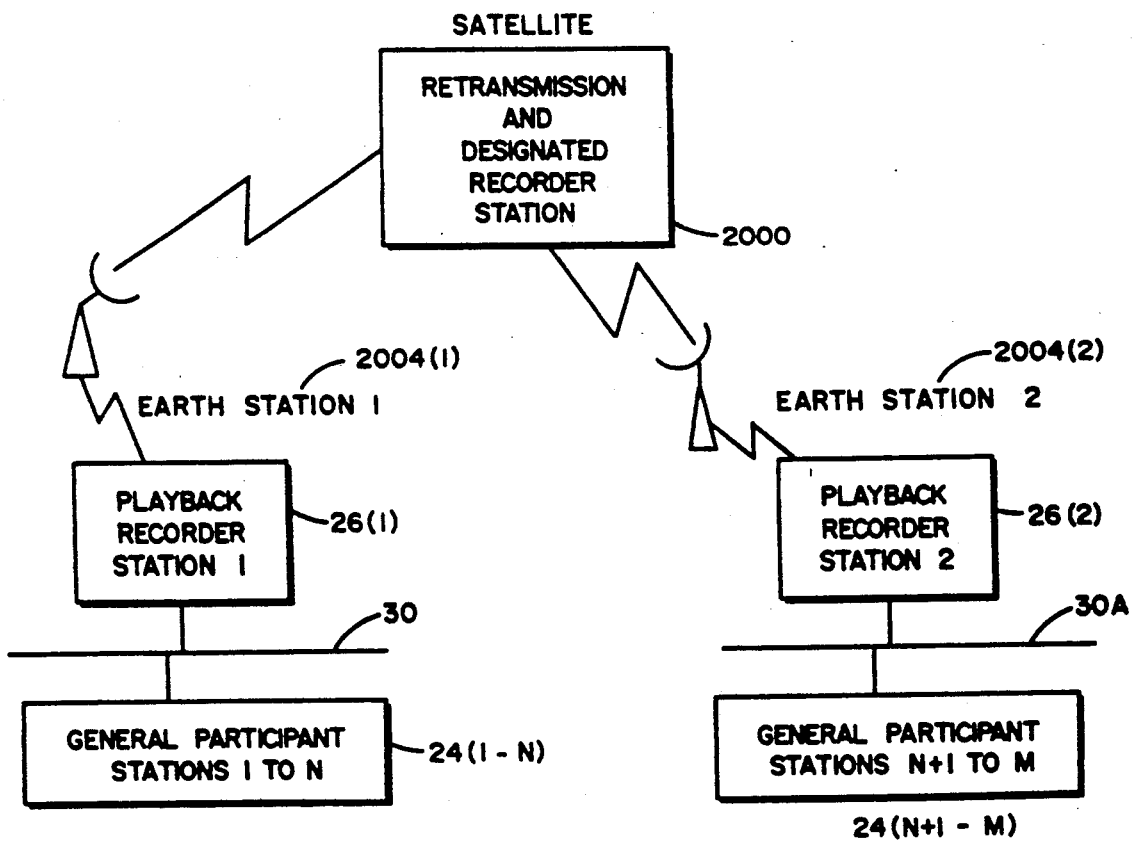
FIG. 78 is an exemplary system to implement the seventh embodiment of the present invention.

The seventh embodiment is specially modified to fit satellite transmissions. In this embodiment shown in FIG. 77, the function of the retransmission station 20 and that of the designated recorder station 28 are combined. In FIG. 78, the application of this embodiment in a satellite environment is illustrated. The combined station 2000 is put on board the satellite.

The playback recorder stations 26 and the general participant stations 24 are grouped into distinct sites. Each site is connected to an earth station capable of sending and receiving information to and from the satellite. Each site will also have at least one playback recorder station 26 capable of recording the conference messages used by the general participant stations 24 at that site. This playback recorder station 26 is connected to the rest of the nodes at the site via a local area network such as Ethernet.

The steps involved in achieving guaranteed, reliable broadcast in this embodiment are as follows:

(1) A message sending general participant station 24 forwards its message to the earth station.

(2) The earth station sends the message to the combined station 2000 on board the satellite.

(3) The combined station 2000 puts on the special message header 44, stores the enhanced message and then broadcasts the enhanced message.

Note that the combined station 2000 does not expect an acknowledgement message from any node in the network. It is possible that this broadcast message may contain errors.

(4) The broadcasted message is received by the earth stations which then broadcast the message on the local area networks.

(5) A playback recorder station 26 will examine the broadcasted message to detect for omission or distortion. If there were no errors, the message will be discarded or stored depending on the conference number field 52.

If there were errors, the playback recorder station 26 will request the combined station 2000 for rebroadcasting via the earth station.

(6) The combined computer 2000 will not form a one-to-one communication pair with the playback recorder station 26 to provide the missing/distorted message. It sends the requested message in a global conference (e.g., conference number 3).

This is done because many playback recorder stations 26 and general participant stations 24 may be missing the same message at the same time especially if the error occurs at the transmission end of the combined station 2000.

Furthermore, if two or more playback recorder stations 24 request the same message within a limited, predefined time interval, the missing message will be sent only once within this time interval and every requesting station will have the missed message.

(7) The playback recorder station 26 listens to conference 3 for its requested message. If the requested message does not appear within a certain time interval, it will request the message again.

(8) A general participant station 24 will listen to the enhanced message routed by the earth station as described in step 4. If it detects message omission or distortion, it can optionally first listen to global conference number 3 before requesting the missed/corrupted message from a playback recording station 26.

Thus, in this embodiment, all the key elements of the present invention are preserved, namely:

(1) Detection and recovery from message errors to achieve reliable one-to-many or many-to-many data communications;

(2) Storing and retrieving messages on playback recorder stations 26 so that a general participant station 24 can leave and rejoin the conference without losing any data;

(3) Global message sequencing allowing serialization of database requests.

The advantages of this embodiment are:

(1) It is specially adapted for communications such as those for satellites. The delay associated with message acknowledgement is eliminated.

(2) Many messages can be outstanding to take into consideration the fact that transmission delay in such environments is significant.

(3) Broadcasting the missed message decreases the probability of catastrophic jamming.

The disadvantages of this embodiment are:

(1) Added complexity; and (2) Large memory buffer requirements as many good messages must be temporarily stored while a request is made to recover the bad one.

Eighth Embodiment

Figure 79:
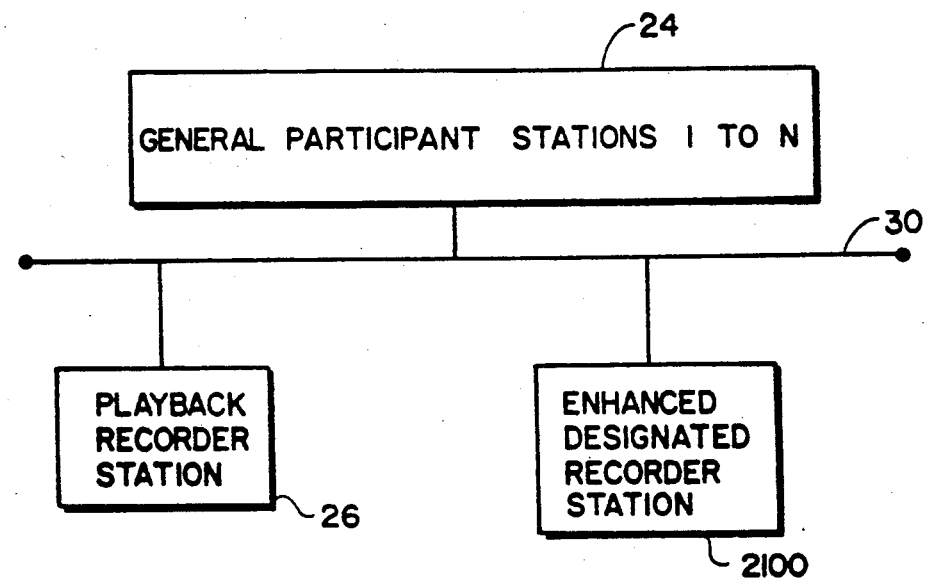
FIG. 79 is a generalized schematic diagram of the eighth embodiment of the present invention.
Figure 81:
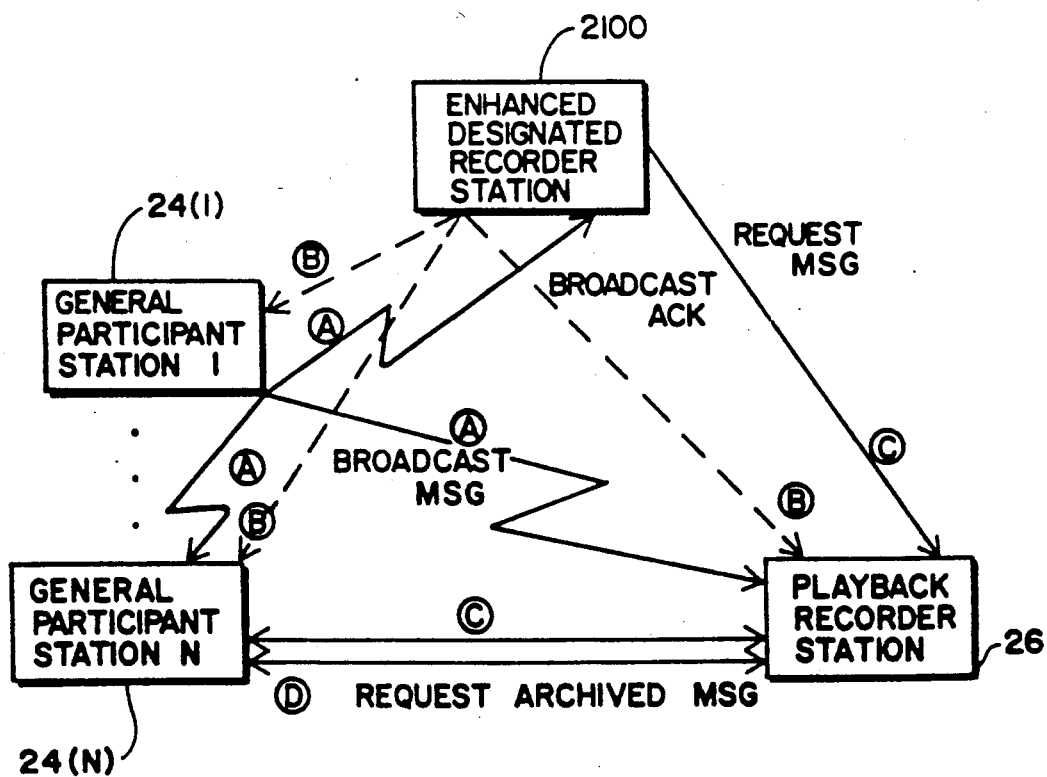
FIG. 81 is a schematic diagram illustrating typical communications exchanges in the FIG. 79 system.

This embodiment is typically applicable only for local area networks. In this embodiment shown in FIGS. 79-81, most of the function of the retransmission station 20 is incorporated into an enhanced designated recorder station 2100. This embodiment is suitable only for local area networks where all nodes can broadcast or multicast. It cannot be used on satellite systems.

The steps involved in achieving reliable broadcast in this embodiment are as follows:

(1) A message sending general participant station 24 puts on the special message header 44 to its message;

(2) It then broadcasts the enhanced message directly on the network and then waits for an acknowledgement message from the enhanced designated recorder station 2100. This enhanced designated recorder station 2100 is responsible for maintaining and updating the global message sequence number and supplying the time information.

Figure 80:
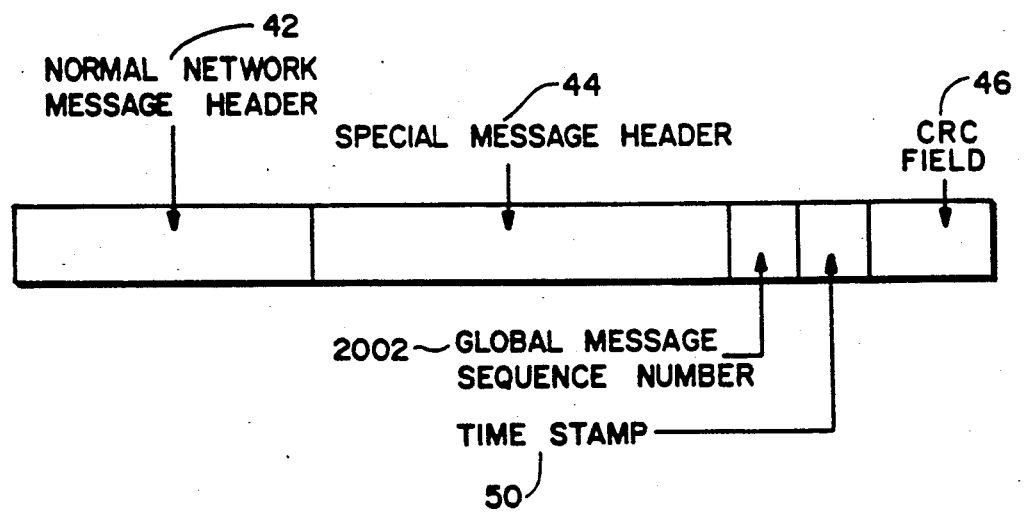
FIG. 80 is an exemplary format of the acknowledgement message discussed in the eighth embodiment of the present invention.

(3) The acknowledgement message sent from the enhanced designated recorder station 2100 contains the updated global message sequence number and the time stamp information as data (FIG. 80). The special message header 44 is the same as that of the message sender. This acknowledgement message is also broadcasted directly on the network.

(4) A playback recorder station 26 listens to both the message and the message acknowledgement. To determine whether a message is missing, it will first look at the global sequence number contained in the acknowledgement message. It then does a compare function to find the message that matches the acknowledgement.

If the acknowledgement message is missing (out of sequence), the playback recorder station 26 will request the enhanced designated recorder station 2100 to send both the missed acknowledgement message and the associated message to it using a reliable one-to-one technique.

If a data message is missing (determined when there is no matching message header when an acknowledgement message is received), the playback recorder station 26 can determine whether it wants messages from the conference number field. It will then request for the missing message from the enhanced designated recorder station 2100 if needed.

(5) A general participant computer 24 receives and detects message errors in the same way as a playback recorder station 26 except that it requests for missed messages from a playback recorder station 26.

Thus, in this embodiment, all the key elements of the present invention are preserved, namely:

(1) Detection and recover from message errors to achieve reliable one-to-many or many-to-many data communications;

(2) Storing and retrieving messages on playback recorder station 26 so that a general participant station 24 can leave and rejoin the conference without losing any data;

(3) Global message sequencing allowing serialization of database requests.

The advantage of this embodiment is:

A broadcast message is sent only once from the message source.

The disadvantages of this embodiment are:

(1) It cannot be used on satellite type systems as all nodes must be able to broadcast directly;

(2) Added complexity as all nodes listen both for broadcast messages and broadcast acknowledgements. Matching between the broadcast messages and the broadcast acknowledgement messages is required.

(3) Large buffer requirements as there can be many broadcast messages (one from each possible source) before any acknowledgement message is received.

(4) Lack of flow control mechanism. The enhanced designated recorder station 2100 cannot easily slow down the message rate from the many independent message sending general participant stations 24.

Other combinations of the various stations are possible. Examples of these may be a modification of the FIG. 34 embodiment with playback recorder station 26 and a general participant station implemented as a combined station.

ERROR RECOVERY

Assume the same hardware is used in network A16 and network B18 in FIG. 1. If network A16 fails, network B18 can be used to carry the total network traffic. If network B18 fails, network A16 can be used to carry the total network traffic. A general participant station 24 can go down any time. To recover, a backup copy can be used. The backup copy first determines which message it last correctly received. It then requests a playback recorder station 26 to send to it all the missed messages. The playback recorder stations 26 run all the time and each can record one or more conferences. Preferably more than one playback recorder station 26 records any particular conference. Loss of one playback recorder station 26 is not fatal. A playback recorder station 26 can be recovered by using a backup to request another playback recorder station to send to it all the missed messages. Conventional, redundant, hot standby stations are recommended for the retransmission station 20, the management station 22 and the designated recorder station 28.

SATELLITE DELAY

In satellite communications time delay is significant because the electrical signal needs to be sent to the satellite and back. If every message must be acknowledged before the next message is sent, the performance of the network will be very slow. The following improvements are suggested:

(1) The retransmission station 20 can send a group of messages before receiving acknowledgements from the designated station 28. This is known in the data communication industry as the "communication window" technique.

(2) The retransmission station 20 can be put on board the satellite. This cuts down on transmission delay. One problem of putting a data processing station on board a satellite is the exposure to cosmic rays (the earth's atmosphere absorbs most of these rays). Error rates are expected to be higher.

(3) The designated recorder station 28 can also be put on board the same satellite or on another close by satellite. The acknowledgement messages can be sent a lot faster. An alternative is to implement the retransmission and the designated recorder functions in the same station.

(4) Not every station needs to have satellite communication capabilities. The stations can be grouped and connected using local area networks. One of the stations in a local area network will have satellite communication capabilities and handles the conference traffic on behalf of the other stations in the same local area network.

USING THE PRESENT INVENTION IN NETWORKS IN WHICH BROADCAST CAPABILITY IS NOT EXPLICIT SUCH AS TOKEN RING NETWORKS

Figure 35:
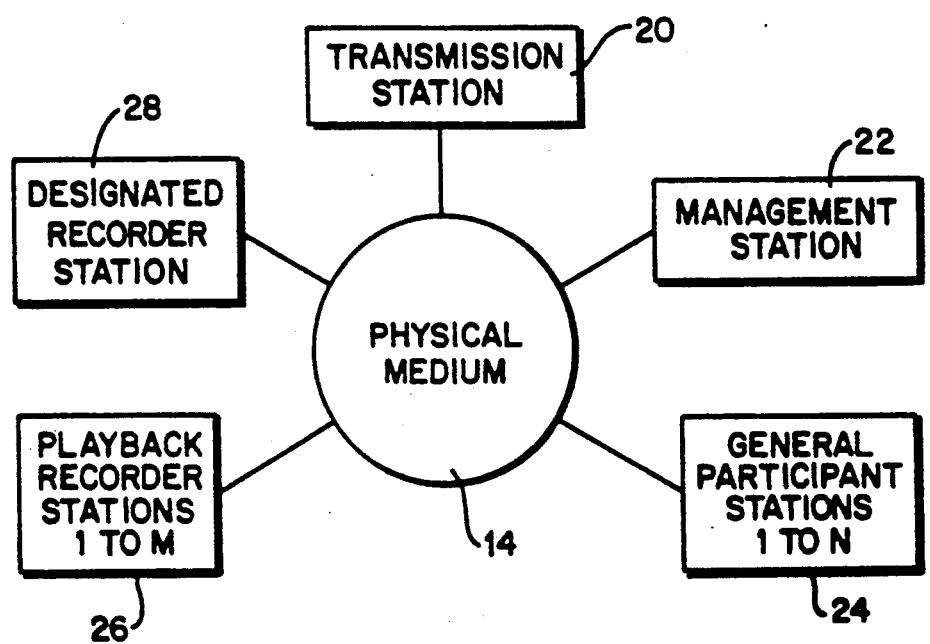

For some networks, the broadcast capability is implicit. For example, in a token ring network as shown in FIG. 35, a message sent out by any station in the ring will travel completely once around the ring back to the original sender before the transmission of the message is regarded as complete. Any station in the same token ring network could listen to the message even if the message is not destined for it by providing slightly modified hardware or microcode. If the microcode allows reception of messages not designated for the station (such as those already available for network management nodes), any station effectively supports broadcast.

USING HARDWARE TO IMPROVE THE EFFICIENCY OF THE SYSTEM

The retransmission station 20 does not require secondary storage. A dedicated "black box" type implementation is suitable. The designated recorder station 28 may not require secondary storage if it has enough memory buffer space. Messages are stored only temporarily so that playback recorder stations 26 may have a good chance of recovering missed messages. A dedicated "black box" type implementation can be considered. The communication interfaces on network B18 may need to do a lot of message filtering. That is, they may only allow messages from a particular conference, or from a particular sender, or with particular message fields. This type of filtering may best be done in the hardware using current technology.

CONCEPT OF GUARANTEED RELIABILITY

The concept of guaranteed reliability is important. In data communications, when successful delivery of message is indicated to the application program, the probability of the message getting lost or distorted is so low that it can be ignored for all practical purposes.

For example, the telephone line is commonly quoted as having a bit error rate of $10^{-4}$. If the average size of message to be transmitted is $10^3$ bits, there is a probability of message distortion of 1 in 10. This is much too high for normal real life applications.

The problem is overcome by the use of communication protocols. To detect loss of messages, a message sequence number is used. To detect distorted messages, (1's turned to 0's or vice versa) a technique known as cyclic redundancy check (CRC) is commonly used.

The CRC technique can be understood by comparing it with the concept of arithmetic division. In a division, there is a quotient and a remainder.

In data communication, the data stream to be sent out is the number to be divided (dividend). The divisor is a specially selected number (known as the CRC polynomial). After the division is performed, the quotient is ignored and the "equivalent" of the remainder is appended to the actual data stream (known as CRC value).

On the receiving end, after reception of the data stream, the same division is performed with the same divisor (same CRC polynomial). If there were no errors, the remainder should be the same as the CRC value.

By properly selecting the size and the value of the CRC polynomial, the probability of accepting a distorted message can be kept extremely low. It is obvious that if only one bit is in error, the error can be detected. For multiple bit errors, there is a tiny probability that some errors may not be detected.

However, such a probability on a 32 bit CRC technique when applied to the above-mentioned telephone line example results in one undetected message in about 16 years. Thus, for all practical purposes, such an error probability is ignored.

Whenever errors are detected using the CRC technique, the message will be resent. If the communication line noise is so high that even after a number of retries, a correct message is not received, the message delivery is ceased. The application program will be informed that the message failed to be transmitted.

Thus, the word guarantee, when used in data communication, means successful delivery of message for all common intents or purposes—with substantially 100% reliability.

In the context of this present invention, the word guarantee has a similar meaning. However, there is the possibility that all playback recorders failed disastrously destroying all recorded data. A busy or powered off conference participant station may not get the broadcast message.

In actual practice, this probability is considered low enough to be ignored. If higher reliability is required, more playback recorders can be added.

FLOW CONTROL

One important concept in one-to-one data communications is flow control. This is the technique to slow down (or speed up) the rate at which a message sending data processing station sends messages. This is important because if the message sending data processing station sends messages out too fast, a receiving data processing station may not be able to catch up and loss of messages will result. In the one-to-one data communication environment, message acknowledgement provides an implicit flow control mechanism. If the receiving data processing station is slow or busy, it just delays the sending of message acknowledgement.

With the present invention, if the retransmission station 20 sends messages out too fast for the many playback recorder stations 26, these playback recorder stations 26 will then form one-to-one communication links with the designated recorder 28 to request the missing messages. The designated recorder 28 can use this information to vary its message acknowledgement delay timer. That is, if many playback recorders request missing messages, the designated recorder station 28 slows down the message flow from the retransmission station 20 by increasing the time interval between receiving the message from the retransmission station 20 and sending the acknowledgement message.

With this technique, flow control is achieved. In addition, if several general participant stations 24 are busy or slow, they would get the missing messages from one of the many playback recorder stations 26. If the playback recorder stations 26 can handle such requests, the message flow will not be affected at all. This relieves one of the major concerns in mixed network environment where data processing stations of widely different speeds are connected. The sender does not need to wait for the slowest receiver.

IMPLEMENTATION STRATEGIES

There are many alternative ways of implementing the present invention.

(a) Treat every application independently. Write programs specifically for the particular application.

This approach is taken on the first embodiment because it is easiest to understand and fastest to implement.

(b) Write a set of common subroutines for the application programmers.

The system programmer defines an application program interface and "hides" all the protocol and network configuration complications from the application programmer.

The application programmer issues subroutine calls to use this application program interface. These subroutines are linked to his program image.

This approach is taken under the discussion on the uses of the present application. This approach makes it very easy for application programmers to program. They do not even have to know how the present invention works.

(c) Incorporate the invention as a "communications executive" into the operating system.

This is the most efficient way as far as memory usage and code efficiency is concerned. However, this means modifying the operating system developed by a different vendor.

In most cases, this approach should not be taken unless there is extremely close cooperation with the vendor who develops/maintains the operating system.

COEXISTENCE WITH CONVENTIONAL SYSTEM

It is possible for the present invention to coexist with conventional systems via the use of a "translator node."

For example, an electronic mail message is to be sent to 1,000 other nodes on the network. Some of these 1,000 nodes can use the present invention whereas others can only use the conventional one-to-one technique. The sender can use the conventional mailing list distribution technique except that the "translator node" is included in the mailing list.

The "translator node", after receiving the mail message on the conventional one-to-one basis, uses the present invention to broadcast it. Thus, coexistence is achieved.

SUBROUTINES FOR THE APPLICATION PROGRAMMER

The detailed steps discussed in the preferred embodiments require a systems programmer for actual implementation. One of ordinary skill in the art (system programmers) could easily implement a set of subroutines using the exemplary program control steps shown in FIGS. 5-33 and the data structures shown in FIGS. 40-59 without having to experiment an undue amount. Application programmers can use this set of subroutines without worrying about how the invention works. The following is an example of such a set of subroutines.

(1) SETUP-CONFERENCE (P1, P2, P3...P9)
where  P1 = conference type (confidential or nonconfidential)
P2 = expiration date of conference
P3 = success or failure indicator
P4 = returned conference number value if successful
P5 = pointer to list of controllers (i.e., those who can stop conference, modify lists of controllers, allowed writers or allowed readers)
P6 = pointer to list of allowed writers if conference is confidential
P7 = pointer to list of allowed readers if conference is confidential
P8 = pointer to an optional message that would be broadcasted together with the start conference message
P9 = pointer to conference title (2) STOP-CONFERENCE (P1, P2, P3)
where  P1 = conference number
P2 = pointer to an optional message that would be broadcasted together with the stop conference message
P3 = success or failure indicator (3) WRITE-CONFERENCE (P1, P2, P3)
where  P1 = conference number
P2 = pointer to message to be broadcasted
P3 = success or failure indicator (4) READ-CONFERENCE (P1, P2, P3)
where  P1 = conference number
P2 = pointer to buffer where received message is to be stored
P3 = success or failure indicator (5) SET-MASK (P1, P2, P3)
where  P1 = conference number
P2 = pointer to message mask. The mask can be based on sender name, message type, or message content values.
P3 = success or failure indicator (6) MODIFY-CONFERENCE (P1, P2...P5)
where  P1 = conference number
P2 = type of information to be modified, namely
(a) list of conference controllers
(b) list of conference writers
(c) list of conference readers
P3 = add or delete indicator
P4 = pointer to list specified in P2
P5 = success or failure indicator (7) READ-GLOBAL-EVENTS (P1, P2, P3)
P1 = number of global events (or messages) outstanding
P2 = pointer to buffer storing the first outstanding global event (or message)
P3 = success or failure indicator

USES OF THE PRESENT INVENTION

The various examples first discussed in the summary section will now be enhanced. In particular, it will be shown how these examples can be implemented by an application programmer using the above discussed program interface.

1. Stock Market Trading Systems

In conventional systems (see FIG. 60), information from various stock exchanges are fed into a single data processing station in a brokerage firm. Customers asking for stock quotes or giving buy and sell orders access this single data processing data station. On an extremely busy day, the single data processing station cannot cope with the peak demand. Not much can be done even if heavy trading were expected a few days in advance. Thus, the conventional system has the serious drawback that it cannot easily expand to accommodate additional users.

With the present invention, the information from various exchanges are broadcasted using the guaranteed reliable one-to-many data communication technique. The brokers or customer representatives can selectively capture, display or analyze the broadcasted information on their personal computers or workstations. If heavy trading is expected, more people and more personal computers can be added to handle customer requests for stock quotes, buy or sell orders.

The following shows how the concept can be implemented by an application programmer:

(a) At central site where stock quotes are broadcasted. Main processing steps concerned with broadcasting stock quotes are:

| | |
|---|---|
| Step 1 | get stock quotes information; |
| Step 2 | broadcast stock quotes by CALL WRITE-CONFERENCE, then go back to step 1. |

(b) At broker or customer representation work station, the main processing steps concerned with receiving broadcasted stock quotes are:

| | |
|---|---|
| Step 1 | setup the filter specific for the customer by CALL SET-MASK; |
| Step 2 | receive information by CALL READ-CONFERENCE; |
| Step 3 | process message in buffer then go back to step 2. |

We can compare this with a human conference where there is only one speaker. It is very easy to increase the number of listeners without affecting the speaker or the conference. As far as the speaker is concerned, speaking to 300 listeners is the same as speaking to 1,000 listeners. This present invention provides an easily expandable solution lacking in the prior art techniques.

2. Software Distribution

In a conventional software distribution system, software and/or updates may be sent electronically via the network (instead of by distributing diskettes or the like) on a one-to-one basis (needless to say, absolutely reliable receipt of software updates is critical to the integrity of the system and the proper functioning of each update recipient). This technique has the drawback that it requires close coordination between the software distributing data processing station and the receiving data processing stations. Distributing the same software to 1,000 receiving stations involves sending the same information separately 1,000 times. Suppose, for example, that a company wishes to distribute a new software application program to all 1,000 of its offices around the world. If each transmission takes 15 minutes on the average, transmission to all offices will take over ten days. This time delay may not be acceptable—since different software releases (the old version and the updated version) may be incapable of coexisting on the network.

With the present invention, software and/or updates can be sent using the guaranteed reliable and secure one-to-many technique. If desired, confidential conference features of the present invention using the management station can ensure that only authorized users can send and/or receive the updates. The software distributing data processing station does not need close coordination with the many receiving data processing stations. In the preferred embodiment, distributing the same software to 1,000 receiving data processing stations involves sending the same information only twice in an error free environment. The time taken will be about thirty minutes instead of over ten days. The receiving data processing stations are guaranteed to receive the complete and correct information.

The following shows how the concept can be implemented by an application programmer (see FIG. 62).

(a) At software distribution site, main processing steps are:

| | |
|---|---|
| Step 1 | read in a block of the software to be distributed; |
| Step 2 | broadcast the block by CALL WRITE-CONFERENCE, then go back to step 1 until the whole software program is broadcasted; |
| Step 3 | broadcast an END OF FILE MESSAGE. |

(b) At the receiving sites, main processing steps are:

| | |
|---|---|
| Step 1 | turn on system (if system is not already turned on); |
| Step 2 | receive the software by CALL READ-CONFERENCE; repeat step 2 until an END OF FILE MESSAGE is received. |

3. Teaching or Demonstrations

In a conventional system, a teacher shows the output appearing on the screen of his terminal or personal computer to his students. He may optionally use a projection device to show the information to a larger audience. This arrangement requires all of the students to be in the same classroom or in the same time zone.

With the present invention, the teacher can send his screen output as a broadcast message using the guaranteed, reliable one-to-many technique. Students can display this screen output on their own personal computers. These students need not be in the same classroom. Because of the archiving capability of the playback recorder station, the students need not even be in the same time zone—and students unable to "attend" a lecture in real time can view the lecture at a later time and/or date. Furthermore, because only the screen output is displayed, the students do not need to have the demonstration software at their personal computers. The situation can be compared to capturing the demonstration on a TV camera, simultaneously displaying it on plural television receivers, and storing it on videotape recorders.

The fact that special demonstration software (or special demonstration hardware) is not required at students' receiving stations is significant—since students with only minimally configured systems can participate by viewing the display screens. The screens might be generated at the transmission end using a large mainframe computer with specialized sophisticated software—and then displayed by students on home personal computers. Thus, the present invention opens new ways of demonstrating software—without the need at the reviews end for the hardware and/or software used to generate the demonstration graphics and displays. The captured screen output of the demonstration may be displayed on many remotely located student stations using reliable one-to-many communications, and the displayed screens may be edited or enhanced with voice, pictures, graphics, or the like before display.

The following shows how the concept can be implemented by an application programmer (see FIG. 63):

(a) At the teacher site, do the following:

(1) indicated start of demonstration by
CALL WRITE-CONFERENCE with
DEMO START MESSAGE;
(2) add the following subroutine call
before sending any information
to the screen; e.g.
CALL WRITE-CONFERENCE,
CALL WRITE to screen;
(3) add the following subroutine
call after reading from keyboard:
CALL READ from keyboard,
CALL WRITE-CONFERENCE;
(4) indicate end of demonstration by:
CALL WRITE-CONFERENCE with
DEMO END MESSAGE.

(b) At the student site, do the following:

| Step 1 | synchronize with DEMO START by learning screen etc.; |
| Step 2 | get screen information CALL READ-CONFERENCE; |
| Step 3 | send received information to screen, e.g., CALL WRITE to screen or store the information by CALL WRITE to disk; repeat step 3 until END OF DEMO MESSAGE received. |

4. Communicating with Unknown Group of Receivers

In a convention system, a data processing station wanting to send messages to an unknown group of receivers can only use inherently unreliable broadcast transmission and hope the intended recipient receivers are active and ready to receive the message. This system cannot guarantee message reception and is inherently unreliable.

With the present invention, the sender may send its message using the guaranteed, reliable one-to-many data communication technique based on a conference number. It does not need to know the identities of the receiving data processing stations. A receiving data processing station is guaranteed to receive the correct information either via listening to the broadcast message in real time or via a playback recorder data processing station. The receiving data processing station participates or listens in using the above mentioned conference number. Moreover, a receiving data processing station may join in the conference after the conference has been in progress for days or weeks. The "late entry" receiving station draws on the archiving capability of the playback recorder station to provide it with the information it "missed".

The following shows how the concept can be implemented by an application programmer (see FIG. 64):

(a) At the conference initiator site:
| Step 1 | start conference by CALL SETUP-CONFERENCE; |
| Step 2 | send message by CALL WRITE-CONFERENCE. |
(b) At the receiving site: Step 1 detect conference startup by
CALL READ-GLOBAL-EVENTS;
| Step 2 | read data by CALL READ-CONFERENCE; |
| Step 3 | write to conference by CALL WRITE-CONFERENCE. |

5. Network Management

In a conventional system, each data processing station on the network is controlled separately. One disadvantage of this arrangement is that if a global parameter needs to be changed or a patch to all or some of the software needs to be installed, the change must be done to each data processing station on the network separately. This process can take days or weeks for a large network and requires the cooperation of all users of the network.

With the present invention, the entire network can be changed or patched almost simultaneously with the guaranteed, reliable, one-to-many technique (and moreover, if desired, the confidential conference capability provided by the management function/station may be used to restrict access to the change to only certain stations or users). There is no need to change each data processing station separately with the possibility of omission, and there is no need to worry about running the network with only some of the data processing stations changed or patched. Each receiving data processing station may change or patch its network software or parameters independently in response to guaranteed reliable, secure messages.

For this application, some of the global parameters need to be changed or a patch to the software is to be made.

It is not a common accepted practice to directly modify a running system. The more usual practice is to have a new copy of the software. When the system is rebooted, this new copy replaces the old one.

The following shows how the concept can be implemented by an application programmer (see FIG. 65):

(a) At the management site:
| Step 1 | broadcast new copy of software as a file CALL WRITE-CONFERENCE; |
| Step 2 | broadcast a batch file that defines the steps of how to install or run the software CALL WRITE-CONFERENCE. |
(b) At the receiving site:
| Step 1 | receive new copy of software CALL READ-CONFERENCE; |
| Step 2 | receive batch file CALL READ-CONFERENCE; |
| Step 3 | reboot system and execute received batch file to install and run new copy of software. |

6. Network Security Monitoring

Conventional systems typically require modification of the standard operating system to trap unauthorized users and intruders. This technique places additional processing and other overhead requirements on the data processing station. Some historic data may not be recorded in some busy periods due to the overhead—making it more difficult to recover from errors, accidental file erasure, and the like. In conventional systems, security is often provided as an afterthought, and security measures are introduced only after an intruder is suspected. A lot of damage may have occurred by this time, and there may be no way to determine the nature and extent of the damage.

With the present invention, all inputs to any (or all) data processing stations and all changes to the database of the data processing station can be broadcasted and recorded using the guaranteed, reliable, one-to-many data communication technique. The recorded messages can serve as backup as well as to provide historical records. Intruder activity can be analyzed or even replayed from these historic records. The recording is actually provided as an integral part of overall system functionality—encouraging security monitoring capability to be included at the system design stage. The security analysis programs can be added or modified at any later time, and can actually analyze events that occurred before they were introduced.

The following shows how the concept can be implemented by an application programmer at the data processing station to be monitored (see FIG. 66).

| Step 1 | replace the READ DATA subroutines by: READ DATA and CALL WRITE-CONFERENCE so that all input data are broadcasted and stored and monitored; |
|---|---|
| Step 2 | replace the WRITE TO DISK subroutines by: CALL WRITE-CONFERENCE WRITE TO DISK so that all modification to databases are broadcasted and stored or monitored. |

7. Computer Conferencing

In a conventional system, computer conferencing between many data processing stations is achieved by requiring every conference participant to read or write to a single database. This arrangement often heavily loads the data processing system which maintains the single database.

With the present invention, the guaranteed, reliable, many-to-many technique can be used. There is no need for every conference participant to write to a single database. The conference participants can send or receive messages without worrying about overloading a single database data processing station. A conference participant may even go back to some previously broadcasted messages—a feature which is especially useful to a new conference participant. The new participant can retrieve all previous messages sent on the conference from the playback recorder station.

The following shows how the concept can be implemented by an application programmer (see FIG. 67).

| Step 1 | send data by CALL WRITE-CONFERENCE; |
|---|---|
| Step 2 | receive data by CALL READ-CONFERENCE. |

8. Support of Different Companies

Conventional networks are assumed to exist in a friendly environment, especially if the network is based on broadcast or multicast capability. For exchanging confidential data in such an environment, encryption and decryption of the data is done on a one-to-one basis—requiring a lot of coordination and overhead.

With the present invention, the optional secure and restricted feature of guaranteed, reliable many-to-many technique can be used to restrict access of certain communications to certain users. Suppose a supporting company provides a special broadcast network to support its many corporate customers. When the supporting company wants to advertise its products, it can broadcast the information out on a conference where all participants can read but only the supporting company can write. When a customer company wants to send information to other companies, the outgoing messages can be restricted and routed through an optional management station. This management station can monitor and/or edit the message before broadcasting it (for example, damaging remarks or complaints can be dealt with first before broadcasting them, whereas good remarks can be broadcasted without preliminary action being taken).

The key to the implementation of this application is the use of confidential conferences. Once the application programmer uses a confidential conference (e.g., 200), his broadcast message is automatically routed to the management station 22 which does the monitoring and/or editing of the message.

So the task for the application programmer is very simple (see FIG. 68):

| Step 1 | send message (on conference 200) by CALL WRITE-CONFERENCE; |
|---|---|
| Step 2 | receive message (on conference 200) by CALL READ-CONFERENCE. |

9. Backup Systems

In a conventional system, it may be necessary to operate a data processing station in a stand-alone mode in order to "back up" the information it stores (i.e., make a copy of the information on a secondary storage facility in case the station's primary storage facility fails). This arrangement has the drawback that the backup needs to be scheduled in advance and the data processing station operated in stand-alone mode during the backup. The entire network may be out of service for awhile if the data processing station being backed up is central to operation of the network and independent facilities are not provided.

With the present invention, all inputs to a data processing station and all changes to the database of the data processing station can be broadcasted and recorded using the guaranteed, reliable, one-to-many or many-to-many technique. Information required to reproduce a backup copy is thus always available in the playback recorder station. A copy of the data processing station can be brought up-to-date at any time without pre-scheduling, and stand-alone mode is not required.

The detailed steps are as follows (see FIG. 69):

a) At a given time, a full backup of the primary data processing station is done in stand-alone mode. Any conventional technique, such as copying the entire disk contents to magnetic tapes, can be used. This backup copy provides a known image of the data processing station at a known given time.

b) All inputs to the primary data processing station and all changes to the data base of the primary data processing station are broadcasted and recorded using the guaranteed, reliable, one-to-many or many-to-many technique. In practice, a playback recorder station already provides the recording and storing function.

c) In case the primary data processing stations fails, the stored image on the magtape is copied to another data processing station with similar hardware configuration as the primary data processing station.

d) The recovery processing is almost identical to a re-run of all the processing that had been done by the primary data processing station. The stored input (or stored conferences messages) are retrieved from the playback recorder station and the backup data processing station does the processing except that the output directed to terminals, printers, etc are now sent to a null device.

With the stored input messages alone, the backup system can theoretically be brought back to the same operational state of the primary data processing station just before its failure.

e) However, there is a phenomenon known as "database drifting". That is, two identical systems receiving identical inputs and executing identical programs may not be identical after a period of time. (e.g. due to minor hardware differences, environmental factors, external interference or cosmic ray bombardments).

To detect such "database drifting", the stored change messages to the database of the primary data processing station mentioned in step b) are used.

Whenever the backup data processing station needs to make a change to the database, it compares this change with the stored change message. Thus, any database drifting would be detected.

Human intervention will then be called to analysis effect of the database drift. Human intervention is important because the fault could have been caused by the primary data processing station. (e.g. a cosmic ray happens to bombard an electrical circuit causing a bit to change from zero to one without causing permanent damage to hardware).

In most cases, the differences are noted and the backup continues with the changes to the database as done by the primary data processing station. These differences are analyzed later.

Actual implementation can be achieved as follows:

| | |
|---|---|
| Step 1 | replace the READ DATA subroutines by READ DATA and CALL WRITE-CONFERENCE so that all input data are broadcasted and stored. |
| Step 2 | replace the WRITE TO DISK subroutines by CALL WRITE-CONFERENCE WRITE TO DISK, so that all changes or modifications to databases are broadcasted and stored. |

10. Hot Standby Systems

In conventional systems that require absolutely reliable operation with no down time, redundant (a primary and a secondary) data processing stations are typically provided. The primary data processing station is responsible for the actual data processing operation. The secondary data processing station (which continually monitors all communications and thus is constantly "current") takes over when the primary station fails. Typically, the primary and secondary data processing stations are closely interlocked (e.g., with specialized hardware and software) and the addition of a tertiary backup system would be difficult.

With the present invention, hot standby systems can be designed in a manner similar to backup systems discussed above. One or more data processing stations that serve as "hot standby" stations can listen to the same input; perform similar processing; and compare resulting changes with broadcasted change messages for consistency to detect any "database drifting." Similar but not identical processing is emphasized because some operations such as printing payroll checks should only be done once. The term, "shadowing" is used in this invention. With the present invention, any number of hot standby systems may be provided simultaneously, and hot standby systems may be added or deleted at any time.

Note that a hot standby system is actually a form of backup system previously discussed. The only difference is that the "recovery process" is done in real time and on more than one substantially identical data processing station.

Failure of the primary station is detected in any one of the following situations:

(a) Failure to reply to input messages—even though input messages were resent a predefined maximum number of times, each attempt being done after a known timeout period.

(b) Failure to send out a database change message after receiving input by the active, primary data processing station.

Once failure of the primary data processing station is detected, one of the hot standby systems can "volunteer" to become active in the following manner:

(a) Broadcast a "volunteer message" using previously discussed reliable many-to-many technique on conference 12345.

(b) Listen to the broadcasted "volunteer message" on conference 12345. If its "volunteer" message is heard before all others, it takes over as the new active data processing station. On taking over, the new active data processing station informs all user stations that it is taking over and also announcing which was the last properly processed message based on the global message sequence number.

(c) Note that with the present invention, it is relatively safe for a data entry station to discard the message in its sent buffer one message after it has been broadcasted. Because by this time, the designated recorder station has sent an acknowledgement message to the retransmission station. Most probably, one or more playback recorder stations would have received and stored the message. (Even if they failed to receive the message correctly, they can retrieve it from the designated recorder station.)

Figure 70:
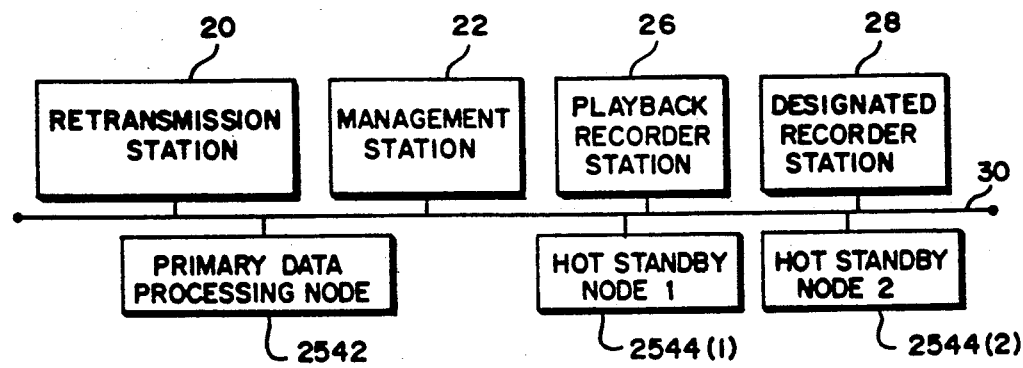
FIG. 70 is an exemplary system to handle hot standby with the present invention.
Figure 71:
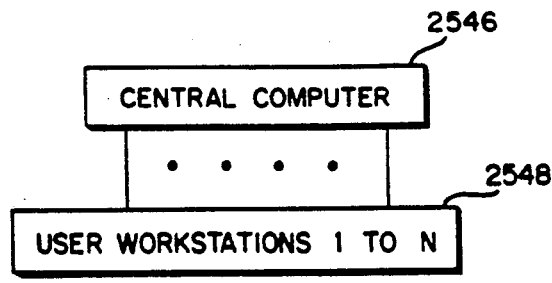
FIG. 71 is an exemplary conventional system to handle on-line processing applications.
Figure 72:
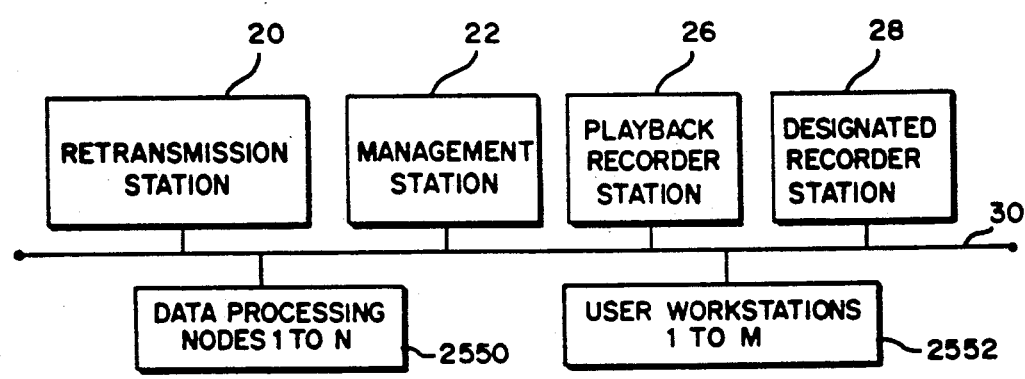
FIG. 72 is an exemplary system to handle on-line processing applications with the present invention.
Figure 73:
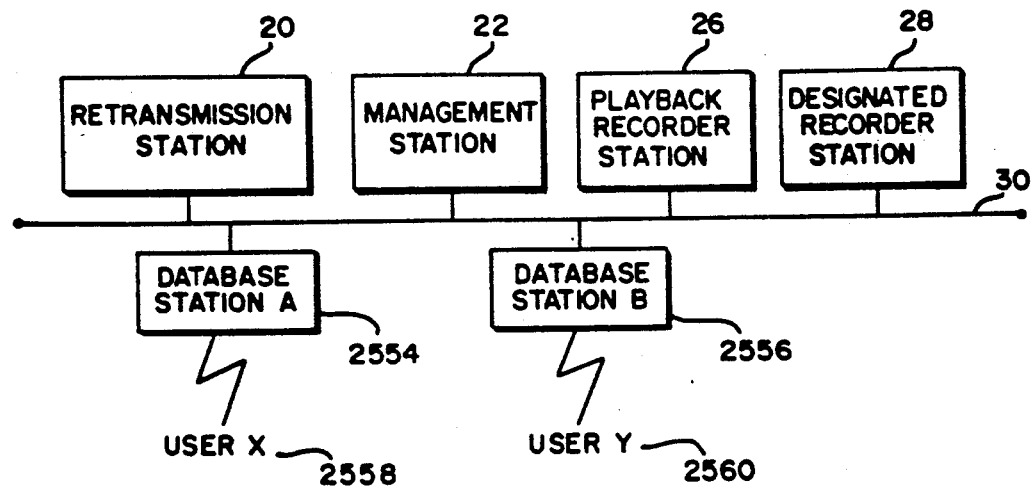
FIG. 73 is an exemplary system to handle distributed databases with the present invention.

The implementation is the same as that of the backup system (see FIG. 70). The same programs can be used.

11. On-Line Transaction Processing

Conventional systems (see FIG. 71) typically use many-to-one communications techniques for handling on-line transactions because of the high reliability requirement and past lack of reliable many-to-many data communications. Many-to-one communications concentrates processing at one location and connects many users to the single location. All transactions must be handled by a single data processing station with access to the data. This arrangement has the severe drawback that the single data processing station bears most or all of the processing load.

With the present invention, guaranteed reliable many-to-many communications may be used for on-line transactions. For example, an airline reservation system should be regarded as a many-to-many application rather than as a many-to-one application. There are many individual programs such as fare inquiry, flight booking, fuel calculation, food catering, crew scheduling, etc., within the overall airline reservation system.

Many users (e.g., travel agents and airline managers) need access to the most up-to-date information. The existing airline data processing systems use the many-to-one technique. All fare, flight, food, fuel and crew information are input to a single data processing station (e.g., a large mainframe computer). All travel agents and managers are connected to this single data processing station. Great processing loads are placed on the single data processing station—especially during peak usage times. The guaranteed, reliable, many-to-many data communication technique can be used here with great effectiveness.

Many of the non-essential programs can be taken from the single data processing station and implemented on separate data processing stations. When a travel agent enters a booking, this booking information can be broadcasted using the guaranteed, reliable, many-to-many data communication technique to all other stations on the network. Each station can maintain its own database, and individual programs performed by each of these separate data processing stations can update their own respective databases separately. A lot of load can be taken off the single data processing station. Thus, the present invention has great impact in the area of on-line transaction processing, and actually removes the requirement of a large mainframe computer with sufficient processing capabilities to handle user requirements without undue delay at times of peak usage (instead, database updates are performed in a distributed manner by all of the stations on the network).

One of the questions expected from database experts may be—how are the separate databases maintained and, in particular, how are they kept in synchronization?

The separate databases are used by separate, distinct programs. Hence they are maintained independently. However, as previously described in the section on backup systems, the playback recorders can act as centralized backups. Because they are used by separate, distinct stations, these databases do not need to be synchronized. However, all inputs are guaranteed to be received and processed in the same sequence. This fact alone simplifies the distributed database design. The situations where synchronization is required would be covered in the later application examples (applications 12 and 13).

The implementation by the application programmer at the data entry station (see FIG. 72) is to replace the sending of data to the central node by broadcast. For example:

---
replace SEND data subroutine by
CALL WRITE-CONFERENCE
---

12. Distributed Databases

One of the biggest problems in a conventional distributed data base system is the locking of remote databases. Locking is used to prevent another data processing station from accessing a piece of data while it is being updated. This locking process may cause a bottleneck, and must deal with the complex problem of handling locked data when the data processing unit causing the lock fails.

In the present invention, remote database locking can be avoided totally. The retransmission computer effectively serializes the update requests and all update requests are broadcasted. For example, in a distributed airline reservation system, there may be two duplicated database data processing stations A and B. Suppose user X is attached to data processing station A and requests seat number 5 on flight 123. This request will be broadcasted. User Y may be attached to data processing station B and happens to also request seat number 5 on flight 123. This request will also be broadcasted. But the two requests are serialized by the retransmission station. If the request from data processing station A on behalf of user X is broadcasted first, user X will get the seat. The data processing station B detects from the broadcasted messages that the request from data processing station A has been serialized before his request which implies that the seat has just been taken by user X. Data processing station B then will have to advise user Y to book a different seat. Thus, the present invention avoids the complex problem of remote database locking and a totally different alternative is provided which is actually more efficient than the remote database locking technique.

To avoid the problem of accidentally broadcasting an update message which could affect thousands of participants and to handle the problem of multiple message transactions, the technique of a special "confirm to change" message can be used. This technique allows a general participant station to receive database update messages without actually modifying its stored database until the station receives a special "confirm to change" message broadcasted from the update requestor station.

Implementation of the concept by an application programmer involves the following key steps (see FIG. 73):

| | |
|---|---|
| Step 1 | broadcast database change request<br>CALL WRITE-CONFERENCE; |
| Step 2 | read broadcast messages<br>CALL READ-CONFERENCE; |
| Step 3 | check broadcasted messages to see if its broadcasted database change request is ahead of all others on that piece of data. |
| Step 4 | if answer is YES, broadcast a "CONFIRM TO CHANGE" message by CALL WRITE-CONFERENCE; |
| Step 5 | if answer to Step 3 is NO, (some other database station has requested change on same piece of data), inform user of failure. |

13. Corporate Information System

In a conventional system, databases must be compromised to cater to both data input and real time updating and analysis functions. Due to the lack of reliable many-to-many data communications in the past, conventional systems cannot easily perform data input and real time update and analysis programs on separate data processing stations. Because of changing business needs, the real time analysis programs are expected to change much more often than the data input programs. Therefore, corporate information databases may need to be redesigned shortly after they have been implemented because of new or changed business needs.

With the present invention, database design can be very much simplified. The real time update and analysis programs can reside on different data processing stations. The inputted data is broadcasted using the guaranteed reliable many-to-many technique. The databases for real time update and analysis can be totally different from that for input data. Changes in analysis programs because of business needs will not affect the database for input.

The present invention thus has great impact on database design. Duplicate and/or partially duplicate databases can be designed with guaranteed reliable message handling for updates, and there is no danger that duplicate information in different databases becoming desynchronized.

The following is an example of a corporate information system:

A large company has many products. Each product has a separate manager. Product manager A is interested only in product A; product manager B is interested only in product B. These two product managers have their own analysis programs on different analysis stations.

The corporate information system can be designed as follows (see FIG. 74):

(a) The data entry stations are programmed to broadcast the data in a predefined format using the guaranteed, reliable many-to-many technique via a confidential conference.

(b) The product managers A and B can select from the broadcasted messages their own products and analyze the data on their separate analysis stations. They can modify their analysis programs without affecting the corporate database. They may even have two different versions of their analysis programs on two separate analysis stations. One of these may be experimental.

In addition, it is possible to encrypt different fields of a message with different encryption keys. The different groups of authorized users can decrypt their authorized fields only.

Implementation by an application programmer on the data entry station side may be:
replace the SEND data subroutine by
WRITE-CONFERENCE
so that the analysis stations can pick up the data.

14. Process Control Systems

Conventional process control systems typically include a master data processing station which receives input from the various other data processing stations. The master station determines which other data processing stations need the input information and then sends the input information to them on a one-to-one basis. This system has the drawback that a powerful master data processing station is required.

With the present invention, process control can use the guaranteed, reliable many-to-many technique—eliminating the need for a powerful master data processing station, distributing processing among many processing stations, and still guaranteeing that all stations are updated with current process control parameters and inputs. For example, in the production of an alloy, there may be:

(a) Computer A to control furnace heating;

(b) Computer B with temperature sensors to detect the temperature of the alloy at various cycles of its production and at different parts of the furnace; or (c) Computer C to control the rate of feeding of the various components.

These computers need to communicate with one another. For example, if the temperature is too low as detected by computer B, it needs to inform computer A to increase the heating and inform computer C to slow down or stop the feeding of the various components. With the present invention, computer B can just broadcast its data and expect computers A and C to receive the data reliably and take appropriate actions. Computers A, B, C can be from different vendors and there is no need for a powerful master computer to relay the information.

The implementation (see FIG. 75) on computer B involves replacing the SEND data to master computer by:
CALL WRITE-CONFERENCE.

The implementation on computers and C in receiving the broadcasted information is:
CALL READ-CONFERENCE.

15. Parallel Processing Applications

In conventional parallel processing systems, great organization and coordination is required to allow two or more data processing stations to do the same processing tasks or to do different parts of an overall data processing task. Specialized hardware and software is typically required to coordinate the different portions of the parallel processing system. Unfortunately, such specialized hardware and software may not be easily programmed, modified, expanded or used in a mixed vendor environment.

With the new invention, parallel processing can take advantage of the guaranteed, reliable many-to-many technique. An input message may be broadcasted and one or more data processing stations can process the input message simultaneously. For example, a large database can be managed by a very powerful, single data processing station—or the same database can be split up into 1,000 parts and managed by 1,000 separate small data processing stations each of which is 1/1000 the power of the single data processing station. The latter arrangement is expected to be able to handle a lot more transactions per second—as many of these small data processing stations can be running in parallel, processing different requests. The present invention, when used in parallel processing applications, enables ease of program modification, ease of expansion and ease of use in a mixed vendor environment.

An actual example (see FIG. 76) may help to clarify the parallel processing application:

(a) The application is on-line patent search. More than one user stations can be retrieving or reading the information via the patent number of via a keyword search. The database can be divided into many "volumes". Each "volume" contains an ordered information based on the patent number.

(b) When user station A wants the information number 123456, the request is broadcasted using the reliable many-to-many technique discussed. Suppose volume 25 patent database station is the one storing information on patent number 123456. It replies to the request. All other patent database stations ignore the request. While volume 25 patent database station is replying to the request from user station A, another patent database station can be replying to another request from user station B simultaneously (or in parallel).

(c) When user station A wants to do a keyword search on "photon", the steps are as follows:

(c1) User station A sends a keyword search request message via the guaranteed, reliable, many-to-many technique. All the patent database stations start the search simultaneously (or in parallel). Those who fail to find "photon" in their databases will not send any reply or will send a "data not found" message. Those who find references to "photon" will reply to user station A using reliable one-to-one techniques.

(c2) Suppose volume 3 patent database is requested more than others. More than one volume 3 patent database station can be put on the network. They are referred to as volume 3A, volume 3B and volume 3C patent database stations.

(c3) Volume 3A patent database station, before replying to user station A, broadcasts a message on conference 12345 that it has volunteered to reply to user station A. Volume 3A patent database station then listens to the broadcasted messages on conference 12345 to see if it is the first volunteer. If the answer is no, it ignores the request from user station A. If the answer is yes, it replies to the request from user station A using a guaranteed, reliable one-to-one technique.

This allows selective duplication of portions of a database. It represents a major breakthrough in database technology. Now, a database can be selectively tuned to serve user demands using the present invention. It is also possible to have one or more catalogue stations on the same network. These catalogue stations provide presorted lists based on topic, title, inventor, attorney, etc. These catalogue stations can be running simultaneously (or in parallel) with the rest of the patent database.

The implementation steps by the application programmer on a user station are:

| Step 1 | make the request by CALL WRITE-CONFERENCE; and |
|---|---|
| Step 2 | then read the data by CALL READ-CONFERENCE. |

At the patent database stations, the implementation steps are:

| Step 1 | receive request by CALL READ-CONFERENCE; |
|---|---|
| Step 2 | Send result back to requestor user station via one-to-one techinque. |

While the applications for the present invention described above clearly demonstrate the great advantages of the present invention over prior message handling techniques, the examples are by no means limiting. Any application that benefits from reliable one-to-many and/or many-to-many data communications can benefit from the present invention. Some applications, such as non-essential news transmission or repeated company announcement may fall into the category of broadcast/multicast transmission in which guaranteed reception is not critical. However, for most applications involving communication amongst more than one data processing station, reliable message handling is an important—and in fact, critical—parameter of system operation.

SIMULATED BROADCAST

Figure 82:
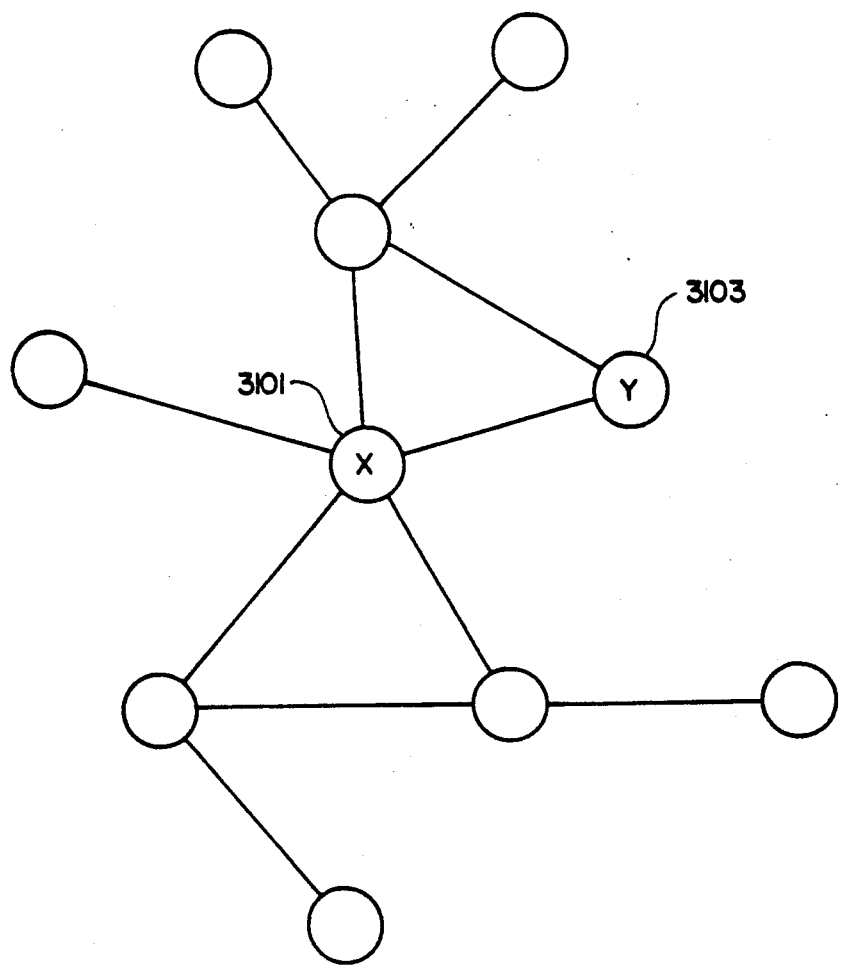
FIG. 82 is an exemplary configuration showing simulated broadcast in a wide area network environment.

This invention can also be applied to networks where there are no inherent broadcast capabilities. For example, in FIG. 82, the network consists of a number of nodes connected by many separate one-to-one links.

The retransmission station is placed at position X where all other nodes can access it with the minimum number of hops. The designated recorder station can be placed at any one of the adjacent nodes such as Y.

Any node intending to send a broadcast message first sends the message to the retransmission station at X. This message may have to be routed through other nodes. Once the message arrives at the retransmission station, the global message sequence number and other time stamp information are added. This enhanced message is then transmitted to all the nodes adjacent to the retransmission station.

Each of these adjacent nodes checks whether the enhanced message has been received before. If not, it forwards the enhanced message to all its adjacent nodes except the node from which the enhanced message comes. If the enhanced message has been received before, it will not do any more forwarding.

This process is repeated until all nodes receive the enhanced message. This technique is sometimes known as message flooding. Note that reliability is achieved on all the separate one-to-one links by the well understood one-to-one communication technique as described earlier.

For confidential conferences, the sender sends the message to the management station first, instead of sending to the retransmission station directly.

This message flooding technique is also called simulated broadcast.

Arbitrator Node Embodiment

Figure 83:
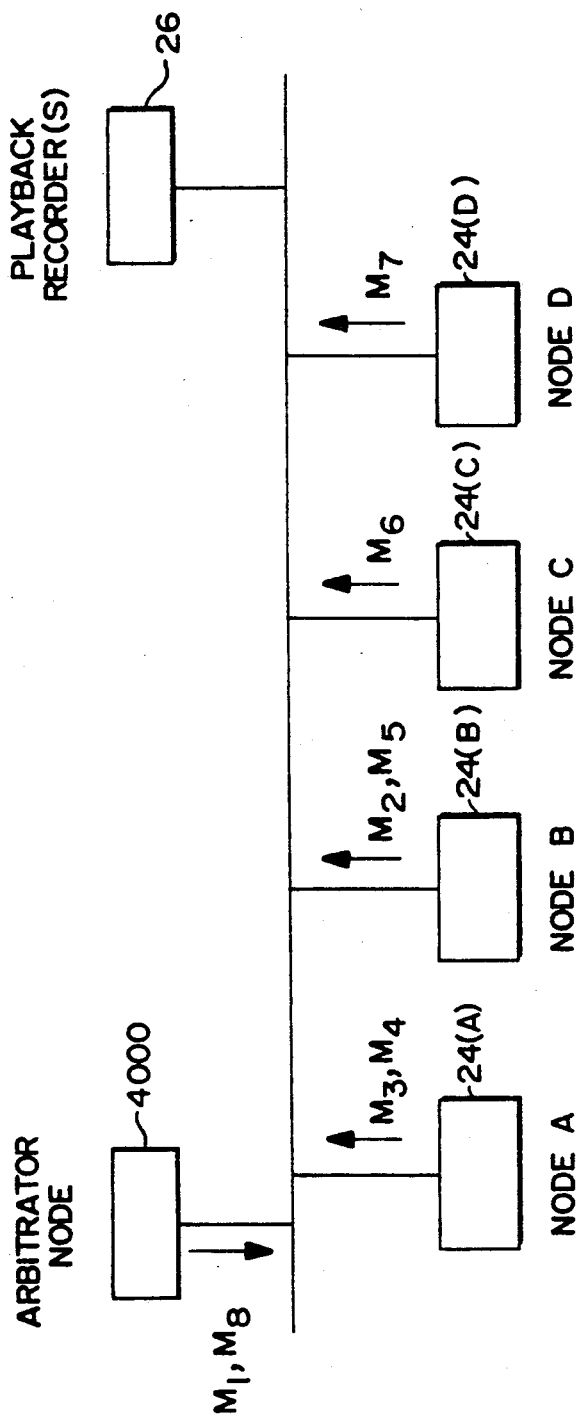
FIG. 83 is a schematic block diagram of a further exemplary embodiment in accordance with the present invention, this embodiment including an arbitrator node.

FIG. 83 is a schematic block diagram of a further presently preferred exemplary embodiment in accordance with the present invention, this further embodiment including an arbitrator node or station 4000 in addition to a plurality of general participant stations 24 and one or more playback recorder stations 26. Only four general participant stations 24(A)-24(D) are shown in FIG. 83, it being understood that any desired number of general participant stations might actually be used.

Briefly, in the embodiment shown in FIG. 83 any general participant ("GP") station 24 may originate a message (that is, there is no need for a single or central source of messages). A message transmitted by any of GP stations 24(A)-24(D) is received by all of the other GP stations 24. The message is also received by arbitrator station 4000.

In the preferred embodiment shown in FIG. 83, there is no station that provides the retransmission station function as described, for example, in connection with FIG. 1. That is, no one station receives messages from GP stations 24, applies sequence numbers to the messages, and then broadcasts those messages for receipt by all of GP stations 24. Rather, each of GP stations 24 "listens to" and receives each message transmitted by each of the other GP stations. Thus, GP stations 24 may direct messages to only one other GP station. Or, in a multicast or broadcast mode of operation a GP station 24 may "broadcast" a message to all other GP stations—and such "broadcasted" messages will be received by the other GP stations and also by the arbitrator station 4000.

In the preferred embodiment, the sequence of messages appearing on network 30 is predefined to some extent. In particular, in the preferred embodiment the messages carried by network 30 are predefined into periodically recurring frames or "slots" and every mth slot (where m is an integer) is reserved for transmission by the arbitrator station 4000. Thus, typically some first message M(1) and then every successive mth message M(m), M(2m), M(3m), . . . are reserved for transmission by the arbitrator station 4000. The arbitrator station 4000 is thus a special station on network 30 that has certain message slots reserved for it.

Each of GP nodes 24 in the preferred embodiment abides by certain rules before sending a message:

(1) no GP station transmits a message until the arbitrator station 4000 has transmitted an initial message M(1);

(2) each GP station must continually listen to and count the messages on network 30—and avoid sending a message in any mth message slot (e.g., M(m), M(2m), M(3m), . . . since those slots are reserved for transmission only by the arbitrator station 4000;

(3) each GP station 24 must receive and analyze each message transmitted by the arbitrator station 4000 and take corrective action if this analysis indicates an error has occurred.

In the preferred embodiment, a GP station 24 can test for the occurrence of message errors in response to receipt of an arbitrator station 4000 message. The arbitrator station 4000 periodically transmits a message which provides an indication of each message it received over network 30 since the last time the arbitrator station 4000 sent a message. In particular, the arbitrator node message contains a listing or summary of the messages it has received over network 30, this listing specifying the order of the messages and the originating GP station of each message. A GP station 24 attempts to retransmit a message if a message it previously transmitted is not indicated in a following arbitrator station 4000 message as having been received by the arbitrator station. A GP station 24 requests the arbitrator station 4000 to retransmit messages that it failed to receive but which the arbitrator station 4000 message indicates were transmitted over the network and received by the arbitrator station.

Figure 84A:
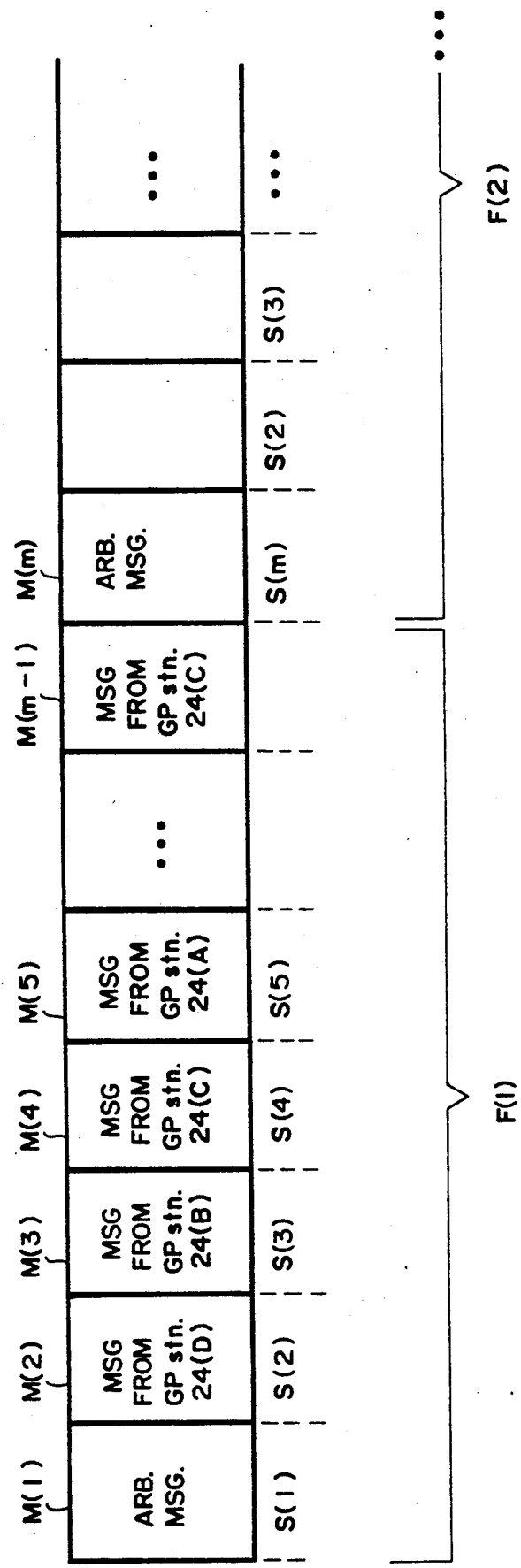
FIGS. 84A-84B are exemplary message formats used by the embodiment shown in FIG. 83.

As an example, suppose the following messages are transmitted on network 30 (as shown schematically in FIG. 84(A):

Message M(1) is transmitted by arbitrator station 4000 in slot S(1) of frame F;

Message M(2) is transmitted by GP station 24(D) within slot S(2);

Message M(3) is transmitted by GP station 24(B) within slot S(3);

Message M(4) is transmitted by GP station 24(C) within slot S(4);

Message M(5) is transmitted by GP station 24(A) within slot S(5);

Message M(m−1) is transmitted by GP station 24(C) within slot S(m−1); and

Message M(m) is transmitted by the arbitrator station 4000 within slot S(m).

The term "slot" as used herein is defined to mean the position the arbitrator node puts a received message in its message-received queue. It is possible to have a number of "empty slots". Empty slots occur in periods of low activity. For example, only GP station 24(A) sends a message at night. No other GP stations 24 send any information. The message may "sit" for a long time. To cater for such a possibility, the arbitrator node sends its "slot information" message after a suitable time even though less than M−1) messages have been received. A receiving node, such as a GP station 24, after receiving the arbitrator node's message, treats the situation as if M−1) messages have been transmitted. However, a receiving node does not need to request for "empty slot" messages.

Figure 84B:
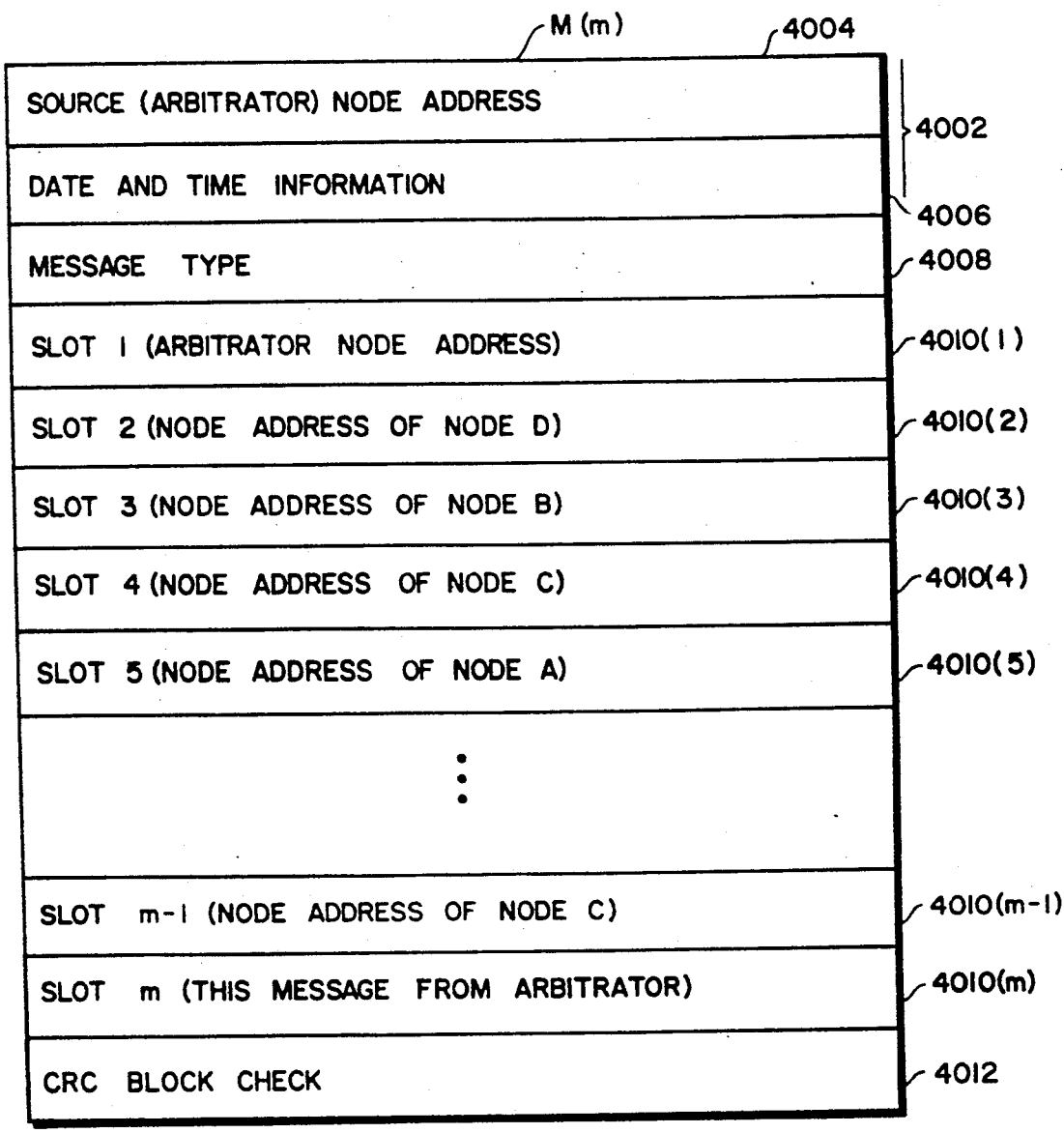

Message M(1) transmitted by the arbitrator station 4000 is a special start-up message indicating the arbitrator station is ready. Message M(m) generated and transmitted by the arbitrator station 4000 on network 30 may have the exemplary format shown in FIG. 84(B). The exemplary message format shown includes a header portion 4002 including fields 4004, 4006, 4008. Field 4004 stores the network address (or other identifying information) of the arbitrator station 4000 so as to identify the message as originating from the arbitrator station. Field 4006 may provide a time/date stamp indicating when the message was sent (fields 4004, 4006 thus uniquely identifying the message). Field 4008 indicates the type of message (in this example, the message type is that of the periodically recurring arbitrator "slot information" message).

Arbitrator message M(m) further includes a plurality of fields 4010(1)–4010(m) corresponding respectively to the network message slots S(1)-S(m) (e.g., all slots occurring since the last arbitrator message was sent), with each of these fields indicating the network address (or other unique designation) of the station that transmitted a message within the corresponding slot (or other information which uniquely identifies the message and distinguishes it from other messages). In the preferred embodiment, (a) the network address of the station originating the message and (b) the slot in which the message was received by the arbitrator node are sufficient to uniquely identify the message and distinguish it from all other messages in the preferred embodiment. For example, field 4010(2) corresponding to slot S(2) indicates the network address (or other identifier) of GP station 24(D) since that GP station transmitted a message M(2) during that corresponding message slot S(2). Similarly, field 4010(m−1) sets forth the network address of GP station 24(C) since in the present example GP station 24(C) transmitted a message in the corresponding message slot S(m−1).

In the exemplary format shown, fields 4010(1) and 4010(m) each may indicate the network address of the arbitrator station 4000 (since the arbitrator station transmitted a message M(1) during message slot S(1) and message M(m) itself is being transmitted during message slot S(m). Of course, if m is a fixed, constant value fields 4010(1) and 4010(m) may be omitted if desired (since all GP stations 24 would "know" beforehand that the corresponding slots S(1) and S(m) are dedicated to arbitrator messages). Field 4012 may be a standard CRC error-checking field used to protect the contents of arbitrator message M(m) from data corruption.

In the exemplary arbitrator message format shown, fields 4010(1)–4010(m) are set forth within the message M(m) in a sequence corresponding to the time sequence of the messages the fields specify. That is, in the example provided the messages M(1)-M(m) were received in the sequence of slots S(1)-S(m), respectively, and corresponding fields 4010(1)-4010(m) are sequenced within message M(m) in that same order (e.g., so as to avoid the necessity for explicitly setting forth the slot number corresponding to each field). It will, of course, be understood that an alternate order of fields 4010 could be used so long as all of the GP stations 24 "agree" upon which fields correspond to which message slots (or if message M(m) carries explicit information specifying which network address corresponds to which slot S).

Each of GP stations 24 (and each other receiving node on the network) listens to all message traffic transmitted over network 30, and generates its own internal listing by the network addresses of the transmitting stations in the various slots (in other words, each GP station maintains its own version of fields 4010 based on the messages the station receives from the network). FIG. 84(C) is a schematic diagram of a "correct" such listing. Upon receiving arbitrator message M(m), each GP station 24 (and all other receiving nodes on the network) compares its own internal FIG. 84(C) list with the list contained within the arbitrator message. If the receiving station detects any discrepancies, the station treats some or all of the messages it has received as being in error and requests correct messages from the arbitrator station 4000. For example, if GP station 24(A) records in its own list as having received a message from a station other than GP station 24(D) in slot S(2), GP station 24(A) may request the arbitrator station 4000 to retransmit message M(2) and thereby recover from the error. (GP station 24(A) may ignore the message if it determines that it does not want the message in any case.)

Figure 85:
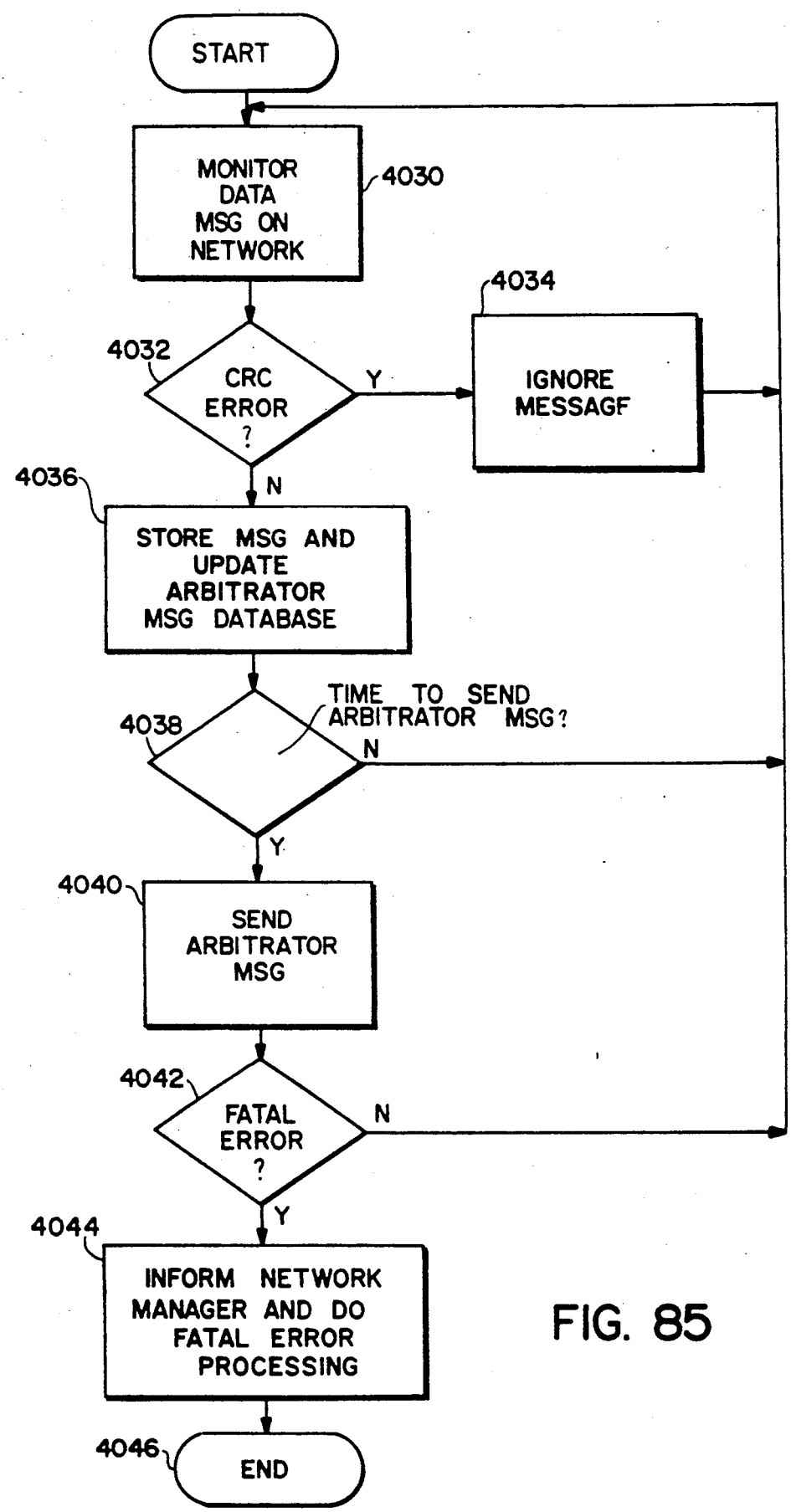
FIGS. 85 and 86 are flowcharts of exemplary program control steps performed by the arbitrator node in the embodiment shown in FIG. 83.

FIG. 85 is a schematic flowchart of exemplary program control steps performed by arbitrator station 4000 in the preferred embodiment. Arbitrator station 4000 monitors data messages on network 30 (block 4030). If a message is detected, the arbitrator node 4000 receives the messages and then checks whether the message has been received correctly (e.g., using CRC or other error checking/correcting techniques) (block 4032). If an error is detected, the arbitrator station 4000 discards the message as being erroneous (block 4034) and waits for the next message (block 4030). If the message is correctly received, on the other hand, the arbitrator station stores the message, updates an internal database (this database storing a history of message originators and corresponding message slots), and then places an identification (e.g., network address) of the station originating the message in the next available field 4010 of an arbitrator message buffer (this message buffer containing the information to be transmitted within an upcoming arbitrator message). If arbitrator station 4000 detects no messages during a particular message slot, it provides an indication to that effect within the corresponding field 4010 of the arbitrator message being constructed within the message buffer.

As soon as the number of messages transmitted reaches (m−1) (or, in the preferred embodiment, if a certain time has passed since the last time an arbitrator message was sent), arbitrator station 4000 sends the contents of its message buffer as a new arbitrator message (blocks 4038, 4040). Upon the occurrence of a "fatal error" in this arbitrator message transmission process (as detected for by decision block 4042), the arbitrator station 4000 notifies the network manager station (if there is one) and performs a fatal error processing routine such as closing its internal control or data files (block 4044). In general, the failure of the arbitrator station 4000 in the preferred embodiment to transmit a proper arbitrator message prevents guaranteed reliability from being achieved—and therefore error recovery might require a redundant arbitrator station to transmit the arbitrator message or retransmission of all messages since the last arbitrator message. If no fatal errors are detected, the overall process shown in FIG. 85 repeats itself.

Figure 86:
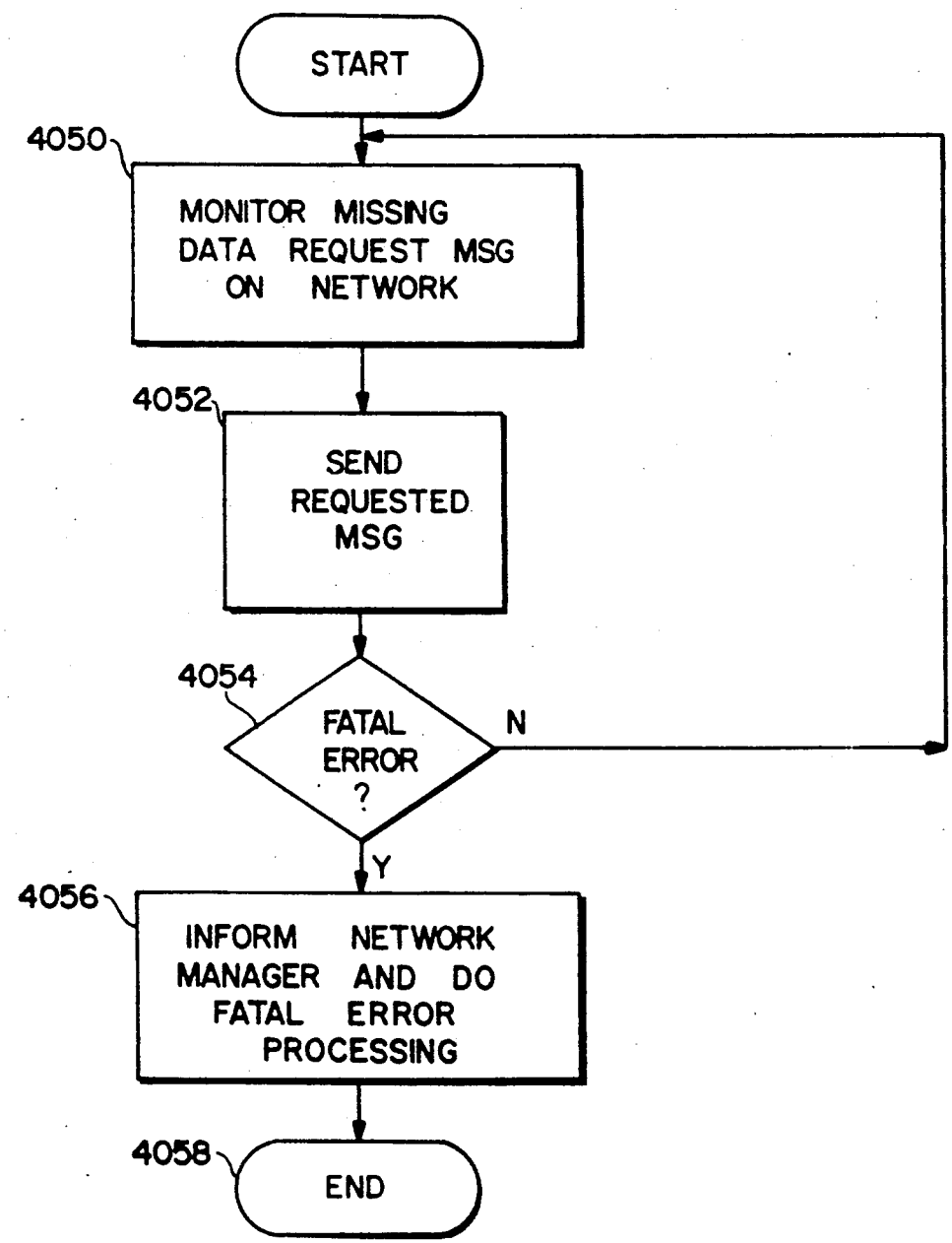

FIG. 86 is a schematic flowchart illustrating how arbitrator station 4000 (or playback recorder station 26 if the playback recorder station is responsible for missed message recovery) handles requests for message retransmission from receiving stations. As mentioned above, each receiving station on network 30 receives the arbitrator message M(m) and compares its contents with the contents of records 4014 the receiving station has stored itself. If a station determines based upon receipt and analysis of arbitrator message M(m) that it failed to receive a message, the receiving station generates a retransmission request message specifying the missed message (e.g., by specifying the slot number of the message). Arbitration station 4000 (or playback recorder station 26 if the functions of generating arbitrator messages and retransmitting missed messages are performed by different stations) monitors network 30 for requests for retransmission of messages (FIG. 86 block 4050). Upon receipt of such a request, the arbitrator station 4000 retrieves the message from its own storage and retransmits it over network 30 (block 4052). This process (blocks 4050, 4052) is performed continually unless and until a fatal error is detected (block 4054)—at which time the arbitrator station 4000 notifies the network manager station that message recovery has failed and then performs a fatal error processing routine (block 4056).

Figure 89:
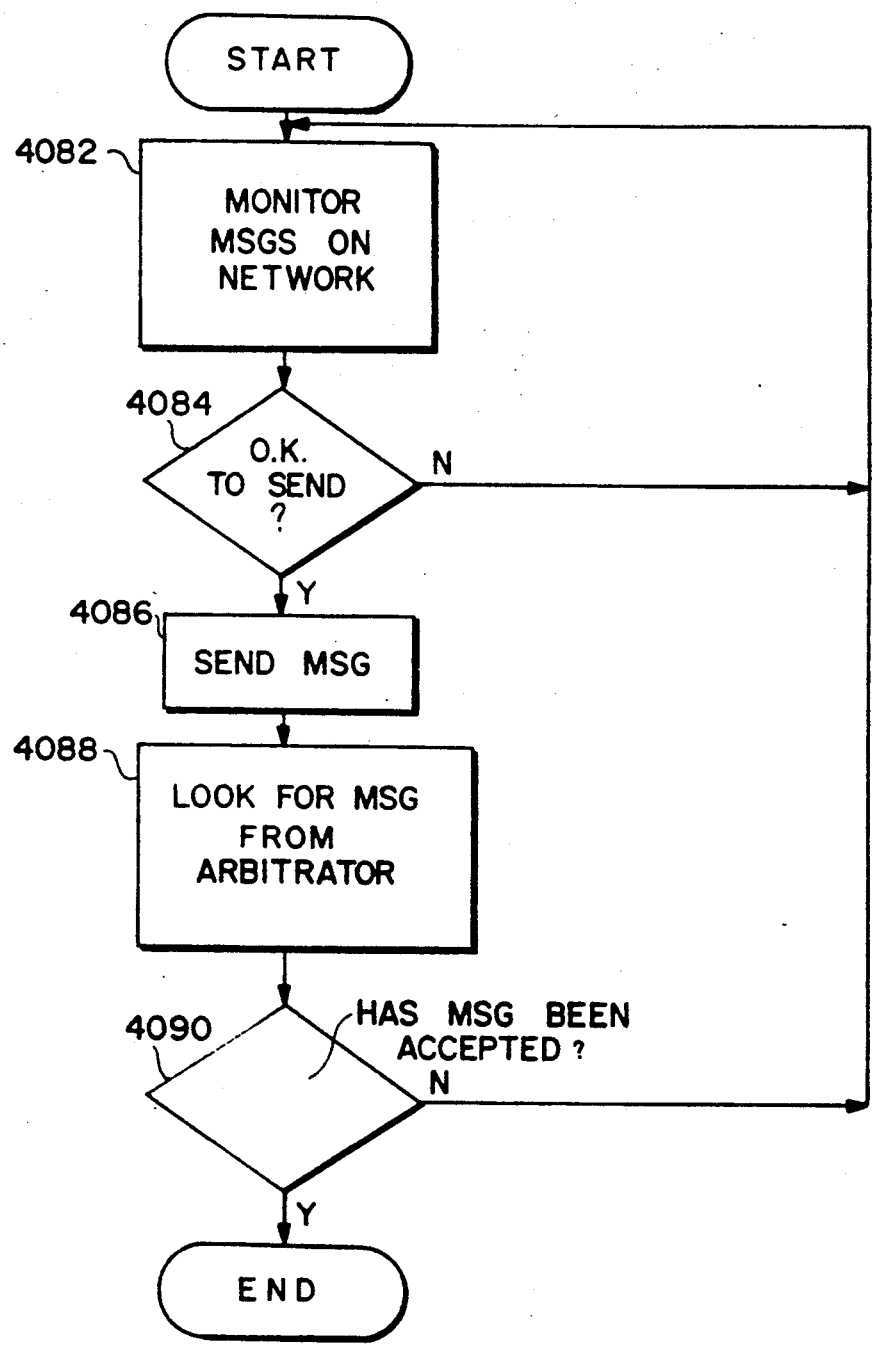
FIG. 89 is a flowchart of exemplary program control steps performed by a sender node in the embodiment shown in FIG. 89.

FIGS. 88 and 89 show the schematic flowcharts on the actions of a GP station 24 on the transmission and the reception of a message. Whenever a GP station 24 (or any other station on network 30 is capable of transmitting a message) transmits a message over network 30, the GP station 24 must wait for the next-transmitted arbitrator message before it can be sure that the message was in fact accepted. When the GP station 24 receives the next-transmitted arbitrator message, the station checks the arbitrator message to ensure that the message it transmitted is listed in the arbitrator message. If that transmitted message is not listed, then the GP station 24 "knows" that its attempt to transmit the message failed and thereafter itself retransmits the message.

Any station transmitting a message that was not received by the arbitrator station 4000 automatically retransmits its message so the message can be received by the arbitrator station 4000 (and by all other stations on network 30). In this way, guaranteed reliability is achieved without need for individual message acknowledgements, global message sequencing by a single message source, or any type of message sequencing at all for that matter. In fact, there is no requirement that all nodes on the network can even "hear" messages transmitted by all other nodes (e.g., such a situation may exist in a hierarchical network). The technique provided by the present invention allows many receiving nodes to receive messages independently with the possibility of certain nodes missing messages. Different receiving nodes may have different initial "views" on which messages were sent over network 30. However, all nodes compare their "views" with the "view" of the arbitrator node 4000—and any discrepancies are resolved by adopting the view of the arbitrator node.

It is to be understood that reserved message slot is only one way to ensure that the arbitrator station 4000 has a high probability to transmit without interference. It is possible, under certain instances, to have the reserved message slot taken by a GP station 24. This occurs if two or more GP stations 24 both detect the messages on the network as m−2. Both GP stations 24 then transmit their messages. The first message takes the slot m−1, the second message then "involuntarily" used the reserved slot m. The arbitrator station 4000 acts as if it never received the second message and sends out the arbitrator message. All receiving nodes must follow the view of the arbitrator and ignore the second message.

It is also possible for the reservation to be made on fixed time basis rather than message slot basis. If a fixed time basis is used, the number of messages received by the arbitrator station may vary during these fixed time slots.

It is also possible for the reservation to be made based on variable message or time slots. One way to accomplish this is to specify the received message slot value m or the reserved time interval t in the preceding arbitrator message.

In addition, the technique provided by the present invention allows the arbitrator node 4000 to exercise control over the flow of messages on network 30. Since every mth message slot is reserved for use by the arbitrator node 4000, the entire network will pause at these intervals. The arbitrator node 4000 may then decide whether to slow the network traffic down by providing a suitable delay before transmitting the arbitrator message (in the preferred embodiment, no node will transmit a further message until it has received the arbitrator message).

Still further improvement may be obtained by providing an additional control feature in accordance with yet another feature of the present invention. In accordance with this further control feature, the arbitrator node 4000 is given the authority to reserve message slots for particular transmitting stations by specifying such reservations within the arbitrator messages it transmits. FIG. 87(B) is a schematic diagram of an exemplary arbitrator message format permitting the arbitrator station 4000 to reserve future slots for specific transmitting stations. Fields 4060(m+1) indicates, for example, that slot S(m+1) is reserved for use by a particular station (e.g., GP station 24(A)). Arbitrator station 4000 may "schedule" more than one slot in this manner (in the example shown in FIG. 87(B), only slots S(m+1) and S(m+2) are so scheduled, with slots S(m+3) and following being "free" for use by any station). In the preferred embodiment, a field 4060(m+3) within the arbitrator message indicates the beginning of the "free" slots.

A transmitting station has the following additional responsibility when arbitrator station 4000 schedules or reverses slot use in advance:

the transmitting station may not use any reserved slots unless the slot was reserved for it.

It is important to realize that this arbitrator node embodiment technique can be applied to one-to-one as well as to one-to-many (broadcast) communications. With this technique, if GP station 24 (A) sends a message to GP station 24(B) on a one-to-one basis, GP station 24(A) does not look for an acknowledgement from GP station 24(B). Instead GP station 24(A) waits for the arbitrator node message to see if the message has been "correctly received" by the arbitrator node. So long as the message is "correctly received" by the arbitrator node, GP station 24(A) can assume that GP station 24(B) is guaranteed to receive the message correctly. GP station 24(B) may have received the message at the same time as the arbitrator node or it may receive the message some time afterwards. The distinction between one-to-one and one-to-many data communication is "removed" or "blurred" by this arbitrator node embodiment.

Enhancements

Figure 90B:
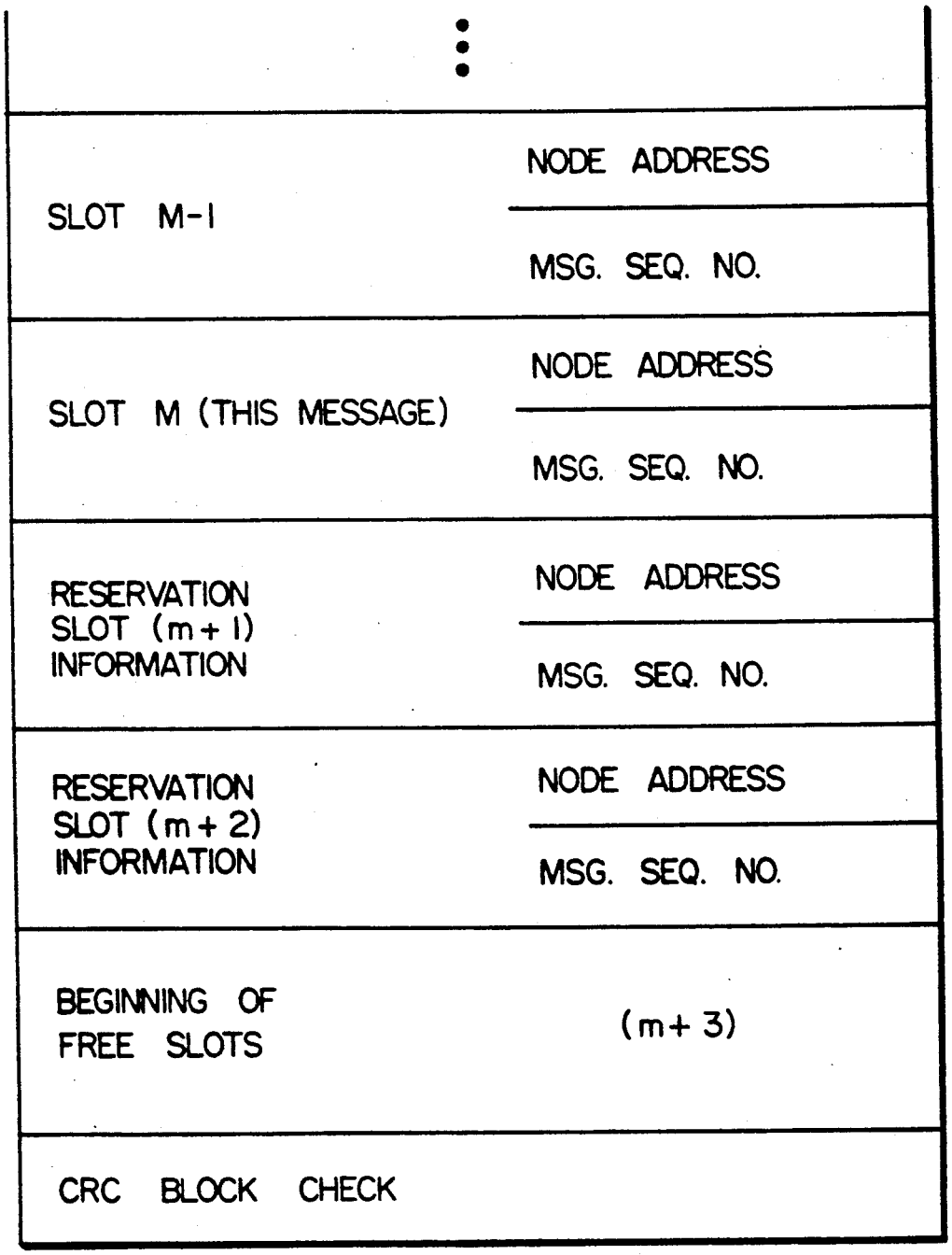
FIG. 90 is an exemplary arbitrator message format showing many options.

Many additional enhancements can be added to the disclosed invention. Some are listed here. FIG. 90 shows an exemplary format of the arbitrator message to include these enhancements.

1. If the reserved message slot value m, is set to 1, the arbitrator station 4000 has total control over the network. No other stations are allowed to send any messages. This is useful for sending emergency or extremely important messages.

2. If the reserved message slot value m, is set to 2, every message transmitted will be followed by an arbitrator node message. The buffer requirement on each user node will be greatly reduced.

3. If the message reservation option is available, a message type can be introduced to indicate that the sender has one or more messages ready to be sent out. The arbitrator station 4000 can reserve a message slot(s) for this sender. Thus, the efficiency of the whole network can be improved.

4. If the message reservation option is available, priority scheme can be introduced. A message priority value can be introduced so that the arbitrator station 4000 preferentially accepts messages and/or reserves message slots in response to the priority value.

5. It is also possible to allow a GP station 24 to send more than one message on network 30 before waiting for the arbitrator node message. The sender node specifies its own message sequence number or other identifiers when it sends its message. The arbitrator message will contain this information as an additional identification field.

6. Even through global message sequencing is not required in this scheme, its use may help in many situations such as quickly identifying a missed message. The global message sequencing may be supplied by individual GP stations 24 and any conflicted resolved by the arbitrator station 4000. Or more simply, the arbitrator station 4000 supplies the global message sequence numbers.

7. It should be noted that the arbitrator station embodiment may not always be the best possible solution in all environment. For example, in satellite communications, the Naron et al solution is better.

Other enhancements related to other parts of the invention other than the arbitrator node are:

1. A volume retrieval manager node can be added for the parallel processing application. The volume retrieval manager node gathers traffic statistics, identifies whether a "volume" has problems and determines whether a "volume" should be duplicated.

2. A "network journal" capability can be added for the backup and hot standby applications. In many existing applications today, a "transaction journal" is kept. This transaction journal provides a record of what changes; who accesses the data and when various actions are taken. One can analyze this transaction journal for various statistics information as well as use it for backup/restore operations. The selective storing of change information via broadcast in a playback recorder node can be thought of as the equivalent of producing a "network journal". This network journal can be used in many ways, including but not limited to statistics gathering, resolving possible disputes, identifying database drifting, etc.

3. The invention can be used for computer virus control. For example, in existing university network environment, a reputable programmer just finished writing or updating a program. If he were to distribute his program on a one-to-one basis to the many thousand nodes in the university-wide network, he would spend many hours or days in doing so. Instead, he sends his program to a small subset of nodes and allows these subset of nodes to further send his program to further subsets and so on. A computer hacker may not have privilege on the same system as the reputable programmer but may have the necessary privileges on a subset system. After receiving the program, the computer hacker modifies the program to include his virus before forwarding the program. Thus, the computer virus is added and spreads to other unsuspecting nodes. With the confidential conference capability of the present invention, the reputable programmer will first be authenticated by the management station. The single copy of software is encrypted and broadcast to all the nodes. A receiving node must get the decryption key from the management station before it can decrypt and use the program. Thus, the chance of allowing a computer hacker to introduce a computer virus is greatly reduced.

4. The encryption and decryption algorithm for confidential conferences can be further enhanced.

One key idea in using encryption is to make decryption by an unauthorized user as difficult as possible. If the encrypted message from a sender is compared with its encrypted but otherwise unmodified broadcasted message, the possibility of successful decryption or deduction of the encryption keys exists (even though very low). To reduce such a possibility, additional "diffusion and confusion" can be introduced. One way to introduce more "diffusion and confusion" is to break a message into many small clusters. Each cluster contains control information on how many bytes the cluster holds and where the next cluster can be found, followed by the actual information. These clusters are placed in a much bigger message with filler or dummy data for diffusion. This much larger message is then encrypted for transmission onto the network. Information on where the first cluster of the first message starts may be based on a checksum of the pre-registered encryption key or some other unique, secret identifier known only to the user node and the management station. An exemplary programming method is shown as follows:

| | |
|---|---|
| Step 1 | Use of random number methods to divide the clear text message into a random number of clusters with random sizes. |
| Step 2 | Use of random number methods to select a message size larger than the original message size. |
| Step 3 | Use of random number methods to put the various clusters into the new message; filling in the next cluster location information and ensuring the clusters do not overlap and corrupt each other. |
| Step 4 | Use of random number methods to generate filler or dummy data to fill in the "unused" parts of the message. |
| Step 5 | Encrypt the message. |

To further ensure security, the technique of one-time key can be used. This means the management node, after authenticating a sender, provides a one-time key encrypted with the pre-registered encryption key of sender. The information exchange between the sender and the management node (which may consist of multiple messages), will be encrypted with this one-time key. This further reduces the chance of over-usage of a key which provides a better probability for an eavesdropper to successfully decrypting a message.

5. The management station can act as a conventional key distribution center for confidential information exchange between two nodes. That is, if node A wants to communicate confidentially with node B, node A can request the management station to provide him a one-time key for use with node B. This one-time key is sent to node A in two forms. One form is the one-time key itself and the second form is the one-time key encrypted with the pre-registered encryption key of node B. The whole message is encrypted with the pre-registered encryption key of node A. Thus, node A can send node B the one-time key (encrypted with node B's pre-registered encryption key) before sending the confidential data. The above key distribution center technique has been described in prior art.

6. It is further emphasized that in a distributed database application, the invention is used in a "central coordination and distributed processing" node. The retransmission node or the arbitrator node does the coordination—ensuring every node "hears" the same messages in exactly the same sequence. The processing is done totally in the distributed nodes throughout the network.

In case of a few lines or nodes failing in the network, a distributed node makes a very simple decision. If it still has access to the retransmission node or the arbitrator node and/or a playback recorder (i.e., guaranteed, reliable broadcast is available to it), it can act as if no failure ever occurred. However, if it fails to communicate with the retransmission node or the arbitrator node and/or a playback recorder (i.e., guaranteed, reliable broadcast is not available to it), it must treat the failure as fatal and alert the user program. No distributed database updates should be attempted and it must inform user programs that even read operations may not give the most current data.

Figure 91:
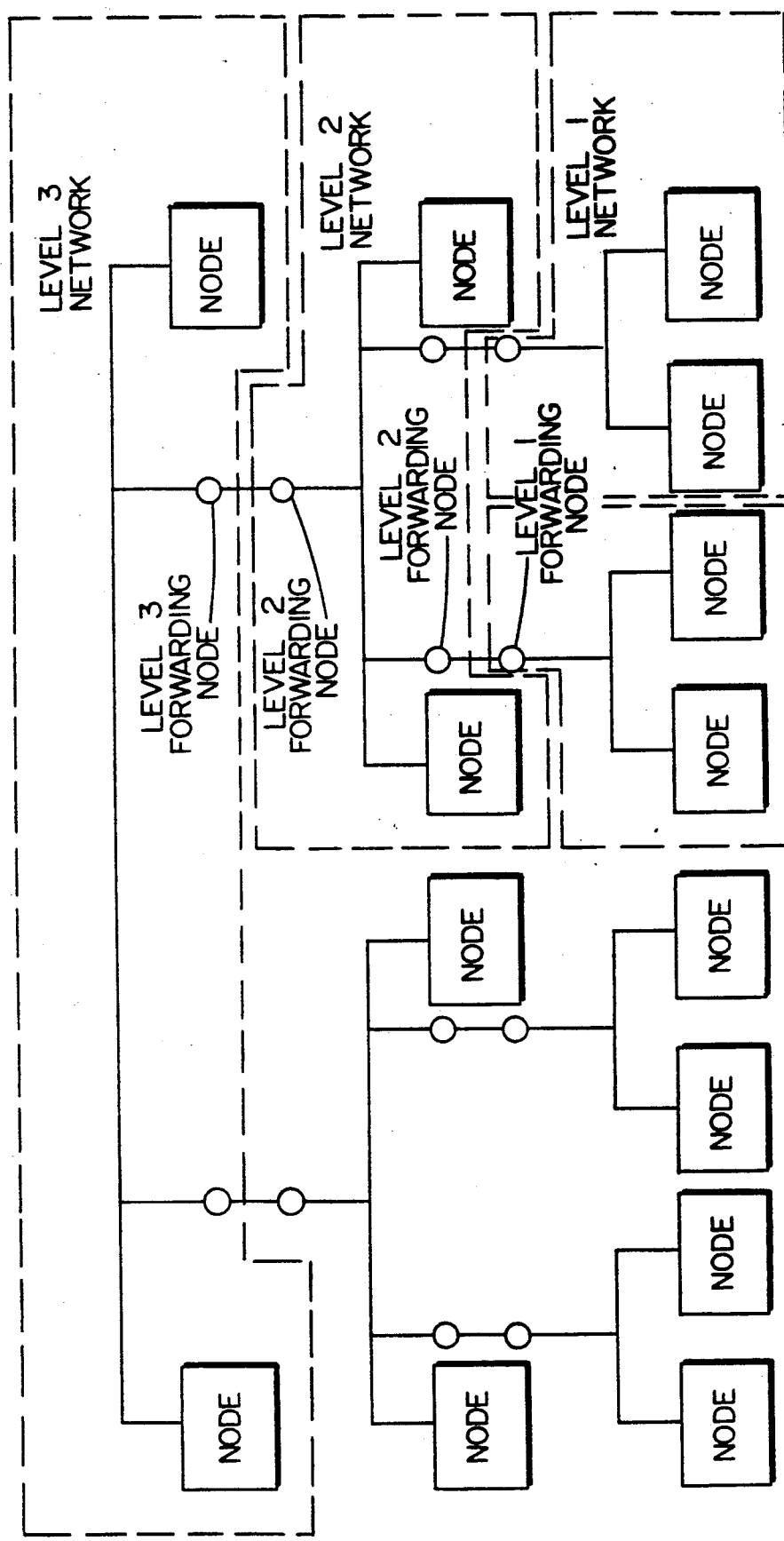
FIG. 91 is an exemplary implementation of a multilevel guaranteed, reliable broadcast network.

7. It is also possible to have a multi-level scheme to extend the above invention to cover many cities and even many countries all over the world (FIG. 91). The nodes within one site has a level 1 transmission station or a level 1 arbitrator node. To communicate with nodes in a different site, a forwarding node is added. The forwarding node takes no action for all communications within the local site but will forward messages if these messages are for nodes in a different site. These forwarding nodes are connected to a level 2 network with a level 2 transmission station or level 2 arbitrator node and/or level 2 playback recorder stations. To reach nodes beyond the local city, a further level 3 can be introduced an so on. The concept is very similar to that of the telephone system where there is a local exchange, a district or area code exchange, etc. Thus, the invention can be expanded from a few nodes to millions of nodes throughout the world. The implication is enormous.

The General Solution

It is important to know that other variations of solving the problem of providing guaranteed, reliable broadcast are possible. The technique of how to identify these variations is described here.

In a network environment, one can introduce five types of nodes.

Sender nodes are nodes where messages originate.

Receiver nodes are nodes where messages are received. A user node can be both a sender and a receiver node.

Data source node (as first taught by Naron et al) where messages are first gathered, global message sequence numbers are added and the enhanced messages are then broadcasted.

Primary receiver node (as first taught by Chang et al) where broadcast messages are acknowledged with the global message sequence numbers supplied by the primary receiver.

Arbitrator node (as taught by Tseung in this patent application) which announces its view of the messages received on the network for other nodes to compare periodically.

The three functions that can be used to identify missing messages are global message sequence (GMS) numbers, message acknowledgements and comparison with the arbitrator node. One can combine the types of nodes and where the various functions can be located in the following tables for a systematic analysis. The tables are shown with the accompanying comments.

TABLE I

| Arrange Type | Sender Node | Receiver Nodes | Data Source | Primary Receiver | Arbitrator Node | Possible Solution |
|---|---|---|---|---|---|---|
| 1a | GMS |  |  |  |  |  |
|  | ACK |  |  |  |  |  |
| 1b | GMS | ACK |  |  |  |  |
| 1c | GMS |  | ACK |  |  |  |
| 1d | GMS |  |  | ACK |  | X |
| 1e | GMS |  |  |  | compare | X |
| 1f (no GMS) | ACK |  |  |  |  |  |
| 1g (no ACK) |  |  | GMS |  |  | ? |

Comments:
1d is a possible solution. Every sender node detects the last global message sequence number and fills in the expected new global message sequence number. The acknowledgement from the primary receiver will resolve possible conflicts.
1e is a possible solution. Every sender node detects the last global message sequence number and fills in the expected new global message sequence number. The arbitrator node message (used for comparison) will resolve possible conflicts.
1g is a remote possibility. The technology is similar to that used in Ethernet. There are many unanswered reliability questions.

TABLE II

| Arrange Type | Sender Node | Receiver Nodes | Data Source | Primary Receiver | Arbitrator Node | Possible Solution |
|---|---|---|---|---|---|---|
| 2a | ACK | GMS |  |  |  |  |
| 2b |  | GMS |  |  |  |  |
|  |  | ACK |  |  |  |  |
| 2c |  | GMS | ACK |  |  |  |
| 2d |  | GMS |  | ACK |  |  |
| 2e |  | GMS |  |  | compare |  |
| Arbitrator Node 2f (no GMS) |  | ACK |  |  |  | ? |
| 2g (no ACK) |  | GMS |  |  |  |  |

Comments:
2f is the very original, impractical solution of receiving acknowledgement from every receiver before the next one is sent. In other words, a sender sends out its message and waits for acknowledgement from every receiver before it sends the next message.

TABLE III

| Arrange Type | Sender Node | Receiver Nodes | Data Source | Primary Receiver | Arbitrator Node | Possible Solution |
|---|---|---|---|---|---|---|
| 3a | ACK |  | GMS |  |  |  |
| 3b |  | ACK | GMS |  |  |  |
| 3c |  |  | GMS |  |  |  |
|  |  |  | ACK |  |  |  |
| 3d |  |  | GMS | ACK |  | X |
| 3e |  |  | GMS |  | compare | ? |
| Arbitrator Node 3f (no GMS) |  |  | ACK |  |  |  |
| 3g (no ACK) |  |  | GMS |  |  | X |

Comments:
3d is the solution as outlined in FIG. 1 of this invention. It becomes clear if one replaces the term primary receiver with designated recorder computer. Broadcast flow control is achieved via the acknowledgement mechanism of the designated recorder station.
3e is a possibility. The data source supplies the global message numbers. It can send more than one message and then compare its list with that of the arbitrator node. However, one still needs to work out how to resolve the conflict if the arbitrator's list does not agree with that of the data source.
3g is the Naron et al solution. The data source gathers the data, puts on the global message sequence number and then broadcasts the enhanced data. No acknowledgement is specified.

TABLE IV

| Arrange Type | Sender Node | Receiver Nodes | Data Source | Primary Receiver | Arbitrator Node | Possible Solution |
|---|---|---|---|---|---|---|
| 4a | ACK | | | GMS | | |
| 4b | | ACK | | GMS | | |
| 4c | | | ACK | GMS | | |
| 4d | | | | GMS ACK | | X |
| 4e | | | | GMS | compare | ? |
| Arbitrator Node 4f (no GMS) | | | | ACK | | ? |
| 4g (no ACK) | | | | GMS | | X |

Comments:
4d is the Change et al solution. The global message sequence supplied will give the newly started nodes a chance to know what messages they actually missed.
4e is a possibility. However, one still have to resolve the situation when the arbitrator node does not agree with the primary receiver.
4f is a possibility. This means the token site will do an ACK before the next message can be sent. Every sender node must wait for an ACK before sending a message. However, this solution does not cater for the situation when a node misses a whole group of messages.
4g is very similar to 4d. The global message sequence number is supplied by the token site. The broadcasting of this information is equivalent to acknowledgement.

TABLE V

| Arrange Type | Sender Node | Receiver Nodes | Data Source | Primary Receiver | Arbitrator Node | Possible Solution |
|---|---|---|---|---|---|---|
| 5a | ACK | | | | GMS | |
| 5b | | ACK | | | GMS | |
| 5c | | | ACK | | GMS | |
| 5d | | | | ACK | GMS | |
| 5e | | | | | GMS compare | X |
| Arbitrator Node 5f (no GMS) | | | | | compare | X |
| 5g (no ACK) | | | | | GMS | X |

Comments:
5e, 5f and 5g are possible solution. 5f is the fully described arbitrator node embodiment. 5e effectively teaches that explicit global message sequence number can optionally be supplied by the arbitrator node with possible advantages. One obvious advantage is that a receiver node can use this explicity global message sequence number and the time and date information to recover missed message without doing additional calculations.
5g is effectively the same as 5e. Even though the compare function is not explicitly specified, it is "implied". Wherever the arbitrator node sends out its message, other nodes must compare their views with that of the arbitrator node.
Thus, with this systematic approach, one can find out where the Naron et al solution (3g), the Change et al solution (4d) fit in the "general" solution. Those skilled in the art can now discuss the pros and cons of the various possible solutions uncovered by this "general" solution.

The invention has been described in connection with what is presently considered to be the most practical and preferred embodiments, but it is to be understood that the invention is not to be limited to the disclosed embodiments. On the contrary, it is intended to cover various modifications and equivalent arrangements included within the spirit and scope of the appended claims.

What is claimed is:

1. In a method of providing guaranteed reliable data communications over a digital communications network, including the following steps:
    (a) monitoring said network for digital messages with an arbitrator node coupled to said network;
    (b) reserving network message slots for exclusive use by said arbitrator node; and
    (c) transmitting arbitrator messages identifying said messages monitored by said monitoring step (a) during said reserved message slots.

2. A method as in claim 1 wherein said reserving step (b) comprises the step of reserving every mth message slot for said arbitrator node, m being an integer.

3. A method as in claim 1 wherein
    said network is of the type including at least one further node connected thereto; and
    said reserving step (b) comprises the step of reserving predetermined message slots beforehand for exclusive use by said arbitrator node and inhibiting said further node from transmitting within said reserved message slots.

4. A method as in claim 1 further including the steps of:
    (i) transmitting said digital messages over said network from at least one further node coupled to said network;
    (ii) detecting said arbitrator message with said further node; and
    (iii) repeating said transmitting step (i) only upon detection by said further node of completion of said arbitrator message.

5. A method as in claim 1 further including the following steps:
    (i) transmitting said digital messages with at lest one further node coupled to said network;
    (ii) receiving said arbitrator message with said further node;
    (iii) comparing, at said further node, said digital messages transmitted by said further node with messages identified by said arbitrator message; and
    (iv) retransmitting at said further node, selected ones of said transmitted digital messages said comparing step (iii) reveals have not been identified in said arbitrator message.

6. A method of providing guaranteed reliable data communications over a digital communications network, including the following steps:
(a) monitoring said network for digital messages with an arbitrator node coupled to said network;
(b) transmitting arbitrator messages identifying said messages monitored by said monitoring step (a);
(c) receiving said digital messages and said arbitrator message with a further node connected to said network;
(d) comparing, at said further node, messages received by said further node with messages identified by said arbitrator message; and
(e) retransmitting selected ones of said digital messages in response to the results of said comparison.

7. A method as in claim 6 wherein said arbitrator node performs said retransmitting step.

8. A method as in claim 6 wherein said retransmitting step is performed by a playback recorder node different from said arbitrator node.

9. In a method of providing guaranteed reliable data communications over a digital communications network, including the following steps:
(a) monitoring said network for digital messages with an arbitrator node coupled to said network;
(b) reserving network time intervals for transmission by said arbitrator node; and
(c) transmitting arbitrator messages identifying said messages monitored by said monitoring step (a) during said reserved time intervals.

10. A method as in claim 9 wherein said reserving step (b) comprises the step of periodically reserving said network for exclusive use by said arbitrator node upon elapse of a time interval having duration T.

11. A method as in claim 9 wherein:
said network is of the type including at least one further node connected thereto; and
said reserving step (b) comprises the step of reserving predetermined time intervals beforehand for exclusive use by said arbitrator node and inhibiting said further node from transmitting within said reserved time intervals.

12. A method as in claim 9 further including the following steps:
receiving said digital messages and said arbitrator message with a further node connected to said network;
comparing, at said further node, messages received by said further node with messages identified by said arbitrator message; and
retransmitting selected ones of said digital messages in response to the results of said comparison.

13. A method as in claim 12 wherein said arbitrator node performs said retransmitting step.

14. A method as in claim 12 wherein said retransmitting step is performed by a playback recorder node different from said arbitrator node.

15. A method as in claim 9 further including the steps of:
(i) transmitting said digital messages over said network from at least one further node coupled to said network;
(ii) detecting said arbitrator message with said further node; and
(iii) inhibiting said transmitting step (i) until said further node detects completion of said arbitrator message.

16. A method as in claim 9 further including the following steps:
(i) transmitting said digital messages with at least one further node coupled to said network;
(ii) receiving said arbitrator message with said further node;
(iii) comparing, at said further node, said digital messages transmitted by said further node with messages identified by said arbitrator message; and
(iv) retransmitting, at said further node, selected ones of said transmitted digital messages if said comparing step (iii) reveals said selected messages have not been identified in said arbitrator message.

17. In a method of providing guaranteed reliable data communications over a digital communications network, comprising the steps of:
(a) receiving digital messages from said network with an arbitrator node coupled to said network; and
(b) transmitting an arbitrator message identifying said messages received by said receiving step (a) upon any of: (i) receipt of a predetermined number of said messages by said receiving step (a), and (ii) the occurrence of a reference point in time if less than said predetermined number of messages have been received upon said occurrence.

18. A method as in claim 17 further including the following steps:
(c) receiving digital messages from said network with a user node;
(d) receiving said arbitrator message with said user node;
(e) comparing, at said user node, the messages identified as having been received by said arbitrator message with said messages actually received by said user node in said receiving step (c); and
(f) selectively requesting retransmission of messages in response to the results of said comparing step (e).

19. In a method of providing guaranteed reliable data communications over a digital communications network, comprising the steps of:
(a) transmitting plural digital messages over said network during corresponding message transmission periods;
(b) inhibiting said transmitting step (a) during recurring message transmission periods reserved for use by an arbitrator node coupled to said network;
(c) receiving said plural messages transmitted by said transmitting step (a) with said arbitrator node; and
(d) during said reserved message transmission periods, transmitting, with said arbitrator node, arbitrator messages identifying said plural messages received by said receiving step (c) since the last time an arbitrator message was transmitted.

20. A method as in claim 19 wherein said transmitting step (d) includes the step of specifying in said arbitrator message the sequence in which said plural messages were received by said receiving step (c).

21. In a method of providing guaranteed reliable data communications to plural nodes connected to a digital communications network, comprising the steps of:
(a) transmitting plural digital messages over said network in a sequence;
(b) receiving said plural messages transmitted by said transmitting step (a) with an arbitrator node coupled to said network;

(c) generating an arbitrator message in response to said plural messages received by said receiving step (b) after m messages (m an integer) have been received by said arbitrator node or upon occurrence of a reference point in time if less than m messages have been received upon occurrence of said reference point in time, said arbitrator message identifying said plural messages received by said receiving step (b); and (d) transmitting said arbitrator message over said network.

22. A method of providing guaranteed reliable data communications between first, second and third nodes connected to a digital communications network, said method comprising the steps of:

(a) transmitting a first digital message from said first node over said network during a first message slot;

(b) transmitting a second digital message from said second node over said network during a second message slot different than said first message slot;

(c) receiving said first message and said second message with said third node;

(d) storing within said third node at least an identification of said first and second messages received by said receiving step (c);

(e) receiving said first message and said second message with an arbitrator node also coupled to said network;

(f) generating an arbitrator message identifying said messages received by said receiving step (e);

(g) transmitting said arbitrator message over said network during a further message slot;

(h) receiving said arbitrator message with said third node;

(i) comparing the contents of said arbitrator message with said identifications stored by said storing step (d); and (j) originating a retransmission request message with said third node if said comparing step (i) reveals a discrepancy between the messages received by said receiving step (c) and the messages identified by said arbitrator message.

23. A method as in claim 22 further including the step of reserving beforehand said further message slot for exclusive use by said arbitrator node, said transmitting step (g) transmitting said arbitrator message within said reserved message slot.

24. A method as in claim 22 wherein said reserving step includes the step of preventing each of said first and second nodes from transmitting on said network during said further message slot.

25. A method as in claim 22 wherein said reserving step includes the step of preventing each of said first and second nodes from transmitting from the beginning of said further message slot until said each node detects the termination of transmission of said arbitrator message.

26. In a method of providing guaranteed reliable data communications over a digital communications network, including the following steps:

(a) monitoring said network for digital messages with an arbitrator node coupled to said network;

(b) transmitting an arbitrator message identifying said messages monitored by said monitoring step (a); and (c) specifying within said arbitrator message a future message slot reserved for said arbitrator node.

27. A method as in claim 26 wherein said transmitting step (b) is performed every mth message slot, m being an integer, and said method further includes the step of varying the value of m.

28. A method as in claim 26 further including the following steps:

receiving said digital messages and said arbitrator message with a further node connected to said network;

comparing, at said further node, messages received by said further node with messages identified by said arbitrator message; and retransmitting selected ones of said digital messages in response to the results of said comparison.

29. A method as in claim 26 further including the following steps:

(i) transmitting said digital messages with at least one further node coupled to said network;

(ii) receiving said arbitration message with said further node;

(iii) comparing, at said further node, said digital messages transmitted by said further node with messages identified by said arbitrator message; and (iv) retransmitting, at said further node, selected ones of said transmitted digital messages if said comparing step (iii) reveals said selected messages have not been identified in said arbitrator message.

30. In a method of providing guaranteed reliable data communications over a digital communications network, including the following steps:

(a) monitoring said network for digital messages with an arbitrator node coupled to said network;

(b) transmitting an arbitrator message identifying said messages monitored by said monitoring step (a);

(c) specifying in said arbitrator message a future time interval;

(d) repeating said monitoring step (a) subsequent to said transmitting step (b); and (e) repeating said transmitting step (b) within said future time interval.

31. A method as in claim 30 wherein said transmitting step (b) is performed periodically upon elapse of a time interval of duration T, and said method further includes the step of varying the value of T.

32. A method as in claim 30 further including the following steps:

receiving said digital messages and said arbitrator message with a further node connected to said network;

comparing, at said further node, messages received by said further node with messages identified by said arbitrator message; and retransmitting selected ones of said digital messages in response to the results of said comparison.

33. A method as in claim 30 further including the following steps:

(i) transmitting said digital messages with at least one further node coupled to said network;

(ii) receiving said arbitration message with said further node;

(iii) comparing, at said further node, said digital messages transmitted by said further node with messages identified by said arbitrator message; and (iv) retransmitting, at said further node, selected ones of said transmitted digital messages if said comparing step (iii) reveals said selected messages have not been identified in said arbitrator message.

34. A method of improving the performance of a digital communications network, said method including the following steps:

(a) monitoring said network for digital messages with an arbitrator node coupled to said network;
(b) specifying future message slots for use by other nodes in response to said digital messages; and
(c) transmitting an arbitrator message identifying said reserved future message slots.

35. A method as in claim 34 wherein:
said monitoring step (a) includes the step of determining the message type of a first message appearing on said network; and
said specifying step (b) is conditionally performed based on the message type determined by said determining step.

36. A method as in claim 34 wherein:
said monitoring step (a) includes the steps of accepting some messages and ignoring other messages; and
said specifying step (b) includes the step of reserving future message slots for messages ignored by said ignoring step.

37. A method as in claim 34 further including the following steps:
receiving said digital messages and said arbitrator message with a further node connected to said network;
comparing, at said further node, messages received by said further node with messages identified by said arbitrator message; and
retransmitting selected ones of said digital messages in response to the results of said comparison.

38. A method as in claim 34 further including the following steps:
(i) transmitting said digital messages with at least one further node coupled to said network during times not identified by said arbitrator message as being reserved for other nodes;
(ii) receiving said arbitration message with said further node;
(iii) comparing, at said further node, said digital messages transmitted by said further node with messages identified by said arbitrator message; and
(iv) retransmitting, at said further node, selected ones of said transmitted digital messages during message slots specified by said arbitrator message as being reserved for use by said further node.

39. In a method of providing guaranteed reliable one-to-one data communication over a digital communications network, including the following steps:
(a) transmitting a digital message from a first node to a second node over said network;
(b) receiving said digital message with said second node;
(c) also receiving said digital message with an arbitrator node over said network; and
(d) transmitting, over said network with said arbitrator node, an arbitrator message identifying reception of said digital message.

40. A method as in claim 39 wherein said transmitting step (a) comprises the step of addressing said digital message only to said second node.

41. A method as in claim 39 wherein:
said method further includes the steps of transmitting a further digital message over said network and receiving said further digital message with said second node and with said arbitrator node; and
said transmitting step (d) includes the step of transmitting said arbitrator message identifying reception of said first-mentioned and said further digital messages by said arbitrator node.

42. A method as in claim 39 further including the following steps:
receiving said arbitrator message with said first node; and
retransmitting said digital message from said first node if said arbitrator message does not identify reception of said digital message.

43. A method as in claim 39 further including the following steps:
receiving said arbitrator message with said second node;
comparing, at said second node, said digital message received in said receiving step (b) with said arbitrator message; and
selectively requesting retransmission of said digital message in response to the results of said comparison.

44. In a method of providing reliable data communications based on message priority over a digital communications network, including the following steps:
(a) assigning a message priority for digital messages that are transmitted over said network;
(b) reserving future message slots in response to said message priority assignment with an arbitrator node coupled to said network; and
(c) transmitting at least one arbitrator message with said arbitrator node identifying said reserved future message slots.

45. A method as in claim 44 wherein:
said method further includes the step of monitoring said network with said arbitrator node for digital messages; and
said transmitting step (c) includes the step of transmitting information identifying said messages monitored by said monitoring step.

46. A method as in claim 44 further including the following steps:
receiving said digital messages and said arbitrator message with a further node connected to said network;
comparing, at said further node, messages received by said further node with messages identified by said arbitrator message; and
retransmitting selected ones of said digital messages in response to the results of said comparison.

47. A method as in claim 44 further including the following steps:
(i) transmitting said digital messages with at least one further node coupled to said network;
(ii) receiving said arbitration message with said further node;
(iii) comparing, at said further node, said digital messages transmitted by said further node with messages identified by said arbitrator message; and
(iv) retransmitting, at such further node, selected ones of said transmitted digital messages in response to said comparison.

48. A method as in claim 44 wherein:
said method further includes the step of receiving messages from said network with said arbitrator node and testing said messages for message type; and
said reserving step (d) is performed in response to the type of messages received by said arbitrator node.

49. A method as in claim 44 wherein:

said method further includes the steps of accepting, with said arbitrator node, some messages appearing on said network and ignoring, with said arbitrator node, other messages appearing on said network; and said reserving step includes the step of reserving future message slots for said messages ignored by said ignoring step.

50. A method of providing guaranteed reliable broadcast data communication to plural digital signal processing stations connected to a digital signal communications network, said method comprising the steps of:
(a) originating a digital signal message;
(b) transmitting said message to a retransmission station;
(c) assigning a global identifier to said message by said retransmission station;
(d) retransmitting said message together with said assigned global identifier to all said plural digital signal processing stations;
(e) testing said message by each said plural station to determine whether the said message has been received before by said station;
(f) retransmitting said message to each of said data processing stations if said testing step (e) reveals said message has not been received before;
(g) repeating said testing step (e) and retransmitting steps (f) until all said plural stations receive the said message.

51. In a method of providing guaranteed reliable communications over a communications network of the type having plural nodes, including at least a first node, coupled thereto, said network communicating a stream of messages, including the following steps:
(a) providing, at said first node, a message to be communicated over said network;
(b) generating a global message sequence identifier;
(c) communicating said global message sequence identifier to said first node; and
(d) broadcasting said message from said first node over said network in a sequence, with respect to said stream of messages, which is responsive to said communicated global message sequence identifier.

52. A method as in claim 51 wherein said broadcasting step includes the step of broadcasting said global message sequence identifier with said message.

53. A method as in claim 52 further including the following steps:
receiving said broadcasted message with a further node coupled to said network; and
determining, in response to said received global message sequence identifier, whether a message previously transmitted in said stream has not been received by said further node.

* * * * *